United States Patent
Diao et al.

(10) Patent No.: US 12,522,662 B2
(45) Date of Patent: Jan. 13, 2026

(54) ANTI-PD-L1 ANTIBODY, AND PREPARATION METHOD THEREFOR AND APPLICATION THEREOF

(71) Applicant: SYNBIO TECHNOLOGIES, LLC, Jiangsu (CN)

(72) Inventors: Wenyi Diao, Jiangsu (CN); Tingting Wu, Jiangsu (CN); Ping Yang, Jiangsu (CN)

(73) Assignee: SYNBIO TECHNOLOGIES LLC, Jiangsu (CN)

( * ) Notice: Subject to any disclaimer, the term of this patent is extended or adjusted under 35 U.S.C. 154(b) by 990 days.

(21) Appl. No.: 17/612,564

(22) PCT Filed: Jul. 1, 2019

(86) PCT No.: PCT/CN2019/094210
§ 371 (c)(1),
(2) Date: Nov. 18, 2021

(87) PCT Pub. No.: WO2020/057225
PCT Pub. Date: Mar. 26, 2020

(65) Prior Publication Data
US 2023/0143294 A1    May 11, 2023

(30) Foreign Application Priority Data

Sep. 17, 2018 (CN) .......................... 201811083013.4

(51) Int. Cl.
| | | |
|---|---|---|
| C07K 16/28 | (2006.01) | |
| A61K 39/00 | (2006.01) | |
| A61K 39/395 | (2006.01) | |
| A61K 45/06 | (2006.01) | |
| A61P 35/00 | (2006.01) | |
| A61P 35/02 | (2006.01) | |

(52) U.S. Cl.
CPC .... *C07K 16/2827* (2013.01); *A61K 39/39558* (2013.01); *A61K 45/06* (2013.01); *C07K 2317/33* (2013.01); *C07K 2317/41* (2013.01); *C07K 2317/565* (2013.01); *C07K 2317/567* (2013.01); *C07K 2317/92* (2013.01)

(58) Field of Classification Search
CPC ...................... C07K 16/2827; A61K 2039/505
See application file for complete search history.

(56) References Cited

U.S. PATENT DOCUMENTS

| | | |
|---|---|---|
| 2016/0158360 A1 | 6/2016 | Hernandez et al. |
| 2017/0112925 A1 | 4/2017 | Junttila |
| 2017/0274073 A1 | 9/2017 | Grogan et al. |
| 2017/0290913 A1 | 10/2017 | Cheung et al. |
| 2018/0200338 A1 | 7/2018 | Hoffmann |
| 2018/0346574 A1 | 12/2018 | Fang et al. |

FOREIGN PATENT DOCUMENTS

| | | | | |
|---|---|---|---|---|
| CN | 103987405 A | 8/2014 | | |
| CN | 105828837 A | 8/2016 | | |
| CN | 106573060 A | 4/2017 | | |
| CN | 106687135 A | 5/2017 | | |
| CN | 106794245 A | 5/2017 | | |
| CN | 106999583 A | 8/2017 | | |
| CN | 107206088 A | 9/2017 | | |
| CN | 108250296 A | 7/2018 | | |
| CN | 108350082 A | 7/2018 | | |
| CN | 108456251 A | 8/2018 | | |
| CN | 109053891 A | * 12/2018 | ....... | A61K 39/39558 |
| WO | 2018162749 A1 | 9/2018 | | |

OTHER PUBLICATIONS

Orry and Abagyan. Methods in Molecular Biology. Homology Modeling; Published: Jan. 1, 2012 (Year: 2012).*
Maier and Labute. Proteins. 82: 1599-1610; Published: Apr. 23, 2014 (Year: 2014).*
Vazquez-Lombardi et al. Nature Protocols. 13: 99-117; Published: Dec. 14, 2017 (Year: 2017).*
Frenzel et al. Froniters in Immunology. 4: 217; Published: Jul. 29, 2013 (Year: 2013).*
Rudikoff et al. Proc Natl Acad Sci USA. 79: 1979-1983; Published: Mar. 1982 (Year: 1982).*
Murphy et al. Journal of Immunological Methods. 463: 127-133; Published: Oct. 12, 2018 (Year: 2018).*
Casset et al. BBRC 2003, 307: 198-205; Published: Jul. 18, 2003 (Year: 2003).*
International Search Report for International Application No. PCT/CN2019/094210, dated Oct. 8, 2019, 12 pages.

(Continued)

*Primary Examiner* — Daniel E Kolker
*Assistant Examiner* — Katherine Ann Holtzman
(74) *Attorney, Agent, or Firm* — Reising Ethington P.C.

(57) ABSTRACT

Provided are an anti-PD-L1 antibody, and a preparation method therefor and an application thereof. The antibody is obtained by a computer-aided design, and the anti-PD-L1 antibody comprises an antibody I and/or an antibody II; an antibody sequence is subjected to simulation analysis and design by bioinformatics modeling without complicated and cumbersome immune reactions; the antibody is designed and transferred into a host cell by molecular biological construction, and expressed in the host cell and purified to obtain the antibody with a PD-L1 antigen binding activity.

20 Claims, 6 Drawing Sheets

Specification includes a Sequence Listing.

(56) References Cited

OTHER PUBLICATIONS

Written Opinion for International Application No. PCT/CN2019/094210, dated Oct. 8, 2019, 9 pages.
International Preliminary Report on Patentability for Application No. PCT/CN2019/094210, dated Mar. 9, 2021, 10 pages.
Chinese Office Action corresponding to Chinese Application No. 201811083013.4, dated May 19, 2021, 13 pages.
J. Bai et al., "Regulation of PD-1/PD-L1 pathway and resistance to PD-1/PDL1 blockade", Oncotarget, 2017, vol. 8, No. 66, pp. 110693-110707.

* cited by examiner

SEQUENCE LISTING

```
<160> NUMBER OF SEQ ID NOS: 154

<210> SEQ ID NO 1
<211> LENGTH: 26
<212> TYPE: PRT
<213> ORGANISM: Artificial sequence
<220> FEATURE:
<223> OTHER INFORMATION: I-FR-L1

<400> SEQUENCE: 1

Asp Ile Gln Met Thr Gln Ser Pro Ser Ser Leu Ser Ala Ser Val Gly
1               5                   10                  15

Asp Arg Val Thr Ile Thr Cys Arg Ala Ser
            20                  25

<210> SEQ ID NO 2
<211> LENGTH: 17
<212> TYPE: PRT
<213> ORGANISM: Artificial sequence
<220> FEATURE:
<223> OTHER INFORMATION: I-FR-L2

<400> SEQUENCE: 2

Leu Asn Trp Leu Gln Gln Lys Pro Gly Lys Ala Ile Lys Arg Leu Ile
1               5                   10                  15

Tyr

<210> SEQ ID NO 3
<211> LENGTH: 36
<212> TYPE: PRT
<213> ORGANISM: Artificial sequence
<220> FEATURE:
<223> OTHER INFORMATION: I-FR-L3

<400> SEQUENCE: 3

Ser Leu Asp Ser Gly Val Pro Lys Arg Phe Ser Gly Ser Arg Ser Gly
1               5                   10                  15

Ser Asp Tyr Ser Leu Thr Ile Ser Ser Leu Gln Pro Glu Asp Phe Ala
            20                  25                  30

Thr Tyr Tyr Cys
        35

<210> SEQ ID NO 4
<211> LENGTH: 10
<212> TYPE: PRT
<213> ORGANISM: Artificial sequence
<220> FEATURE:
<223> OTHER INFORMATION: I-FR-L4

<400> SEQUENCE: 4

Phe Gly Gln Gly Thr Lys Leu Glu Ile Lys
1               5                   10

<210> SEQ ID NO 5
<211> LENGTH: 24
```

```
<212> TYPE: PRT
<213> ORGANISM: Artificial sequence
<220> FEATURE:
<223> OTHER INFORMATION: I-FR-H1

<400> SEQUENCE: 5

Val Gln Leu Val Gln Ser Gly Ala Glu Val Lys Lys Pro Gly Ala Ser
1               5                   10                  15

Val Lys Val Ser Cys Lys Ala Ser
            20

<210> SEQ ID NO 6
<211> LENGTH: 17
<212> TYPE: PRT
<213> ORGANISM: Artificial sequence
<220> FEATURE:
<223> OTHER INFORMATION: I-FR-H2

<400> SEQUENCE: 6

Met His Trp Val Arg Gln Ala Pro Gly Gln Gly Leu Glu Trp Met Gly
1               5                   10                  15

Ala

<210> SEQ ID NO 7
<211> LENGTH: 38
<212> TYPE: PRT
<213> ORGANISM: Artificial sequence
<220> FEATURE:
<223> OTHER INFORMATION: I-FR-H3

<400> SEQUENCE: 7

Ser Tyr Asn Gln Lys Phe Lys Gly Arg Val Thr Ile Thr Ala Val Thr
1               5                   10                  15

Ser Ala Ser Thr Ala Tyr Met Glu Leu Ser Ser Leu Arg Ser Glu Asp
            20                  25                  30

Thr Ala Val Tyr Tyr Cys
        35

<210> SEQ ID NO 8
<211> LENGTH: 10
<212> TYPE: PRT
<213> ORGANISM: Artificial sequence
<220> FEATURE:
<223> OTHER INFORMATION: I-FR-H4

<400> SEQUENCE: 8

Trp Gly Gln Gly Thr Leu Val Thr Val Ser
1               5                   10

<210> SEQ ID NO 9
<211> LENGTH: 22
<212> TYPE: PRT
<213> ORGANISM: Artificial sequence
<220> FEATURE:
<223> OTHER INFORMATION: I-FR-L1

<400> SEQUENCE: 9

Thr Gln Ser Pro Ser Phe Leu Ser Ala Ser Val Gly Asp Arg Val Thr
1               5                   10                  15

Ile Thr Cys Ser Ala Ser
            20

<210> SEQ ID NO 10
<211> LENGTH: 17
```

```
<212> TYPE: PRT
<213> ORGANISM: Artificial sequence
<220> FEATURE:
<223> OTHER INFORMATION: I-FR-L2

<400> SEQUENCE: 10

Met His Trp Phe Gln Gln Lys Pro Gly Lys Ser Pro Lys Leu Trp Ile
1               5                   10                  15

Tyr

<210> SEQ ID NO 11
<211> LENGTH: 36
<212> TYPE: PRT
<213> ORGANISM: Artificial sequence
<220> FEATURE:
<223> OTHER INFORMATION: I-FR-L3

<400> SEQUENCE: 11

Asn Leu Ala Ser Gly Val Pro Ala Arg Phe Ser Gly Ser Gly Ser Gly
1               5                   10                  15

Thr Ser Tyr Ser Leu Thr Ile Ser Ser Leu Gln Pro Glu Asp Phe Ala
            20                  25                  30

Thr Tyr Tyr Cys
        35

<210> SEQ ID NO 12
<211> LENGTH: 10
<212> TYPE: PRT
<213> ORGANISM: Artificial sequence
<220> FEATURE:
<223> OTHER INFORMATION: I-FR-L4

<400> SEQUENCE: 12

Phe Gly Gln Gly Thr Lys Leu Glu Ile Lys
1               5                   10

<210> SEQ ID NO 13
<211> LENGTH: 24
<212> TYPE: PRT
<213> ORGANISM: Artificial sequence
<220> FEATURE:
<223> OTHER INFORMATION: II-FR-H1

<400> SEQUENCE: 13

Val Gln Leu Val Gln Ser Gly Ala Glu Val Lys Lys Pro Gly Ala Ser
1               5                   10                  15

Val Lys Val Ser Cys Lys Ala Ser
            20

<210> SEQ ID NO 14
<211> LENGTH: 17
<212> TYPE: PRT
<213> ORGANISM: Artificial sequence
<220> FEATURE:
<223> OTHER INFORMATION: II-FR-H2

<400> SEQUENCE: 14

Met His Trp Val Arg Gln Ala Pro Gly Gln Gly Leu Glu Trp Met Gly
1               5                   10                  15

Tyr

<210> SEQ ID NO 15
<211> LENGTH: 38
<212> TYPE: PRT
```

```
<213> ORGANISM: Artificial sequence
<220> FEATURE:
<223> OTHER INFORMATION: II-FR-H3

<400> SEQUENCE: 15

Lys Tyr Asn Glu Lys Phe Lys Gly Arg Val Thr Ile Thr Ser Asp Lys
1               5                   10                  15

Ser Ala Ser Thr Ala Tyr Met Glu Leu Ser Ser Leu Arg Ser Glu Asp
                20                  25                  30

Thr Ala Val Tyr Tyr Cys
        35

<210> SEQ ID NO 16
<211> LENGTH: 10
<212> TYPE: PRT
<213> ORGANISM: Artificial sequence
<220> FEATURE:
<223> OTHER INFORMATION: II-FR-H4

<400> SEQUENCE: 16

Trp Gly Gln Gly Thr Leu Val Thr Val Ser
1               5                   10

<210> SEQ ID NO 17
<211> LENGTH: 6
<212> TYPE: PRT
<213> ORGANISM: Artificial sequence
<220> FEATURE:
<223> OTHER INFORMATION: I-CDR-L1

<400> SEQUENCE: 17

Gln Asp Leu Gly Asn Thr
1               5

<210> SEQ ID NO 18
<211> LENGTH: 6
<212> TYPE: PRT
<213> ORGANISM: Artificial sequence
<220> FEATURE:
<223> OTHER INFORMATION: I-CDR-L1

<400> SEQUENCE: 18

Gln Asn Ile Gly Gln Thr
1               5

<210> SEQ ID NO 19
<211> LENGTH: 6
<212> TYPE: PRT
<213> ORGANISM: Artificial sequence
<220> FEATURE:
<223> OTHER INFORMATION: I-CDR-L1

<400> SEQUENCE: 19

Gln Asn Ile Ala Asn Thr
1               5

<210> SEQ ID NO 20
<211> LENGTH: 6
<212> TYPE: PRT
<213> ORGANISM: Artificial sequence
<220> FEATURE:
<223> OTHER INFORMATION: I-CDR-L1

<400> SEQUENCE: 20

Gln Asp Val Gly Gln Thr
1               5
```

```
<210> SEQ ID NO 21
<211> LENGTH: 6
<212> TYPE: PRT
<213> ORGANISM: Artificial sequence
<220> FEATURE:
<223> OTHER INFORMATION: I-CDR-L1

<400> SEQUENCE: 21

Gln Glu Ile Gly Gln Thr
1               5

<210> SEQ ID NO 22
<211> LENGTH: 6
<212> TYPE: PRT
<213> ORGANISM: Artificial sequence
<220> FEATURE:
<223> OTHER INFORMATION: I-CDR-L1

<400> SEQUENCE: 22

Gln Asn Gly Ile Asn Thr
1               5

<210> SEQ ID NO 23
<211> LENGTH: 6
<212> TYPE: PRT
<213> ORGANISM: Artificial sequence
<220> FEATURE:
<223> OTHER INFORMATION: I-CDR-L1

<400> SEQUENCE: 23

Gln Asp Ile Gly Asn Thr
1               5

<210> SEQ ID NO 24
<211> LENGTH: 6
<212> TYPE: PRT
<213> ORGANISM: Artificial sequence
<220> FEATURE:
<223> OTHER INFORMATION: I-CDR-L1

<400> SEQUENCE: 24

Gln Glu Ile Gly Gln Thr
1               5

<210> SEQ ID NO 25
<211> LENGTH: 3
<212> TYPE: PRT
<213> ORGANISM: Artificial sequence
<220> FEATURE:
<223> OTHER INFORMATION: I-CDR-L2

<400> SEQUENCE: 25

Ala Thr Ser
1

<210> SEQ ID NO 26
<211> LENGTH: 3
<212> TYPE: PRT
<213> ORGANISM: Artificial sequence
<220> FEATURE:
<223> OTHER INFORMATION: I-CDR-L2

<400> SEQUENCE: 26

Ala Ser Ser
1
```

```
<210> SEQ ID NO 27
<211> LENGTH: 3
<212> TYPE: PRT
<213> ORGANISM: Artificial sequence
<220> FEATURE:
<223> OTHER INFORMATION: I-CDR-L2

<400> SEQUENCE: 27

Gly Thr Ser
1

<210> SEQ ID NO 28
<211> LENGTH: 3
<212> TYPE: PRT
<213> ORGANISM: Artificial sequence
<220> FEATURE:
<223> OTHER INFORMATION: I-CDR-L2

<400> SEQUENCE: 28

Ser Thr Ser
1

<210> SEQ ID NO 29
<211> LENGTH: 3
<212> TYPE: PRT
<213> ORGANISM: Artificial sequence
<220> FEATURE:
<223> OTHER INFORMATION: I-CDR-L2

<400> SEQUENCE: 29

Val Ser Ser
1

<210> SEQ ID NO 30
<211> LENGTH: 3
<212> TYPE: PRT
<213> ORGANISM: Artificial sequence
<220> FEATURE:
<223> OTHER INFORMATION: I-CDR-L2

<400> SEQUENCE: 30

Val Thr Ser
1

<210> SEQ ID NO 31
<211> LENGTH: 9
<212> TYPE: PRT
<213> ORGANISM: Artificial sequence
<220> FEATURE:
<223> OTHER INFORMATION: I-CDR-L3

<400> SEQUENCE: 31

Leu Gln Tyr Ala Ser Tyr Pro Phe Thr
1               5

<210> SEQ ID NO 32
<211> LENGTH: 9
<212> TYPE: PRT
<213> ORGANISM: Artificial sequence
<220> FEATURE:
<223> OTHER INFORMATION: I-CDR-L3

<400> SEQUENCE: 32

Leu Tyr Phe Ala Ser Ser Pro Phe Thr
1               5
```

```
<210> SEQ ID NO 33
<211> LENGTH: 9
<212> TYPE: PRT
<213> ORGANISM: Artificial sequence
<220> FEATURE:
<223> OTHER INFORMATION: I-CDR-L3

<400> SEQUENCE: 33

Leu Gln Tyr Ala Ser Ser Pro Phe Thr
1               5

<210> SEQ ID NO 34
<211> LENGTH: 9
<212> TYPE: PRT
<213> ORGANISM: Artificial sequence
<220> FEATURE:
<223> OTHER INFORMATION: I-CDR-L3

<400> SEQUENCE: 34

Leu Tyr Tyr Ala Ser Tyr Phe Phe Thr
1               5

<210> SEQ ID NO 35
<211> LENGTH: 9
<212> TYPE: PRT
<213> ORGANISM: Artificial sequence
<220> FEATURE:
<223> OTHER INFORMATION: I-CDR-L3

<400> SEQUENCE: 35

Leu Gln Tyr Ala Ser Ser Phe Phe Thr
1               5

<210> SEQ ID NO 36
<211> LENGTH: 9
<212> TYPE: PRT
<213> ORGANISM: Artificial sequence
<220> FEATURE:
<223> OTHER INFORMATION: I-CDR-L3

<400> SEQUENCE: 36

Leu Asn Tyr Ile Ser Ser Pro Phe Thr
1               5

<210> SEQ ID NO 37
<211> LENGTH: 9
<212> TYPE: PRT
<213> ORGANISM: Artificial sequence
<220> FEATURE:
<223> OTHER INFORMATION: I-CDR-L3

<400> SEQUENCE: 37

Leu Gln Tyr Ala Ser Thr Phe Phe Thr
1               5

<210> SEQ ID NO 38
<211> LENGTH: 9
<212> TYPE: PRT
<213> ORGANISM: Artificial sequence
<220> FEATURE:
<223> OTHER INFORMATION: I-CDR-L3

<400> SEQUENCE: 38

Leu Tyr Tyr Ala Ser Thr Pro Phe Thr
1               5

<210> SEQ ID NO 39
```

```
<211> LENGTH: 8
<212> TYPE: PRT
<213> ORGANISM: Artificial sequence
<220> FEATURE:
<223> OTHER INFORMATION: I-CDR-H1

<400> SEQUENCE: 39

Gly Tyr Thr Phe Thr Ser Tyr Trp
1               5

<210> SEQ ID NO 40
<211> LENGTH: 8
<212> TYPE: PRT
<213> ORGANISM: Artificial sequence
<220> FEATURE:
<223> OTHER INFORMATION: I-CDR-H1

<400> SEQUENCE: 40

Gly Tyr Ser Tyr Tyr Phe Tyr Trp
1               5

<210> SEQ ID NO 41
<211> LENGTH: 8
<212> TYPE: PRT
<213> ORGANISM: Artificial sequence
<220> FEATURE:
<223> OTHER INFORMATION: I-CDR-H1

<400> SEQUENCE: 41

Gly Tyr Ser Phe Ser Ser Tyr Trp
1               5

<210> SEQ ID NO 42
<211> LENGTH: 8
<212> TYPE: PRT
<213> ORGANISM: Artificial sequence
<220> FEATURE:
<223> OTHER INFORMATION: I-CDR-H1

<400> SEQUENCE: 42

Gly Tyr Thr Tyr Tyr Phe Tyr Trp
1               5

<210> SEQ ID NO 43
<211> LENGTH: 8
<212> TYPE: PRT
<213> ORGANISM: Artificial sequence
<220> FEATURE:
<223> OTHER INFORMATION: I-CDR-H1

<400> SEQUENCE: 43

Gly Tyr Ser Phe Thr Thr Tyr Trp
1               5

<210> SEQ ID NO 44
<211> LENGTH: 8
<212> TYPE: PRT
<213> ORGANISM: Artificial sequence
<220> FEATURE:
<223> OTHER INFORMATION: I-CDR-H1

<400> SEQUENCE: 44

Gly Tyr Ser Phe Thr Ser Tyr Trp
1               5

<210> SEQ ID NO 45
<211> LENGTH: 8
```

```
<212> TYPE: PRT
<213> ORGANISM: Artificial sequence
<220> FEATURE:
<223> OTHER INFORMATION: I-CDR-H1

<400> SEQUENCE: 45

Gly Tyr Thr Tyr Asn Phe Tyr Trp
1               5

<210> SEQ ID NO 46
<211> LENGTH: 8
<212> TYPE: PRT
<213> ORGANISM: Artificial sequence
<220> FEATURE:
<223> OTHER INFORMATION: I-CDR-H2

<400> SEQUENCE: 46

Ile Tyr Pro Gly Asn Ser Asp Thr
1               5

<210> SEQ ID NO 47
<211> LENGTH: 8
<212> TYPE: PRT
<213> ORGANISM: Artificial sequence
<220> FEATURE:
<223> OTHER INFORMATION: I-CDR-H2

<400> SEQUENCE: 47

Ile Tyr His Gly Asn Ser Glu Thr
1               5

<210> SEQ ID NO 48
<211> LENGTH: 8
<212> TYPE: PRT
<213> ORGANISM: Artificial sequence
<220> FEATURE:
<223> OTHER INFORMATION: I-CDR-H2

<400> SEQUENCE: 48

Ile Tyr Pro Val His Ser Glu Thr
1               5

<210> SEQ ID NO 49
<211> LENGTH: 8
<212> TYPE: PRT
<213> ORGANISM: Artificial sequence
<220> FEATURE:
<223> OTHER INFORMATION: I-CDR-H2

<400> SEQUENCE: 49

Ile Tyr His Val Gln Ser Asp Thr
1               5

<210> SEQ ID NO 50
<211> LENGTH: 8
<212> TYPE: PRT
<213> ORGANISM: Artificial sequence
<220> FEATURE:
<223> OTHER INFORMATION: I-CDR-H2

<400> SEQUENCE: 50

Ile Tyr Pro Gly Gln Ser Glu Thr
1               5

<210> SEQ ID NO 51
<211> LENGTH: 8
<212> TYPE: PRT
```

```
<213> ORGANISM: Artificial sequence
<220> FEATURE:
<223> OTHER INFORMATION: I-CDR-H2

<400> SEQUENCE: 51

Ile Tyr Trp Ala His Ser Glu Thr
1               5

<210> SEQ ID NO 52
<211> LENGTH: 8
<212> TYPE: PRT
<213> ORGANISM: Artificial sequence
<220> FEATURE:
<223> OTHER INFORMATION: I-CDR-H2

<400> SEQUENCE: 52

Ile Tyr His Ile Asn Ser Asp Thr
1               5

<210> SEQ ID NO 53
<211> LENGTH: 13
<212> TYPE: PRT
<213> ORGANISM: Artificial sequence
<220> FEATURE:
<223> OTHER INFORMATION: I-CDR-H3

<400> SEQUENCE: 53

Thr Arg Trp Gly Glu Gly Tyr Tyr His Ala Met Asn His
1               5                   10

<210> SEQ ID NO 54
<211> LENGTH: 13
<212> TYPE: PRT
<213> ORGANISM: Artificial sequence
<220> FEATURE:
<223> OTHER INFORMATION: I-CDR-H3

<400> SEQUENCE: 54

Thr His Trp Ala Asp Ala Tyr Phe His Gly Met Asn His
1               5                   10

<210> SEQ ID NO 55
<211> LENGTH: 13
<212> TYPE: PRT
<213> ORGANISM: Artificial sequence
<220> FEATURE:
<223> OTHER INFORMATION: I-CDR-H3

<400> SEQUENCE: 55

Thr His Trp Leu Glu Val Tyr Phe His Gly Met Asp His
1               5                   10

<210> SEQ ID NO 56
<211> LENGTH: 13
<212> TYPE: PRT
<213> ORGANISM: Artificial sequence
<220> FEATURE:
<223> OTHER INFORMATION: I-CDR-H3

<400> SEQUENCE: 56

Thr Arg Trp Ala Glu Leu Phe Phe His Ala Met Asp His
1               5                   10

<210> SEQ ID NO 57
<211> LENGTH: 13
<212> TYPE: PRT
<213> ORGANISM: Artificial sequence
```

-continued

<220> FEATURE:
<223> OTHER INFORMATION: I-CDR-H3

<400> SEQUENCE: 57

Thr Arg Trp Gly Asp Gly Tyr Tyr His Ala Met Asp His
1               5                   10

<210> SEQ ID NO 58
<211> LENGTH: 13
<212> TYPE: PRT
<213> ORGANISM: Artificial sequence
<220> FEATURE:
<223> OTHER INFORMATION: I-CDR-H3

<400> SEQUENCE: 58

Thr Arg Trp Leu Asp Ala Phe Tyr His Val Met Asp His
1               5                   10

<210> SEQ ID NO 59
<211> LENGTH: 13
<212> TYPE: PRT
<213> ORGANISM: Artificial sequence
<220> FEATURE:
<223> OTHER INFORMATION: I-CDR-H3

<400> SEQUENCE: 59

Thr His Trp Val Glu Val Phe Tyr His Ala Met Glu His
1               5                   10

<210> SEQ ID NO 60
<211> LENGTH: 13
<212> TYPE: PRT
<213> ORGANISM: Artificial sequence
<220> FEATURE:
<223> OTHER INFORMATION: I-CDR-H3

<400> SEQUENCE: 60

Thr His Trp Ile Asp Gly Tyr Phe His Val Met Asp His
1               5                   10

<210> SEQ ID NO 61
<211> LENGTH: 13
<212> TYPE: PRT
<213> ORGANISM: Artificial sequence
<220> FEATURE:
<223> OTHER INFORMATION: I-CDR-H3

<400> SEQUENCE: 61

Thr His Trp Ala Glu Gly Tyr Tyr His Ala Met Glu His
1               5                   10

<210> SEQ ID NO 62
<211> LENGTH: 13
<212> TYPE: PRT
<213> ORGANISM: Artificial sequence
<220> FEATURE:
<223> OTHER INFORMATION: I-CDR-H3

<400> SEQUENCE: 62

Thr His Trp Ile Glu Ala Phe Phe His Leu Met Gln His
1               5                   10

<210> SEQ ID NO 63
<211> LENGTH: 5
<212> TYPE: PRT
<213> ORGANISM: Artificial sequence
<220> FEATURE:

<223> OTHER INFORMATION: II-CDR-L1

<400> SEQUENCE: 63

Ser Ser Val Ser Tyr
1               5

<210> SEQ ID NO 64
<211> LENGTH: 5
<212> TYPE: PRT
<213> ORGANISM: Artificial sequence
<220> FEATURE:
<223> OTHER INFORMATION: II-CDR-L1

<400> SEQUENCE: 64

Ser Thr Val Tyr Tyr
1               5

<210> SEQ ID NO 65
<211> LENGTH: 5
<212> TYPE: PRT
<213> ORGANISM: Artificial sequence
<220> FEATURE:
<223> OTHER INFORMATION: II-CDR-L1

<400> SEQUENCE: 65

Ser Ser Gly Tyr Tyr
1               5

<210> SEQ ID NO 66
<211> LENGTH: 5
<212> TYPE: PRT
<213> ORGANISM: Artificial sequence
<220> FEATURE:
<223> OTHER INFORMATION: II-CDR-L1

<400> SEQUENCE: 66

Ser Ser Ala Ser Tyr
1               5

<210> SEQ ID NO 67
<211> LENGTH: 5
<212> TYPE: PRT
<213> ORGANISM: Artificial sequence
<220> FEATURE:
<223> OTHER INFORMATION: II-CDR-L1

<400> SEQUENCE: 67

Ser Thr Ile Thr Tyr
1               5

<210> SEQ ID NO 68
<211> LENGTH: 5
<212> TYPE: PRT
<213> ORGANISM: Artificial sequence
<220> FEATURE:
<223> OTHER INFORMATION: II-CDR-L1

<400> SEQUENCE: 68

Ser Ser Ile Ser Tyr
1               5

<210> SEQ ID NO 69
<211> LENGTH: 3
<212> TYPE: PRT
<213> ORGANISM: Artificial sequence
<220> FEATURE:
<223> OTHER INFORMATION: II-CDR-L2

<400> SEQUENCE: 69

Ser Tyr Ser
1

<210> SEQ ID NO 70
<211> LENGTH: 3
<212> TYPE: PRT
<213> ORGANISM: Artificial sequence
<220> FEATURE:
<223> OTHER INFORMATION: II-CDR-L2

<400> SEQUENCE: 70

Ser Thr Ser
1

<210> SEQ ID NO 71
<211> LENGTH: 3
<212> TYPE: PRT
<213> ORGANISM: Artificial sequence
<220> FEATURE:
<223> OTHER INFORMATION: II-CDR-L2

<400> SEQUENCE: 71

Thr Thr Ser
1

<210> SEQ ID NO 72
<211> LENGTH: 3
<212> TYPE: PRT
<213> ORGANISM: Artificial sequence
<220> FEATURE:
<223> OTHER INFORMATION: II-CDR-L2

<400> SEQUENCE: 72

Tyr Thr Ser
1

<210> SEQ ID NO 73
<211> LENGTH: 9
<212> TYPE: PRT
<213> ORGANISM: Artificial sequence
<220> FEATURE:
<223> OTHER INFORMATION: II-CDR-L3

<400> SEQUENCE: 73

Gln Gln Arg Ser Ser Phe Pro Tyr Thr
1               5

<210> SEQ ID NO 74
<211> LENGTH: 9
<212> TYPE: PRT
<213> ORGANISM: Artificial sequence
<220> FEATURE:
<223> OTHER INFORMATION: II-CDR-L3

<400> SEQUENCE: 74

Gln Asn Arg Tyr Ser Tyr Pro Tyr Thr
1               5

<210> SEQ ID NO 75
<211> LENGTH: 9
<212> TYPE: PRT
<213> ORGANISM: Artificial sequence
<220> FEATURE:
<223> OTHER INFORMATION: II-CDR-L3

```
<400> SEQUENCE: 75

Gln Gln Arg Ser Ser Tyr His Tyr Thr
1               5

<210> SEQ ID NO 76
<211> LENGTH: 9
<212> TYPE: PRT
<213> ORGANISM: Artificial sequence
<220> FEATURE:
<223> OTHER INFORMATION: II-CDR-L3

<400> SEQUENCE: 76

Gln Asn Arg Thr Ser Phe His Tyr Thr
1               5

<210> SEQ ID NO 77
<211> LENGTH: 9
<212> TYPE: PRT
<213> ORGANISM: Artificial sequence
<220> FEATURE:
<223> OTHER INFORMATION: II-CDR-L3

<400> SEQUENCE: 77

Gln Tyr Arg Phe Ser Tyr Trp Tyr Thr
1               5

<210> SEQ ID NO 78
<211> LENGTH: 9
<212> TYPE: PRT
<213> ORGANISM: Artificial sequence
<220> FEATURE:
<223> OTHER INFORMATION: II-CDR-L3

<400> SEQUENCE: 78

Gln Tyr Arg Thr Ser Tyr Pro Tyr Thr
1               5

<210> SEQ ID NO 79
<211> LENGTH: 9
<212> TYPE: PRT
<213> ORGANISM: Artificial sequence
<220> FEATURE:
<223> OTHER INFORMATION: II-CDR-L3

<400> SEQUENCE: 79

Gln Gln Arg Ser Ser Tyr Pro Tyr Thr
1               5

<210> SEQ ID NO 80
<211> LENGTH: 9
<212> TYPE: PRT
<213> ORGANISM: Artificial sequence
<220> FEATURE:
<223> OTHER INFORMATION: II-CDR-L3

<400> SEQUENCE: 80

Gln Gln Arg Phe Ser Phe His Tyr Thr
1               5

<210> SEQ ID NO 81
<211> LENGTH: 9
<212> TYPE: PRT
<213> ORGANISM: Artificial sequence
<220> FEATURE:
<223> OTHER INFORMATION: II-CDR-L3

<400> SEQUENCE: 81
```

```
Gln Tyr Arg Ser Ser Tyr Trp Tyr Thr
1               5

<210> SEQ ID NO 82
<211> LENGTH: 8
<212> TYPE: PRT
<213> ORGANISM: Artificial sequence
<220> FEATURE:
<223> OTHER INFORMATION: II-CDR-H1

<400> SEQUENCE: 82

Gly Tyr Ser Thr Ser Ser Phe Val
1               5

<210> SEQ ID NO 83
<211> LENGTH: 8
<212> TYPE: PRT
<213> ORGANISM: Artificial sequence
<220> FEATURE:
<223> OTHER INFORMATION: II-CDR-H1

<400> SEQUENCE: 83

Gly Tyr Tyr Thr Ser Ser Pro Val
1               5

<210> SEQ ID NO 84
<211> LENGTH: 8
<212> TYPE: PRT
<213> ORGANISM: Artificial sequence
<220> FEATURE:
<223> OTHER INFORMATION: II-CDR-H1

<400> SEQUENCE: 84

Gly Tyr Tyr Thr Thr Ser Tyr Val
1               5

<210> SEQ ID NO 85
<211> LENGTH: 8
<212> TYPE: PRT
<213> ORGANISM: Artificial sequence
<220> FEATURE:
<223> OTHER INFORMATION: II-CDR-H1

<400> SEQUENCE: 85

Gly Tyr Ser Phe Thr Ser Tyr Val
1               5

<210> SEQ ID NO 86
<211> LENGTH: 8
<212> TYPE: PRT
<213> ORGANISM: Artificial sequence
<220> FEATURE:
<223> OTHER INFORMATION: II-CDR-H1

<400> SEQUENCE: 86

Gly Tyr Thr Phe Thr Ser Tyr Val
1               5

<210> SEQ ID NO 87
<211> LENGTH: 8
<212> TYPE: PRT
<213> ORGANISM: Artificial sequence
<220> FEATURE:
<223> OTHER INFORMATION: II-CDR-H1

<400> SEQUENCE: 87
```

```
Gly Tyr Phe Tyr Thr Ser Tyr Val
1               5

<210> SEQ ID NO 88
<211> LENGTH: 8
<212> TYPE: PRT
<213> ORGANISM: Artificial sequence
<220> FEATURE:
<223> OTHER INFORMATION: II-CDR-H1

<400> SEQUENCE: 88

Gly Tyr Phe Phe Ser Ser Phe Val
1               5

<210> SEQ ID NO 89
<211> LENGTH: 8
<212> TYPE: PRT
<213> ORGANISM: Artificial sequence
<220> FEATURE:
<223> OTHER INFORMATION: II-CDR-H2

<400> SEQUENCE: 89

Ile Asn Tyr Tyr Asn Asp Ala Thr
1               5

<210> SEQ ID NO 90
<211> LENGTH: 8
<212> TYPE: PRT
<213> ORGANISM: Artificial sequence
<220> FEATURE:
<223> OTHER INFORMATION: II-CDR-H2

<400> SEQUENCE: 90

Ile Asn Tyr Phe Tyr Asp Gly Thr
1               5

<210> SEQ ID NO 91
<211> LENGTH: 8
<212> TYPE: PRT
<213> ORGANISM: Artificial sequence
<220> FEATURE:
<223> OTHER INFORMATION: II-CDR-H2

<400> SEQUENCE: 91

Ile Asn Pro Tyr Asn Asp Gly Thr
1               5

<210> SEQ ID NO 92
<211> LENGTH: 8
<212> TYPE: PRT
<213> ORGANISM: Artificial sequence
<220> FEATURE:
<223> OTHER INFORMATION: II-CDR-H2

<400> SEQUENCE: 92

Ile Asn Tyr Tyr Asn Asp Ala Thr
1               5

<210> SEQ ID NO 93
<211> LENGTH: 8
<212> TYPE: PRT
<213> ORGANISM: Artificial sequence
<220> FEATURE:
<223> OTHER INFORMATION: II-CDR-H2

<400> SEQUENCE: 93

Ile Asn His Phe Gln Asp Ala Thr
```

```
1               5

<210> SEQ ID NO 94
<211> LENGTH: 8
<212> TYPE: PRT
<213> ORGANISM: Artificial sequence
<220> FEATURE:
<223> OTHER INFORMATION: II-CDR-H2

<400> SEQUENCE: 94

Ile Asn Pro Phe Gln Asp Ile Thr
1               5

<210> SEQ ID NO 95
<211> LENGTH: 8
<212> TYPE: PRT
<213> ORGANISM: Artificial sequence
<220> FEATURE:
<223> OTHER INFORMATION: II-CDR-H2

<400> SEQUENCE: 95

Ile Asn Pro Tyr Tyr Asp Gly Thr
1               5

<210> SEQ ID NO 96
<211> LENGTH: 9
<212> TYPE: PRT
<213> ORGANISM: Artificial sequence
<220> FEATURE:
<223> OTHER INFORMATION: II-CDR-H3

<400> SEQUENCE: 96

Ala Trp Ser Gly Ala Ile Phe Glu Tyr
1               5

<210> SEQ ID NO 97
<211> LENGTH: 9
<212> TYPE: PRT
<213> ORGANISM: Artificial sequence
<220> FEATURE:
<223> OTHER INFORMATION: II-CDR-H3

<400> SEQUENCE: 97

Ala Arg Ser Ile Gly Ile Thr Asp Tyr
1               5

<210> SEQ ID NO 98
<211> LENGTH: 9
<212> TYPE: PRT
<213> ORGANISM: Artificial sequence
<220> FEATURE:
<223> OTHER INFORMATION: II-CDR-H3

<400> SEQUENCE: 98

Ala Lys Ser Ala Ile Ala Phe Glu Tyr
1               5

<210> SEQ ID NO 99
<211> LENGTH: 9
<212> TYPE: PRT
<213> ORGANISM: Artificial sequence
<220> FEATURE:
<223> OTHER INFORMATION: II-CDR-H3

<400> SEQUENCE: 99

Ala Lys Ser Gly Gly Ile Ser Asp Tyr
1               5
```

<210> SEQ ID NO 100
<211> LENGTH: 9
<212> TYPE: PRT
<213> ORGANISM: Artificial sequence
<220> FEATURE:
<223> OTHER INFORMATION: II-CDR-H3

<400> SEQUENCE: 100

Ala Trp Ser Ala Ala Leu Ser Glu Tyr
1               5

<210> SEQ ID NO 101
<211> LENGTH: 9
<212> TYPE: PRT
<213> ORGANISM: Artificial sequence
<220> FEATURE:
<223> OTHER INFORMATION: II-CDR-H3

<400> SEQUENCE: 101

Ala Arg Ser Val Gly Ile Thr Asp Tyr
1               5

<210> SEQ ID NO 102
<211> LENGTH: 9
<212> TYPE: PRT
<213> ORGANISM: Artificial sequence
<220> FEATURE:
<223> OTHER INFORMATION: II-CDR-H3

<400> SEQUENCE: 102

Ala Arg Ser Ala Ala Leu Ser Glu Tyr
1               5

<210> SEQ ID NO 103
<211> LENGTH: 9
<212> TYPE: PRT
<213> ORGANISM: Artificial sequence
<220> FEATURE:
<223> OTHER INFORMATION: II-CDR-H3

<400> SEQUENCE: 103

Ala Arg Ser Gly Gly Ile Phe Asp Tyr
1               5

<210> SEQ ID NO 104
<211> LENGTH: 9
<212> TYPE: PRT
<213> ORGANISM: Artificial sequence
<220> FEATURE:
<223> OTHER INFORMATION: II-CDR-H3

<400> SEQUENCE: 104

Ala Lys Ser Leu Val Gly Ser Glu Tyr
1               5

<210> SEQ ID NO 105
<211> LENGTH: 107
<212> TYPE: PRT
<213> ORGANISM: Artificial sequence
<220> FEATURE:
<223> OTHER INFORMATION: Variable domain of a light chain of positive
      control

<400> SEQUENCE: 105

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Ser Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Leu Tyr His Pro Ala
                85                  90                  95

Thr Phe Gly Gln Gly Thr Lys Val Glu Ile Lys
            100                 105

<210> SEQ ID NO 106
<211> LENGTH: 118
<212> TYPE: PRT
<213> ORGANISM: Artificial sequence
<220> FEATURE:
<223> OTHER INFORMATION: Variable domain of a heavy chain of positive
      control

<400> SEQUENCE: 106

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
            20                  25                  30

Trp Ile His Trp Val Arg Gln Ala Pro Gly Lys Gly Leu Glu Trp Val
        35                  40                  45

Ala Trp Ile Ser Pro Tyr Gly Gly Ser Thr Tyr Tyr Ala Asp Ser Val
50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ala Arg Arg His Trp Pro Gly Gly Phe Asp Tyr Trp Gly Gln Gly Thr
            100                 105                 110

Leu Val Thr Val Ser Ser
        115

<210> SEQ ID NO 107
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 107

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Leu Gly Asn Thr
            20                  25                  30

Leu Asn Trp Leu Gln Gln Lys Pro Gly Lys Ala Ile Lys Arg Leu Ile
        35                  40                  45

Tyr Ala Ser Ser Ser Leu Asp Ser Gly Val Pro Lys Arg Phe Ser Gly
50                  55                  60

Ser Arg Ser Gly Ser Asp Tyr Ser Leu Thr Ile Ser Ser Leu Gln Pro
65                  70                  75                  80

```
Glu Asp Phe Ala Thr Tyr Tyr Cys Leu Tyr Tyr Ala Ser Thr Pro Phe
                85                  90                  95

Thr Phe Gly Gln Gly Thr Lys Leu Glu Ile Lys
            100                 105
```

<210> SEQ ID NO 108
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 108

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Gly Asn Thr
                20                  25                  30

Leu Asn Trp Leu Gln Gln Lys Pro Gly Lys Ala Ile Lys Arg Leu Ile
            35                  40                  45

Tyr Ala Thr Ser Ser Leu Asp Ser Gly Val Pro Lys Arg Phe Ser Gly
    50                  55                  60

Ser Arg Ser Gly Ser Asp Tyr Ser Leu Thr Ile Ser Ser Leu Gln Pro
65                  70                  75                  80

Glu Asp Phe Ala Thr Tyr Tyr Cys Leu Gln Tyr Ala Ser Ser Pro Phe
                85                  90                  95

Thr Phe Gly Gln Gly Thr Lys Leu Glu Ile Lys
            100                 105
```

<210> SEQ ID NO 109
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 109

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asn Ile Ala Asn Thr
                20                  25                  30

Leu Asn Trp Leu Gln Gln Lys Pro Gly Lys Ala Ile Lys Arg Leu Ile
            35                  40                  45

Tyr Val Ser Ser Ser Leu Asp Ser Gly Val Pro Lys Arg Phe Ser Gly
    50                  55                  60

Ser Arg Ser Gly Ser Asp Tyr Ser Leu Thr Ile Ser Ser Leu Gln Pro
65                  70                  75                  80

Glu Asp Phe Ala Thr Tyr Tyr Cys Leu Tyr Tyr Ala Ser Tyr Phe Phe
                85                  90                  95

Thr Phe Gly Gln Gly Thr Lys Leu Glu Ile Lys
            100                 105
```

<210> SEQ ID NO 110
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 110

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Gly Gln Thr
            20                  25                  30

Leu Asn Trp Leu Gln Gln Lys Pro Gly Lys Ala Ile Lys Arg Leu Ile
        35                  40                  45

Tyr Val Thr Ser Ser Leu Asp Ser Gly Val Pro Lys Arg Phe Ser Gly
    50                  55                  60

Ser Arg Ser Gly Ser Asp Tyr Ser Leu Thr Ile Ser Ser Leu Gln Pro
65                  70                  75                  80

Glu Asp Phe Ala Thr Tyr Tyr Cys Leu Tyr Phe Ala Ser Ser Pro Phe
                85                  90                  95

Thr Phe Gly Gln Gly Thr Lys Leu Glu Ile Lys
            100                 105

<210> SEQ ID NO 111
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 111

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asn Gly Ile Asn Thr
            20                  25                  30

Leu Asn Trp Leu Gln Gln Lys Pro Gly Lys Ala Ile Lys Arg Leu Ile
        35                  40                  45

Tyr Val Thr Ser Ser Leu Asp Ser Gly Val Pro Lys Arg Phe Ser Gly
    50                  55                  60

Ser Arg Ser Gly Ser Asp Tyr Ser Leu Thr Ile Ser Ser Leu Gln Pro
65                  70                  75                  80

Glu Asp Phe Ala Thr Tyr Tyr Cys Leu Tyr Tyr Ala Ser Tyr Phe Phe
                85                  90                  95

Thr Phe Gly Gln Gly Thr Lys Leu Glu Ile Lys
            100                 105

<210> SEQ ID NO 112
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 112

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Gly Gln Thr
            20                  25                  30

Leu Asn Trp Leu Gln Gln Lys Pro Gly Lys Ala Ile Lys Arg Leu Ile
        35                  40                  45

Tyr Gly Thr Ser Ser Leu Asp Ser Gly Val Pro Lys Arg Phe Ser Gly
    50                  55                  60

```
Ser Arg Ser Gly Ser Asp Tyr Ser Leu Thr Ile Ser Ser Leu Gln Pro
 65                  70                  75                  80

Glu Asp Phe Ala Thr Tyr Tyr Cys Leu Asn Tyr Ile Ser Pro Phe
             85                  90                  95

Thr Phe Gly Gln Gly Thr Lys Leu Glu Ile Lys
            100                 105

<210> SEQ ID NO 113
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 113

Asp Ile Gln Met Thr Gln Ser Pro Ser Ser Leu Ser Ala Ser Val Gly
 1               5                  10                  15

Asp Arg Val Thr Ile Thr Cys Arg Ala Ser Gln Glu Ile Gly Gln Thr
             20                  25                  30

Leu Asn Trp Leu Gln Gln Lys Pro Gly Lys Ala Ile Lys Arg Leu Ile
         35                  40                  45

Tyr Ala Thr Ser Ser Leu Asp Ser Gly Val Pro Lys Arg Phe Ser Gly
 50                  55                  60

Ser Arg Ser Gly Ser Asp Tyr Ser Leu Thr Ile Ser Ser Leu Gln Pro
 65                  70                  75                  80

Glu Asp Phe Ala Thr Tyr Tyr Cys Leu Tyr Tyr Ala Ser Thr Pro Phe
             85                  90                  95

Thr Phe Gly Gln Gly Thr Lys Leu Glu Ile Lys
            100                 105

<210> SEQ ID NO 114
<211> LENGTH: 107
<212> TYPE: PRT
<213> ORGANISM: Artificial sequence
<220> FEATURE:
<223> OTHER INFORMATION: Variable domain of the light chain of the
      antibody I

<400> SEQUENCE: 114

Asp Ile Gln Met Thr Gln Ser Pro Ser Ser Leu Ser Ala Ser Val Gly
 1               5                  10                  15

Asp Arg Val Thr Ile Thr Cys Arg Ala Ser Gln Asn Ile Gly Gln Thr
             20                  25                  30

Leu Asn Trp Leu Gln Gln Lys Pro Gly Lys Ala Ile Lys Arg Leu Ile
         35                  40                  45

Tyr Ser Thr Ser Ser Leu Asp Ser Gly Val Pro Lys Arg Phe Ser Gly
 50                  55                  60

Ser Arg Ser Gly Ser Asp Tyr Ser Leu Thr Ile Ser Ser Leu Gln Pro
 65                  70                  75                  80

Glu Asp Phe Ala Thr Tyr Tyr Cys Leu Gln Tyr Ala Ser Ser Pro Phe
             85                  90                  95

Thr Phe Gly Gln Gly Thr Lys Leu Glu Ile Lys
            100                 105

<210> SEQ ID NO 115
<211> LENGTH: 118
<212> TYPE: PRT
<213> ORGANISM: Artificial sequence
<220> FEATURE:
```

<223> OTHER INFORMATION: Variable domain of the heavy chain of the
      antibody I

<400> SEQUENCE: 115

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Tyr Tyr Phe Tyr Trp
                20                  25                  30

Met His Trp Val Arg Gln Ala Pro Gly Gln Gly Leu Glu Trp Met Gly
            35                  40                  45

Ala Ile Tyr His Ile Asn Ser Asp Thr Ser Tyr Asn Gln Lys Phe Lys
        50                  55                  60

Gly Arg Val Thr Ile Thr Ala Val Thr Ser Ala Ser Thr Ala Tyr Met
65                  70                  75                  80

Glu Leu Ser Ser Leu Arg Ser Glu Asp Thr Ala Val Tyr Tyr Cys Thr
                85                  90                  95

Arg Trp Gly Glu Gly Tyr Tyr His Ala Met Asn His Trp Gly Gln Gly
            100                 105                 110

Thr Leu Val Thr Val Ser
            115

<210> SEQ ID NO 116
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 116

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Phe Thr Ser Tyr Trp
                20                  25                  30

Met His Trp Val Arg Gln Ala Pro Gly Gln Gly Leu Glu Trp Met Gly
            35                  40                  45

Ala Ile Tyr Pro Gly Asn Ser Asp Thr Ser Tyr Asn Gln Lys Phe Lys
        50                  55                  60

Gly Arg Val Thr Ile Thr Ala Val Thr Ser Ala Ser Thr Ala Tyr Met
65                  70                  75                  80

Glu Leu Ser Ser Leu Arg Ser Glu Asp Thr Ala Val Tyr Tyr Cys Thr
                85                  90                  95

Arg Trp Gly Asp Gly Tyr Tyr His Ala Met Asp His Trp Gly Gln Gly
            100                 105                 110

Thr Leu Val Thr Val Ser
            115

<210> SEQ ID NO 117
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 117

Val Gln Leu Val Gln Ser Gly Ala Glu Val Lys Lys Pro Gly Ala Ser
1               5                   10                  15

Val Lys Val Ser Cys Lys Ala Ser Gly Tyr Thr Tyr Tyr Phe Tyr Trp

```
                    20                  25                  30
Met His Trp Val Arg Gln Ala Pro Gly Gln Gly Leu Glu Trp Met Gly
            35                  40                  45
Ala Ile Tyr His Gly Asn Ser Glu Thr Ser Tyr Asn Gln Lys Phe Lys
        50                  55                  60
Gly Arg Val Thr Ile Thr Ala Val Thr Ser Ala Ser Thr Ala Tyr Met
65                  70                  75                  80
Glu Leu Ser Ser Leu Arg Ser Glu Asp Thr Ala Val Tyr Tyr Cys Thr
                85                  90                  95
His Trp Ala Asp Ala Tyr Phe His Gly Met Asn His Trp Gly Gln Gly
            100                 105                 110
Thr Leu Val Thr Val Ser
        115

<210> SEQ ID NO 118
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 118

Val Gln Leu Val Gln Ser Gly Ala Glu Val Lys Lys Pro Gly Ala Ser
1               5                   10                  15
Val Lys Val Ser Cys Lys Ala Ser Gly Tyr Thr Tyr Asn Phe Tyr Trp
            20                  25                  30
Met His Trp Val Arg Gln Ala Pro Gly Gln Gly Leu Glu Trp Met Gly
        35                  40                  45
Ala Ile Tyr His Val Gln Ser Asp Thr Ser Tyr Asn Gln Lys Phe Lys
    50                  55                  60
Gly Arg Val Thr Ile Thr Ala Val Thr Ser Ala Ser Thr Ala Tyr Met
65                  70                  75                  80
Glu Leu Ser Ser Leu Arg Ser Glu Asp Thr Ala Val Tyr Tyr Cys Thr
                85                  90                  95
His Trp Leu Glu Val Tyr Phe His Gly Met Asp His Trp Gly Gln Gly
            100                 105                 110
Thr Leu Val Thr Val Ser
        115

<210> SEQ ID NO 119
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 119

Val Gln Leu Val Gln Ser Gly Ala Glu Val Lys Lys Pro Gly Ala Ser
1               5                   10                  15
Val Lys Val Ser Cys Lys Ala Ser Gly Tyr Thr Phe Thr Ser Tyr Trp
            20                  25                  30
Met His Trp Val Arg Gln Ala Pro Gly Gln Gly Leu Glu Trp Met Gly
        35                  40                  45
Ala Ile Tyr Ala His Ser Glu Thr Ser Tyr Asn Gln Lys Phe Lys
    50                  55                  60
Gly Arg Val Thr Ile Thr Ala Val Thr Ser Ala Ser Thr Ala Tyr Met
```

```
                65                  70                  75                  80
Glu Leu Ser Ser Leu Arg Ser Glu Asp Thr Ala Val Tyr Tyr Cys Thr
                    85                  90                  95

His Trp Leu Glu Val Tyr Phe His Gly Met Asp His Trp Gly Gln Gly
            100                 105                 110

Thr Leu Val Thr Val Ser
        115

<210> SEQ ID NO 120
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 120

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Phe Ser Ser Tyr Trp
            20                  25                  30

Met His Trp Val Arg Gln Ala Pro Gly Gln Gly Leu Glu Trp Met Gly
        35                  40                  45

Ala Ile Tyr Pro Gly Gln Ser Glu Thr Ser Tyr Asn Gln Lys Phe Lys
    50                  55                  60

Gly Arg Val Thr Ile Thr Ala Val Thr Ser Ala Ser Thr Ala Tyr Met
65                  70                  75                  80

Glu Leu Ser Ser Leu Arg Ser Glu Asp Thr Ala Val Tyr Tyr Cys Thr
                85                  90                  95

His Trp Ile Asp Gly Tyr Phe His Val Met Asp His Trp Gly Gln Gly
            100                 105                 110

Thr Leu Val Thr Val Ser
        115

<210> SEQ ID NO 121
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 121

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Phe Thr Thr Tyr Trp
            20                  25                  30

Met His Trp Val Arg Gln Ala Pro Gly Gln Gly Leu Glu Trp Met Gly
        35                  40                  45

Ala Ile Tyr Trp Ala His Ser Glu Thr Ser Tyr Asn Gln Lys Phe Lys
    50                  55                  60

Gly Arg Val Thr Ile Thr Ala Val Thr Ser Ala Ser Thr Ala Tyr Met
65                  70                  75                  80

Glu Leu Ser Ser Leu Arg Ser Glu Asp Thr Ala Val Tyr Tyr Cys Thr
                85                  90                  95

Arg Trp Gly Asp Gly Tyr Tyr His Ala Met Asp His Trp Gly Gln Gly
            100                 105                 110

Thr Leu Val Thr Val Ser
```

```
<210> SEQ ID NO 122
<211> LENGTH: 118
<212> TYPE: PRT
<213> ORGANISM: Artificial sequence
<220> FEATURE:
<223> OTHER INFORMATION: Variable domain of the heavy chain of the
      antibody I

<400> SEQUENCE: 122

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Phe Thr Thr Tyr Trp
            20                  25                  30

Met His Trp Val Arg Gln Ala Pro Gly Gln Gly Leu Glu Trp Met Gly
        35                  40                  45

Ala Ile Tyr Pro Val His Ser Glu Thr Ser Tyr Asn Gln Lys Phe Lys
    50                  55                  60

Gly Arg Val Thr Ile Thr Ala Val Thr Ser Ala Ser Thr Ala Tyr Met
65                  70                  75                  80

Glu Leu Ser Ser Leu Arg Ser Glu Asp Thr Ala Val Tyr Tyr Cys Thr
                85                  90                  95

His Trp Ile Glu Ala Phe Phe His Leu Met Gln His Trp Gly Gln Gly
            100                 105                 110

Thr Leu Val Thr Val Ser
        115

<210> SEQ ID NO 123
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 123

Thr Gln Ser Pro Ser Phe Leu Ser Ala Ser Val Gly Asp Arg Val Thr
1               5                   10                  15

Ile Thr Cys Ser Ala Ser Ser Val Ser Tyr Met His Trp Phe Gln
            20                  25                  30

Gln Lys Pro Gly Lys Ser Pro Lys Leu Trp Ile Tyr Ser Tyr Ser Asn
        35                  40                  45

Leu Ala Ser Gly Val Pro Ala Arg Phe Ser Gly Ser Gly Ser Gly Thr
    50                  55                  60

Ser Tyr Ser Leu Thr Ile Ser Ser Leu Gln Pro Glu Asp Phe Ala Thr
65                  70                  75                  80

Tyr Tyr Cys Gln Asn Arg Thr Ser Phe His Tyr Thr Phe Gly Gln Gly
                85                  90                  95

Thr Lys Leu Glu Ile Lys
        100

<210> SEQ ID NO 124
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 124
```

Thr Gln Ser Pro Ser Phe Leu Ser Ala Ser Val Gly Asp Arg Val Thr
1               5                   10                  15

Ile Thr Cys Ser Ala Ser Ser Val Tyr Tyr Met His Trp Phe Gln
            20                  25                  30

Gln Lys Pro Gly Lys Ser Pro Lys Leu Trp Ile Tyr Ser Thr Ser Asn
            35                  40                  45

Leu Ala Ser Gly Val Pro Ala Arg Phe Ser Gly Ser Gly Ser Gly Thr
        50                  55                  60

Ser Tyr Ser Leu Thr Ile Ser Ser Leu Gln Pro Glu Asp Phe Ala Thr
65                  70                  75                  80

Tyr Tyr Cys Gln Tyr Arg Ser Ser Tyr Trp Thr Phe Gly Gln Gly
                85                  90                  95

Thr Lys Leu Glu Ile Lys
            100

<210> SEQ ID NO 125
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 125

Thr Gln Ser Pro Ser Phe Leu Ser Ala Ser Val Gly Asp Arg Val Thr
1               5                   10                  15

Ile Thr Cys Ser Ala Ser Ser Val Tyr Tyr Met His Trp Phe Gln
            20                  25                  30

Gln Lys Pro Gly Lys Ser Pro Lys Leu Trp Ile Tyr Ser Tyr Ser Asn
            35                  40                  45

Leu Ala Ser Gly Val Pro Ala Arg Phe Ser Gly Ser Gly Ser Gly Thr
        50                  55                  60

Ser Tyr Ser Leu Thr Ile Ser Ser Leu Gln Pro Glu Asp Phe Ala Thr
65                  70                  75                  80

Tyr Tyr Cys Gln Tyr Arg Ser Ser Tyr Pro Tyr Thr Phe Gly Gln Gly
                85                  90                  95

Thr Lys Leu Glu Ile Lys
            100

<210> SEQ ID NO 126
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 126

Thr Gln Ser Pro Ser Phe Leu Ser Ala Ser Val Gly Asp Arg Val Thr
1               5                   10                  15

Ile Thr Cys Ser Ala Ser Ser Ile Ser Tyr Met His Trp Phe Gln
            20                  25                  30

Gln Lys Pro Gly Lys Ser Pro Lys Leu Trp Ile Tyr Ser Thr Ser Asn
            35                  40                  45

Leu Ala Ser Gly Val Pro Ala Arg Phe Ser Gly Ser Gly Ser Gly Thr
        50                  55                  60

Ser Tyr Ser Leu Thr Ile Ser Ser Leu Gln Pro Glu Asp Phe Ala Thr
65                  70                  75                  80

Tyr Tyr Cys Gln Gln Arg Ser Ser Phe Pro Tyr Thr Phe Gly Gln Gly
                85                  90                  95

Thr Lys Leu Glu Ile Lys
            100

<210> SEQ ID NO 127
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 127

Thr Gln Ser Pro Ser Phe Leu Ser Ala Ser Val Gly Asp Arg Val Thr
1               5                   10                  15

Ile Thr Cys Ser Ala Ser Ser Thr Ile Thr Tyr Met His Trp Phe Gln
                20                  25                  30

Gln Lys Pro Gly Lys Ser Pro Lys Leu Trp Ile Tyr Tyr Thr Ser Asn
            35                  40                  45

Leu Ala Ser Gly Val Pro Ala Arg Phe Ser Gly Ser Gly Ser Gly Thr
        50                  55                  60

Ser Tyr Ser Leu Thr Ile Ser Ser Leu Gln Pro Glu Asp Phe Ala Thr
65                  70                  75                  80

Tyr Tyr Cys Gln Asn Arg Thr Ser Phe His Tyr Thr Phe Gly Gln Gly
                85                  90                  95

Thr Lys Leu Glu Ile Lys
            100

<210> SEQ ID NO 128
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 128

Thr Gln Ser Pro Ser Phe Leu Ser Ala Ser Val Gly Asp Arg Val Thr
1               5                   10                  15

Ile Thr Cys Ser Ala Ser Ser Ser Val Ser Tyr Met His Trp Phe Gln
                20                  25                  30

Gln Lys Pro Gly Lys Ser Pro Lys Leu Trp Ile Tyr Ser Thr Ser Asn
            35                  40                  45

Leu Ala Ser Gly Val Pro Ala Arg Phe Ser Gly Ser Gly Ser Gly Thr
        50                  55                  60

Ser Tyr Ser Leu Thr Ile Ser Ser Leu Gln Pro Glu Asp Phe Ala Thr
65                  70                  75                  80

Tyr Tyr Cys Gln Gln Arg Ser Ser Tyr Pro Tyr Thr Phe Gly Gln Gly
                85                  90                  95

Thr Lys Leu Glu Ile Lys
            100

<210> SEQ ID NO 129
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 129

```
Thr Gln Ser Pro Ser Phe Leu Ser Ala Ser Val Gly Asp Arg Val Thr
1               5                   10                  15
Ile Thr Cys Ser Ala Ser Ser Val Ser Tyr Met His Trp Phe Gln
            20                  25                  30
Gln Lys Pro Gly Lys Ser Pro Lys Leu Trp Ile Tyr Ser Thr Ser Asn
        35                  40                  45
Leu Ala Ser Gly Val Pro Ala Arg Phe Ser Gly Ser Gly Ser Gly Thr
    50                  55                  60
Ser Tyr Ser Leu Thr Ile Ser Ser Leu Gln Pro Glu Asp Phe Ala Thr
65                  70                  75                  80
Tyr Tyr Cys Gln Asn Arg Tyr Ser Tyr Pro Tyr Thr Phe Gly Gln Gly
                85                  90                  95
Thr Lys Leu Glu Ile Lys
            100
```

<210> SEQ ID NO 130
<211> LENGTH: 102
<212> TYPE: PRT
<213> ORGANISM: Artificial sequence
<220> FEATURE:
<223> OTHER INFORMATION: Variable domain of the light chain of the antibody II

<400> SEQUENCE: 130

```
Thr Gln Ser Pro Ser Phe Leu Ser Ala Ser Val Gly Asp Arg Val Thr
1               5                   10                  15
Ile Thr Cys Ser Ala Ser Ser Thr Val Tyr Tyr Met His Trp Phe Gln
            20                  25                  30
Gln Lys Pro Gly Lys Ser Pro Lys Leu Trp Ile Tyr Ser Tyr Ser Asn
        35                  40                  45
Leu Ala Ser Gly Val Pro Ala Arg Phe Ser Gly Ser Gly Ser Gly Thr
    50                  55                  60
Ser Tyr Ser Leu Thr Ile Ser Ser Leu Gln Pro Glu Asp Phe Ala Thr
65                  70                  75                  80
Tyr Tyr Cys Gln Gln Arg Ser Ser Tyr His Tyr Thr Phe Gly Gln Gly
                85                  90                  95
Thr Lys Leu Glu Ile Lys
            100
```

<210> SEQ ID NO 131
<211> LENGTH: 102
<212> TYPE: PRT
<213> ORGANISM: Artificial sequence
<220> FEATURE:
<223> OTHER INFORMATION: Variable domain of the light chain of the antibody II

<400> SEQUENCE: 131

```
Thr Gln Ser Pro Ser Phe Leu Ser Ala Ser Val Gly Asp Arg Val Thr
1               5                   10                  15
Ile Thr Cys Ser Ala Ser Ser Ser Ala Ser Tyr Met His Trp Phe Gln
            20                  25                  30
Gln Lys Pro Gly Lys Ser Pro Lys Leu Trp Ile Tyr Ser Tyr Ser Asn
        35                  40                  45
Leu Ala Ser Gly Val Pro Ala Arg Phe Ser Gly Ser Gly Ser Gly Thr
    50                  55                  60
```

```
Ser Tyr Ser Leu Thr Ile Ser Ser Leu Gln Pro Glu Asp Phe Ala Thr
 65                  70                  75                  80

Tyr Tyr Cys Gln Tyr Arg Thr Ser Tyr Pro Tyr Thr Phe Gly Gln Gly
             85                  90                  95

Thr Lys Leu Glu Ile Lys
            100
```

```
<210> SEQ ID NO 132
<211> LENGTH: 102
<212> TYPE: PRT
<213> ORGANISM: Artificial sequence
<220> FEATURE:
<223> OTHER INFORMATION: Variable domain of the light chain of the
      antibody II

<400> SEQUENCE: 132
```

```
Thr Gln Ser Pro Ser Phe Leu Ser Ala Ser Val Gly Asp Arg Val Thr
  1               5                  10                  15

Ile Thr Cys Ser Ala Ser Ser Gly Tyr Tyr Met His Trp Phe Gln
             20                  25                  30

Gln Lys Pro Gly Lys Ser Pro Lys Leu Trp Ile Tyr Thr Thr Ser Asn
            35                  40                  45

Leu Ala Ser Gly Val Pro Ala Arg Phe Ser Gly Ser Gly Ser Gly Thr
 50                  55                  60

Ser Tyr Ser Leu Thr Ile Ser Ser Leu Gln Pro Glu Asp Phe Ala Thr
 65                  70                  75                  80

Tyr Tyr Cys Gln Gln Arg Ser Ser Tyr Pro Tyr Thr Phe Gly Gln Gly
             85                  90                  95

Thr Lys Leu Glu Ile Lys
            100
```

```
<210> SEQ ID NO 133
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 133
```

```
Val Gln Leu Val Gln Ser Gly Ala Glu Val Lys Lys Pro Gly Ala Ser
  1               5                  10                  15

Val Lys Val Ser Cys Lys Ala Ser Gly Tyr Ser Thr Ser Ser Phe Val
             20                  25                  30

Met His Trp Val Arg Gln Ala Pro Gly Gln Gly Leu Glu Trp Met Gly
            35                  40                  45

Tyr Ile Asn Tyr Asn Asp Ala Thr Lys Tyr Asn Glu Lys Phe Lys
 50                  55                  60

Gly Arg Val Thr Ile Thr Ser Asp Lys Ser Ala Ser Thr Ala Tyr Met
 65                  70                  75                  80

Glu Leu Ser Ser Leu Arg Ser Glu Asp Thr Ala Val Tyr Tyr Cys Ala
             85                  90                  95

Trp Ser Gly Ala Ile Phe Glu Tyr Trp Gly Gln Gly Thr Leu Val Thr
            100                 105                 110

Val Ser
```

```
<210> SEQ ID NO 134
<211> LENGTH: 114
<212> TYPE: PRT
```

```
<213> ORGANISM: Artificial sequence
<220> FEATURE:
<223> OTHER INFORMATION: Variable domain of the heavy chain of the
      antibody II

<400> SEQUENCE: 134

Val Gln Leu Val Gln Ser Gly Ala Glu Val Lys Lys Pro Gly Ala Ser
1               5                   10                  15

Val Lys Val Ser Cys Lys Ala Ser Gly Tyr Tyr Thr Ser Ser Pro Val
                20                  25                  30

Met His Trp Val Arg Gln Ala Pro Gly Gln Gly Leu Glu Trp Met Gly
            35                  40                  45

Tyr Ile Asn Tyr Phe Tyr Asp Gly Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Lys Ser Ala Ile Ala Phe Glu Tyr Trp Gly Gln Gly Thr Leu Val Thr
            100                 105                 110

Val Ser

<210> SEQ ID NO 135
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 135

Val Gln Leu Val Gln Ser Gly Ala Glu Val Lys Lys Pro Gly Ala Ser
1               5                   10                  15

Val Lys Val Ser Cys Lys Ala Ser Gly Tyr Tyr Thr Thr Ser Tyr Val
                20                  25                  30

Met His Trp Val Arg Gln Ala Pro Gly Gln Gly Leu Glu Trp Met Gly
            35                  40                  45

Tyr Ile Asn Pro Tyr Tyr Asp Gly Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Arg Ser Gly Gly Ile Phe Asp Tyr Trp Gly Gln Gly Thr Leu Val Thr
            100                 105                 110

Val Ser

<210> SEQ ID NO 136
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 136

Val Gln Leu Val Gln Ser Gly Ala Glu Val Lys Lys Pro Gly Ala Ser
1               5                   10                  15

Val Lys Val Ser Cys Lys Ala Ser Gly Tyr Ser Phe Thr Ser Tyr Val
```

```
                    20                  25                  30

Met His Trp Val Arg Gln Ala Pro Gly Gln Gly Leu Glu Trp Met Gly
            35                  40                  45

Tyr Ile Asn Pro Tyr Asn Asp Gly Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Arg Ser Ile Gly Ile Thr Asp Tyr Trp Gly Gln Gly Thr Leu Val Thr
            100                 105                 110

Val Ser

<210> SEQ ID NO 137
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 137

Val Gln Leu Val Gln Ser Gly Ala Glu Val Lys Lys Pro Gly Ala Ser
1               5                   10                  15

Val Lys Val Ser Cys Lys Ala Ser Gly Tyr Phe Phe Ser Ser Phe Val
                20                  25                  30

Met His Trp Val Arg Gln Ala Pro Gly Gln Gly Leu Glu Trp Met Gly
            35                  40                  45

Tyr Ile Asn Tyr Tyr Asn Asp Ala Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Arg Ser Ala Ala Leu Ser Glu Tyr Trp Gly Gln Gly Thr Leu Val Thr
            100                 105                 110

Val Ser

<210> SEQ ID NO 138
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 138

Val Gln Leu Val Gln Ser Gly Ala Glu Val Lys Lys Pro Gly Ala Ser
1               5                   10                  15

Val Lys Val Ser Cys Lys Ala Ser Gly Tyr Thr Phe Thr Ser Tyr Val
                20                  25                  30

Met His Trp Val Arg Gln Ala Pro Gly Gln Gly Leu Glu Trp Met Gly
            35                  40                  45

Tyr Ile Asn Pro Tyr Asn Asp Gly Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80
```

```
Glu Leu Ser Ser Leu Arg Ser Glu Asp Thr Ala Val Tyr Tyr Cys Ala
                85                  90                  95

Trp Ser Gly Ala Ile Phe Glu Tyr Trp Gly Gln Gly Thr Leu Val Thr
            100                 105                 110

Val Ser
```

<210> SEQ ID NO 139
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 139

```
Val Gln Leu Val Gln Ser Gly Ala Glu Val Lys Lys Pro Gly Ala Ser
1               5                   10                  15

Val Lys Val Ser Cys Lys Ala Ser Gly Tyr Phe Tyr Thr Ser Tyr Val
            20                  25                  30

Met His Trp Val Arg Gln Ala Pro Gly Gln Gly Leu Glu Trp Met Gly
        35                  40                  45

Tyr Ile Asn Pro Phe Gln Asp Ile Thr Lys Tyr Asn Glu Lys Phe Lys
    50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Trp Ser Ala Ala Leu Ser Glu Tyr Trp Gly Gln Gly Thr Leu Val Thr
            100                 105                 110

Val Ser
```

<210> SEQ ID NO 140
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 140

```
Val Gln Leu Val Gln Ser Gly Ala Glu Val Lys Lys Pro Gly Ala Ser
1               5                   10                  15

Val Lys Val Ser Cys Lys Ala Ser Gly Tyr Phe Phe Ser Ser Phe Val
            20                  25                  30

Met His Trp Val Arg Gln Ala Pro Gly Gln Gly Leu Glu Trp Met Gly
        35                  40                  45

Tyr Ile Asn His Phe Gln Asp Ala Thr Lys Tyr Asn Glu Lys Phe Lys
    50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Arg Ser Val Gly Ile Thr Asp Tyr Trp Gly Gln Gly Thr Leu Val Thr
            100                 105                 110

Val Ser
```

<210> SEQ ID NO 141
<211> LENGTH: 114

```
<212> TYPE: PRT
<213> ORGANISM: Artificial sequence
<220> FEATURE:
<223> OTHER INFORMATION: Variable domain of the heavy chain of the
      antibody II

<400> SEQUENCE: 141

Val Gln Leu Val Gln Ser Gly Ala Glu Val Lys Lys Pro Gly Ala Ser
1               5                   10                  15

Val Lys Val Ser Cys Lys Ala Ser Gly Tyr Tyr Thr Ser Ser Pro Val
                20                  25                  30

Met His Trp Val Arg Gln Ala Pro Gly Gln Gly Leu Glu Trp Met Gly
            35                  40                  45

Tyr Ile Asn Pro Tyr Asn Asp Gly Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Lys Ser Gly Gly Ile Ser Asp Tyr Trp Gly Gln Gly Thr Leu Val Thr
                100                 105                 110

Val Ser

<210> SEQ ID NO 142
<211> LENGTH: 114
<212> TYPE: PRT
<213> ORGANISM: Artificial sequence
<220> FEATURE:
<223> OTHER INFORMATION: Variable domain of the heavy chain of the
      antibody II

<400> SEQUENCE: 142

Val Gln Leu Val Gln Ser Gly Ala Glu Val Lys Lys Pro Gly Ala Ser
1               5                   10                  15

Val Lys Val Ser Cys Lys Ala Ser Gly Tyr Tyr Thr Ser Ser Tyr Val
                20                  25                  30

Met His Trp Val Arg Gln Ala Pro Gly Gln Gly Leu Glu Trp Met Gly
            35                  40                  45

Tyr Ile Asn His Phe Gln Asp Ala Thr Lys Tyr Asn Glu Lys Phe Lys
        50                  55                  60

Gly Arg Val Thr Ile Thr Ser Asp Lys Ser Ala Ser Thr Ala Tyr Met
65                  70                  75                  80

Glu Leu Ser Ser Leu Arg Ser Glu Asp Thr Ala Val Tyr Tyr Cys Ala
                85                  90                  95

Trp Ser Gly Ala Ile Phe Glu Tyr Trp Gly Gln Gly Thr Leu Val Thr
                100                 105                 110

Val Ser

<210> SEQ ID NO 143
<211> LENGTH: 107
<212> TYPE: PRT
<213> ORGANISM: Artificial sequence
<220> FEATURE:
<223> OTHER INFORMATION: Constant region of a light chain

<400> SEQUENCE: 143

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
```

```
                    20                  25                  30
Tyr Pro Arg Glu Ala Lys Val Gln Trp Lys Val Asp Asn Ala Leu Gln
            35                  40                  45

Ser Gly Asn Ser Gln Glu Ser Val Thr Glu Gln Asp Ser Lys Asp Ser
 50                  55                  60

Thr Tyr Ser Leu Ser Ser Thr Leu Thr Leu Ser Lys Ala Asp Tyr Glu
 65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
                100                 105

<210> SEQ ID NO 144
<211> LENGTH: 328
<212> TYPE: PRT
<213> ORGANISM: Artificial sequence
<220> FEATURE:
<223> OTHER INFORMATION: Constant region of a heavy chain

<400> SEQUENCE: 144

Ser Ala Ser Thr Lys Gly Pro Ser Val Phe Pro Leu Ala Pro Cys Ser
 1               5                  10                  15

Arg Ser Thr Ser Glu Ser Thr Ala Ala Leu Gly Cys Leu Val Lys Asp
                20                  25                  30

Tyr Phe Pro Glu Pro Val Thr Val Ser Trp Asn Ser Gly Ala Leu Thr
            35                  40                  45

Ser Gly Val His Thr Phe Pro Ala Val Leu Gln Ser Ser Gly Leu Tyr
 50                  55                  60

Ser Leu Ser Ser Val Val Thr Val Pro Ser Ser Ser Leu Gly Thr Lys
 65                  70                  75                  80

Thr Tyr Thr Cys Asn Val Asp His Lys Pro Ser Asn Thr Lys Val Asp
                85                  90                  95

Lys Arg Val Glu Ser Lys Tyr Gly Pro Pro Cys Pro Pro Cys Pro Ala
                100                 105                 110

Pro Glu Phe Leu Gly Gly Pro Ser Val Phe Leu Phe Pro Pro Lys Pro
            115                 120                 125

Lys Asp Thr Leu Met Ile Ser Arg Thr Pro Glu Val Thr Cys Val Val
130                 135                 140

Val Asp Val Ser Gln Glu Asp Pro Glu Val Gln Phe Asn Trp Tyr Val
145                 150                 155                 160

Asp Gly Val Glu Val His Asn Ala Lys Thr Lys Pro Arg Glu Glu Gln
                165                 170                 175

Phe Asn Ser Thr Tyr Arg Val Val Ser Val Leu Thr Val Leu His Gln
                180                 185                 190

Asp Trp Leu Asn Gly Lys Glu Tyr Lys Cys Lys Val Ser Asn Lys Gly
            195                 200                 205

Leu Pro Ser Ser Ile Glu Lys Thr Ile Ser Lys Ala Lys Gly Gln Pro
 210                 215                 220

Arg Glu Pro Gln Val Tyr Thr Leu Pro Pro Ser Gln Glu Glu Met Thr
225                 230                 235                 240

Lys Asn Gln Val Ser Leu Thr Cys Leu Val Lys Gly Phe Tyr Pro Ser
                245                 250                 255

Asp Ile Ala Val Glu Trp Glu Ser Asn Gly Gln Pro Glu Asn Asn Tyr
            260                 265                 270

Lys Thr Thr Pro Pro Val Leu Asp Ser Asp Gly Ser Phe Phe Leu Tyr
```

```
            275                 280                 285
Ser Arg Leu Thr Val Asp Lys Ser Arg Trp Gln Glu Gly Asn Val Phe
        290                 295                 300

Ser Cys Ser Val Met His Glu Ala Leu His Asn His Tyr Thr Gln Lys
305                 310                 315                 320

Ser Leu Ser Leu Ser Leu Gly Lys
                325

<210> SEQ ID NO 145
<211> LENGTH: 6
<212> TYPE: PRT
<213> ORGANISM: Artificial sequence
<220> FEATURE:
<223> OTHER INFORMATION: I-CDR-L1
<220> FEATURE:
<221> NAME/KEY: MISC_FEATURE
<222> LOCATION: (2)..(2)
<223> OTHER INFORMATION: Xaa can be D, E, N, Q
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: MISC_FEATURE
<222> LOCATION: (4)..(4)
<223> OTHER INFORMATION: Xaa can be G, A, V, I, L
<220> FEATURE:
<221> NAME/KEY: MISC_FEATURE
<222> LOCATION: (5)..(5)
<223> OTHER INFORMATION: Xaa can be Q, N

<400> SEQUENCE: 145

Gln Xaa Xaa Xaa Xaa Thr
1               5

<210> SEQ ID NO 146
<211> LENGTH: 9
<212> TYPE: PRT
<213> ORGANISM: Artificial sequence
<220> FEATURE:
<223> OTHER INFORMATION: I-CDR-L3
<220> FEATURE:
<221> NAME/KEY: MISC_FEATURE
<222> LOCATION: (2)..(2)
<223> OTHER INFORMATION: Xaa can be Q, Y, N
<220> FEATURE:
<221> NAME/KEY: MISC_FEATURE
<222> LOCATION: (3)..(3)
<223> OTHER INFORMATION: Xaa can be Q, Y, N
<220> FEATURE:
<221> NAME/KEY: MISC_FEATURE
<222> LOCATION: (4)..(4)
<223> OTHER INFORMATION: Xaa can be G, A, V, I, L
<220> FEATURE:
<221> NAME/KEY: MISC_FEATURE
<222> LOCATION: (6)..(6)
<223> OTHER INFORMATION: Xaa can be S, T, Y
<220> FEATURE:
<221> NAME/KEY: MISC_FEATURE
<222> LOCATION: (7)..(7)
<223> OTHER INFORMATION: Xaa can be F, P

<400> SEQUENCE: 146

Leu Xaa Xaa Xaa Ser Xaa Xaa Phe Thr
1               5

<210> SEQ ID NO 147
<211> LENGTH: 8
<212> TYPE: PRT
<213> ORGANISM: Artificial sequence
<220> FEATURE:
```

```
<223> OTHER INFORMATION: I-CDR-H1
<220> FEATURE:
<221> NAME/KEY: MISC_FEATURE
<222> LOCATION: (3)..(3)
<223> OTHER INFORMATION: S, T
<220> FEATURE:
<221> NAME/KEY: MISC_FEATURE
<222> LOCATION: (4)..(4)
<223> OTHER INFORMATION: F, Y
<220> FEATURE:
<221> NAME/KEY: MISC_FEATURE
<222> LOCATION: (5)..(5)
<223> OTHER INFORMATION: N, S, T, Y, Q
<220> FEATURE:
<221> NAME/KEY: MISC_FEATURE
<222> LOCATION: (6)..(6)
<223> OTHER INFORMATION: S, T, F

<400> SEQUENCE: 147

Gly Tyr Xaa Xaa Xaa Xaa Tyr Trp
1               5

<210> SEQ ID NO 148
<211> LENGTH: 8
<212> TYPE: PRT
<213> ORGANISM: Artificial sequence
<220> FEATURE:
<223> OTHER INFORMATION: I-CDR-H2
<220> FEATURE:
<221> NAME/KEY: MISC_FEATURE
<222> LOCATION: (3)..(3)
<223> OTHER INFORMATION: Xaa can be P, H, W
<220> FEATURE:
<221> NAME/KEY: MISC_FEATURE
<222> LOCATION: (4)..(4)
<223> OTHER INFORMATION: Xaa can be G, A, V, I, L
<220> FEATURE:
<221> NAME/KEY: MISC_FEATURE
<222> LOCATION: (5)..(5)
<223> OTHER INFORMATION: Xaa can be N, Q, H
<220> FEATURE:
<221> NAME/KEY: MISC_FEATURE
<222> LOCATION: (6)..(6)
<223> OTHER INFORMATION: Xaa can be D, E
<220> FEATURE:
<221> NAME/KEY: misc_feature
<222> LOCATION: (7)..(7)
<223> OTHER INFORMATION: Xaa can be any naturally occurring amino acid

<400> SEQUENCE: 148

Ile Tyr Xaa Xaa Xaa Ser Xaa Thr
1               5

<210> SEQ ID NO 149
<211> LENGTH: 13
<212> TYPE: PRT
<213> ORGANISM: Artificial sequence
<220> FEATURE:
<223> OTHER INFORMATION: I-CDR-H3
<220> FEATURE:
<221> NAME/KEY: MISC_FEATURE
<222> LOCATION: (2)..(2)
<223> OTHER INFORMATION: Xaa can be R, H
<220> FEATURE:
<221> NAME/KEY: MISC_FEATURE
<222> LOCATION: (4)..(4)
<223> OTHER INFORMATION: Xaa can be G, A, V, I, L
<220> FEATURE:
<221> NAME/KEY: MISC_FEATURE
<222> LOCATION: (5)..(5)
<223> OTHER INFORMATION: Xaa can be D, E
<220> FEATURE:
<221> NAME/KEY: MISC_FEATURE
<222> LOCATION: (6)..(6)
<223> OTHER INFORMATION: Xaa can be G, A, V, I, L
```

```
<220> FEATURE:
<221> NAME/KEY: MISC_FEATURE
<222> LOCATION: (7)..(7)
<223> OTHER INFORMATION: Xaa can be Y, F
<220> FEATURE:
<221> NAME/KEY: MISC_FEATURE
<222> LOCATION: (8)..(8)
<223> OTHER INFORMATION: Xaa can be Y, F
<220> FEATURE:
<221> NAME/KEY: MISC_FEATURE
<222> LOCATION: (10)..(10)
<223> OTHER INFORMATION: Xaa can be G, A, V, I, L
<220> FEATURE:
<221> NAME/KEY: MISC_FEATURE
<222> LOCATION: (12)..(12)
<223> OTHER INFORMATION: Xaa can be Q, N, D, E

<400> SEQUENCE: 149

Thr Xaa Trp Xaa Xaa Xaa Xaa Xaa His Xaa Met Xaa His
1               5                   10

<210> SEQ ID NO 150
<211> LENGTH: 5
<212> TYPE: PRT
<213> ORGANISM: Artificial sequence
<220> FEATURE:
<223> OTHER INFORMATION: II-CDR-L1
<220> FEATURE:
<221> NAME/KEY: MISC_FEATURE
<222> LOCATION: (2)..(2)
<223> OTHER INFORMATION: Xaa can be S, T
<220> FEATURE:
<221> NAME/KEY: MISC_FEATURE
<222> LOCATION: (3)..(3)
<223> OTHER INFORMATION: Xaa can be G, A, V, I, L
<220> FEATURE:
<221> NAME/KEY: MISC_FEATURE
<222> LOCATION: (4)..(4)
<223> OTHER INFORMATION: Xaa can be Y, T, S

<400> SEQUENCE: 150

Ser Xaa Xaa Xaa Tyr
1               5

<210> SEQ ID NO 151
<211> LENGTH: 9
<212> TYPE: PRT
<213> ORGANISM: Artificial sequence
<220> FEATURE:
<223> OTHER INFORMATION: II-CDR-L3
<220> FEATURE:
<221> NAME/KEY: MISC_FEATURE
<222> LOCATION: (2)..(2)
<223> OTHER INFORMATION: Xaa can be N, Q, Y
<220> FEATURE:
<221> NAME/KEY: MISC_FEATURE
<222> LOCATION: (4)..(4)
<223> OTHER INFORMATION: Xaa can be F, T, S
<220> FEATURE:
<221> NAME/KEY: MISC_FEATURE
<222> LOCATION: (6)..(6)
<223> OTHER INFORMATION: Xaa can be Y, F
<220> FEATURE:
<221> NAME/KEY: MISC_FEATURE
<222> LOCATION: (7)..(7)
<223> OTHER INFORMATION: Xaa can be P, H, W

<400> SEQUENCE: 151

Gln Xaa Arg Xaa Ser Xaa Xaa Tyr Thr
1               5

<210> SEQ ID NO 152
<211> LENGTH: 8
```

```
-continued

<212> TYPE: PRT
<213> ORGANISM: Artificial sequence
<220> FEATURE:
<223> OTHER INFORMATION: II-CDR-H1
<220> FEATURE:
<221> NAME/KEY: MISC_FEATURE
<222> LOCATION: (3)..(3)
<223> OTHER INFORMATION: Xaa can be S, T, Y, F
<220> FEATURE:
<221> NAME/KEY: MISC_FEATURE
<222> LOCATION: (4)..(4)
<223> OTHER INFORMATION: Xaa can be T, Y, F
<220> FEATURE:
<221> NAME/KEY: MISC_FEATURE
<222> LOCATION: (5)..(5)
<223> OTHER INFORMATION: Xaa can be T, S
<220> FEATURE:
<221> NAME/KEY: MISC_FEATURE
<222> LOCATION: (7)..(7)
<223> OTHER INFORMATION: Xaa can be Y, F, P

<400> SEQUENCE: 152

Gly Tyr Xaa Xaa Xaa Ser Xaa Val
1               5

<210> SEQ ID NO 153
<211> LENGTH: 8
<212> TYPE: PRT
<213> ORGANISM: Artificial sequence
<220> FEATURE:
<223> OTHER INFORMATION: II-CDR-H2
<220> FEATURE:
<221> NAME/KEY: MISC_FEATURE
<222> LOCATION: (3)..(3)
<223> OTHER INFORMATION: Xaa can be Y, H, P
<220> FEATURE:
<221> NAME/KEY: MISC_FEATURE
<222> LOCATION: (4)..(4)
<223> OTHER INFORMATION: Xaa can be Y, F
<220> FEATURE:
<221> NAME/KEY: MISC_FEATURE
<222> LOCATION: (5)..(5)
<223> OTHER INFORMATION: Xaa can be Q, N, Y
<220> FEATURE:
<221> NAME/KEY: MISC_FEATURE
<222> LOCATION: (7)..(7)
<223> OTHER INFORMATION: Xaa can be G, A, V, I, L

<400> SEQUENCE: 153

Ile Asn Xaa Xaa Xaa Asp Xaa Thr
1               5

<210> SEQ ID NO 154
<211> LENGTH: 9
<212> TYPE: PRT
<213> ORGANISM: Artificial sequence
<220> FEATURE:
<223> OTHER INFORMATION: II-CDR-H3
<220> FEATURE:
<221> NAME/KEY: MISC_FEATURE
<222> LOCATION: (2)..(2)
<223> OTHER INFORMATION: Xaa can be W, R, K
<220> FEATURE:
<221> NAME/KEY: MISC_FEATURE
<222> LOCATION: (4)..(4)
<223> OTHER INFORMATION: Xaa can be G, A, V, I, L
<220> FEATURE:
<221> NAME/KEY: MISC_FEATURE
<222> LOCATION: (5)..(5)
<223> OTHER INFORMATION: Xaa can be G, A, V, I, L
<220> FEATURE:
<221> NAME/KEY: MISC_FEATURE
<222> LOCATION: (6)..(6)
<223> OTHER INFORMATION: Xaa can be G, A, V, I, L
<220> FEATURE:
```

```
<221> NAME/KEY: MISC_FEATURE
<222> LOCATION: (7)..(7)
<223> OTHER INFORMATION: Xaa can be S, T, F
<220> FEATURE:
<221> NAME/KEY: MISC_FEATURE
<222> LOCATION: (8)..(8)
<223> OTHER INFORMATION: Xaa can be D, E

<400> SEQUENCE: 154

Ala Xaa Ser Xaa Xaa Xaa Xaa Xaa Tyr
1               5
```

ANTI-PD-L1 ANTIBODY, AND PREPARATION METHOD THEREFOR AND APPLICATION THEREOF

TECHNICAL FIELD

The present application belongs to the field of biomedicine and relates to an antibody, a method for preparing the same and a use thereof and, in particular, to an anti-PD-L1 antibody, a method for preparing the same and a use thereof.

REFERENCE TO AN ELECTRONIC SEQUENCE LISTING

The contents of the electronic sequence listing (ThirdSubstituteSequenceListing.txt; Size: 71,035 bytes; and Date of Creation: Jan. 16, 2025) is herein incorporated by reference in its entirety.

BACKGROUND

With the development of biomedical technology, tumor immunotherapy has increasingly prominent advantages. Especially, tumor immunotherapy can activate or induce tumor patients to establish specific immune responses to tumor antigens, clear primary tumor cells, establish an immunological memory and prevent the recurrence and metastasis of tumors. Therefore, tumor immunotherapy and the development of related drugs have become research focuses in recent years.

Tumor immunotherapy is mainly divided into conventional cytokines, polypeptides, immune checkpoint inhibitors and chimeric antigen receptor T (CAR-T) cell therapy. These methods are in essence to indirectly or directly activate human T cells so that the antitumor activity of T cells is exerted and tumor cells are cleared. In an effective tumor immunotherapy process, T cells are firstly activated by antigen recognition signals mediated by T cell receptors (TCRs), and the intensity and quality of T cell responses are fine-tuned by numerous co-stimulatory and co-inhibitory signals, where such inhibitory signals are immune checkpoints. Tumor cells can abnormally upregulate co-inhibitory molecules and ligands associated therewith and inhibit the activation of T cells by use of this mechanism so as to evade immune killing. Blocking immune checkpoints is one of effective strategies for enhancing the activation of T cells and the most popular target for the development of antitumor drugs in recent years. At present, immune checkpoint molecules studied relatively thoroughly in clinics are cytotoxic T-lymphocyte-associated antigen 4 (CTLA-4), programmed cell death-1 (PD-1) and programmed death-ligand 1 (PD-L1), programmed death-ligand 2 (PD-L2).

PD-L1 is an important negative immunomodulatory factor of PD-1, also known as B7 homolog 1 (B7-H1). When PD-L1 acts, the PD-L1 on the surface of tumor cells binds to the PD-1 on the surface of T cells, transmits regulatory signals to the cells, inhibits the activation and proliferation of T cells, and even induces the apoptosis of T cells so that tumor cells evade immunological surveillance and cause immune evasion. Tumor cells can continuously express PD-L1 at a high level and reduce the immune response of the body. Scientists have developed an antibody that blocks the binding of PD-1/PD-L1 to block a PD-1/PD-L1 signaling pathway, activate depleted T cells, enhance an immune response and enhance the control of tumor, which is one of the main mechanisms that mediate tumor immune evasion. Studies have shown that many human tumor cells and tumor-associated antigen-presenting cells express PD-L1 at high levels to evade anti-tumor immune responses. The research and development of drugs that block the PD-1/PD-L1 pathway can provide a new treatment for a variety of cancers and other T cell depletion-related diseases. Therefore, the development of drugs that can block the PD-1/PD-L1 pathway, such as a PD-L1 antibody, can provide a new treatment for a variety of cancers and other related diseases.

Currently, there are five PD-1/PD-L1 antibody drugs approved for marketing by the US FDA, wherein PD-1 antibody drugs include Keytruda (pembrolizumab), Opdivo (nivolumab), and PD-L1 antibodies include Tecentriq (atezolizumab), Bavencio (avelumab) and Imfinzi (durvalumab), etc. Roche's Tecentriq (atezolizumab) in 2016 was approved by the FDA for the treatment of urothelial carcinoma (bladder cancer) as well as for the treatment of non-small cell lung cancer patients who failed targeted drugs and chemotherapy and has become the first PD-L1 inhibitor on the market.

Therefore, a novel anti-PD-L1 antibody that can widen a candidate range of antibody drugs and a method for discovering an antibody through a bioinformatics design, which can greatly shorten an antibody discovery cycle and enhance the hope for treatment of various tumor immune diseases, have a broad application prospect and a huge market value.

SUMMARY

In view of the defects in the existing art and practical requirements, the present application provides an antibody, a method for preparing the same and a use thereof and, in particular, an anti-PD-L1 antibody, a method for preparing the same and a use thereof. An antibody sequence is simulated, analyzed and designed through bioinformatics modeling without complicated and cumbersome immune reactions, and the antibody is designed, transferred into a host cell through molecular biology construction, expressed in the host cell, and purified so that the antibody can be obtained, which is efficient and convenient and has great market value and application prospect.

To achieve the object, the present application adopts technical solutions described below.

In a first aspect, the present application provides an anti-PD-L1 antibody. The antibody includes two types: an antibody I and/or an antibody II.

The antibody I includes a light chain and a heavy chain, and a variable domain of the light chain of the antibody I includes complementarity determining regions (CDRs) I-CDR-L1, I-CDR-L2 and I-CDR-L3, which are selected from the following amino acid sequences, respectively:

I-CDR-L1: $QX_2X_3X_4X_5T$ (SEQ ID NO. 145);
I-CDR-L2: $X_7X_8S$;
I-CDR-L3: $LX_{12}X_{13}X_{14}SX_{16}X_{17}FT$ (SEQ ID NO. 146);
wherein $X_2$=D, E, N, Q, $X_3$=G, A, V, I, L, X4=G, A, V, I, L, $X_5$=Q, N;
$X_7$=G, A, V, I, L, $X_8$=S, T;
$X_{12}$=Q, Y, N, $X_{13}$=Y, F, $X_{14}$=G, A, V, I, L, $X_{16}$=S, T, Y, $X_{17}$=F, P.

I-CDR-L1 refers to CDR1 in the variable domain of the light chain of the antibody I; I-CDR-L2 refers to CDR2 in the variable domain of the light chain of the antibody I; and I-CDR-L3 refers to CDR3 in the variable domain of the light chain of the antibody I.

A variable domain of the heavy chain of the antibody I includes CDRs I-CDR-H1, I-CDR-H2 and I-CDR-H3, which are selected from the following amino acid sequences, respectively:

I-CDR-H1: GYX$_{22}$X$_{23}$X$_{24}$X$_{25}$YW (SEQ ID NO. 147);
I-CDR-H2: IYX$_{30}$X$_{31}$X$_{32}$SX$_{34}$T (SEQ ID NO. 148);
I-CDR-H3: TX$_{37}$WX$_{39}$X$_{40}$X$_{41}$X$_{42}$X$_{43}$HX$_{45}$MX$_{47}$H (SEQ ID NO. 149);
wherein X$_{22}$=S, T, X$_{23}$=F, Y, X$_{24}$=N, S, T, Y, Q, X$_{25}$=S, T, F;
X$_{30}$=P, H, W, X$_{31}$=G, A, V, I, L, X$_{32}$=N, Q, H, X$_{34}$=D, E;
X$_{37}$=R, H, X$_{39}$=G, A, V, I, L, X$_{40}$=D, E, X$_{41}$=G, A, V, I, L, X$_{42}$=Y, F, X$_{43}$=Y, F, X$_{45}$=G, A, V, I, L, X$_{47}$=Q, N, D, E.

I-CDR-H1 refers to CDR1 in the variable domain of the heavy chain of the antibody I; I-CDR-H2 refers to CDR2 in the variable domain of the heavy chain of the antibody I; and I-CDR-H3 refers to CDR3 in the variable domain of the heavy chain of the antibody I.

The antibody II includes a light chain and a heavy chain, wherein, a variable domain of the light chain of the antibody II includes CDRs II-CDR-L1, II-CDR-L2 and II-CDR-L3, which are selected from the following amino acid sequences, respectively:

II-CDR-L1: SX$_{52}$X$_{53}$X$_{54}$Y (SEQ ID NO. 150);
II-CDR-L2: X$_{56}$X$_{57}$S;
II-CDR-L3: QX$_{60}$RX$_{62}$SX$_{64}$X$_{65}$YT (SEQ ID NO. 151);
wherein X$_{52}$=S, T, X$_{53}$=G, A, V, I, L, X$_{54}$=Y, T, S;
X$_{56}$=Y, T, S, X$_{57}$=Y, T, S;
X$_{60}$=N, Q, Y, X$_{62}$=F, T, S, X$_{64}$=Y, F, X$_{65}$=P, H, W.

II-CDR-L1 refers to CDR1 in the variable domain of the light chain of the antibody II; II-CDR-L2 refers to CDR2 in the variable domain of the light chain of the antibody II; and II-CDR-L3 refers to CDR3 in the variable domain of the light chain of the antibody II.

A variable domain of the heavy chain of the antibody II includes CDRs II-CDR-H1, II-CDR-H2 and II-CDR-H3, which are selected from the following amino acid sequences, respectively:

II-CDR-H1: GYX$_{70}$X$_{71}$X$_{72}$SX$_{74}$V (SEQ ID NO. 152);
II-CDR-H2: INX$_{77}$X$_{78}$X$_{79}$DX$_{81}$T (SEQ ID NO. 153);
II-CDR-H3: AX$_{84}$SX$_{86}$X$_{87}$X$_{88}$X$_{89}$X$_{90}$Y (SEQ ID NO. 154);
wherein X$_{70}$=S, T, Y, F, X$_{71}$=T, Y, F, X$_{72}$=T, S, X$_{74}$=Y, F, P;
X$_{77}$=Y, H, P, X$_{78}$=Y, F, X$_{79}$=Q, N, Y, X$_{81}$=G, A, V, I, L;
X$_{84}$=W, R, K, X$_{86}$=G, A, V, I, L, X$_{87}$=G, A, V, I, L, X$_{88}$=G, A, V, I, L, X$_{89}$=S, T, F, X$_{90}$=D, E.

Unless otherwise specified, D, E, N, Q, G, A, V, I, L, S, T, Y, F, P, H, W, R, etc. are the abbreviations of amino acids commonly used in the art.

II-CDR-H1 refers to CDR1 in the variable domain of the heavy chain of the antibody II; II-CDR-H2 refers to CDR2 in the variable domain of the heavy chain of the antibody II; and II-CDR-H3 refers to CDR3 in the variable domain of the heavy chain of the antibody II.

The CDR I-CDR-L1 in the variable domain of the light chain of the antibody I includes one of amino acid sequences SEQ ID NO. 17, 18, 19, 20, 21, 22, 23, 24.

Preferably, the CDR I-CDR-L1 in the variable domain of the light chain of the antibody I includes one of amino acid sequences SEQ ID NO. 18, 19, 21, 23.

Preferably, the CDR I-CDR-L2 in the variable domain of the light chain of the antibody I includes one of amino acid sequences SEQ ID NO. 25, 26, 27, 28, 29, 30.

Preferably, the CDR I-CDR-L2 in the variable domain of the light chain of the antibody I includes one of amino acid sequences SEQ ID NO. 25, 26, 29, 30.

Preferably, the CDR I-CDR-L3 in the variable domain of the light chain of the antibody I includes one of amino acid sequences SEQ ID NO. 31, 32, 33, 34, 35, 36, 37, 38.

Preferably, the CDR I-CDR-L3 in the variable domain of the light chain of the antibody I includes one of amino acid sequences SEQ ID NO. 33, 34, 36, 38.

Preferably, the CDR I-CDR-H1 in the variable domain of the heavy chain of the antibody I includes one of amino acid sequences SEQ ID NO. 39, 40, 41, 42, 43, 44, 45.

Preferably, the CDR I-CDR-H1 in the variable domain of the heavy chain of the antibody I includes one of amino acid sequences SEQ ID NO. 40, 42, 43, 44, 45.

Preferably, the CDR I-CDR-H1 in the variable domain of the heavy chain of the antibody I includes one of amino acid sequences SEQ ID NO. 40, 42, 44, 45.

Preferably, the CDR I-CDR-H2 in the variable domain of the heavy chain of the antibody I includes one of amino acid sequences SEQ ID NO. 46, 47, 48, 49, 50, 51, 52.

Preferably, the CDR I-CDR-H2 in the variable domain of the heavy chain of the antibody I includes one of amino acid sequences SEQ ID NO. 46, 48, 49, 51.

Preferably, the CDR I-CDR-H3 in the variable domain of the heavy chain of the antibody I includes one of amino acid sequences SEQ ID NO. 53, 54, 55, 56, 57, 58, 59, 60, 61, 62.

Preferably, the CDR I-CDR-H3 in the variable domain of the heavy chain of the antibody I includes one of amino acid sequences SEQ ID NO. 53, 54, 57, 59, 62.

Preferably, the CDR I-CDR-H3 in the variable domain of the heavy chain of the antibody I includes one of amino acid sequences SEQ ID NO. 54, 57, 59, 62.

Preferably, the CDRs I-CDR-L1, I-CDR-L2 and I-CDR-L3 in the variable domain of the light chain of the antibody I include one of the following combinations of amino acid sequences, respectively:

SEQ ID NO. 17, 26 and 38; SEQ ID NO. 17, 24 and 35; SEQ ID NO. 19, 26 and 31; SEQ ID NO. 19, 29 and 34; SEQ ID NO. 20, 30 and 32; SEQ ID NO. 21, 30 and 32; SEQ ID NO. 23, 25 and 33; SEQ ID NO. 22, 29 and 38; SEQ ID NO. 22, 30 and 34; SEQ ID NO. 21, 28 and 33; SEQ ID NO. 24, 27 and 36; SEQ ID NO. 18, 29 and 37; SEQ ID NO. 21, 25 and 38; SEQ ID NO. 18, 25 and 34; SEQ ID NO. 18, 28 and 33; SEQ ID NO. 23, 30 and 35; SEQ ID NO. 23, 29 and 38.

Preferably, the CDRs I-CDR-H1, I-CDR-H2 and I-CDR-H3 in the variable domain of the heavy chain of the antibody I include one of the following combinations of amino acid sequences, respectively:

SEQ ID NO. 40, 52 and 53; SEQ ID NO. 42, 47 and 54; SEQ ID NO. 45, 49 and 55; SEQ ID NO. 45, 48 and 59; SEQ ID NO. 39, 51 and 55; SEQ ID NO. 43, 47 and 58; SEQ ID NO. 42, 49 and 56; SEQ ID NO. 41, 50 and 60; SEQ ID NO. 44, 48 and 62; SEQ ID NO. 40, 52 and 61; SEQ ID NO. 43, 51 and 57; SEQ ID NO. 45, 52 and 56; SEQ ID NO. 44, 46 and 57; SEQ ID NO. 42, 46 and 57; SEQ ID NO. 43, 48 and 62; SEQ ID NO. 42, 50 and 54; SEQ ID NO. 45, 46 and 61.

Preferably, amino acid sequences of the CDRs of the light chain and/or the heavy chain of the antibody I include those having 85%, 88%, 90%, 91%, 92%, 93%, 94%, 95%, 96%, 97%, 98%, 99% or more homology to the amino acid sequences of the CDRs of the light chain and/or the heavy chain of the antibody I and those functionally identical or similar to the amino acid sequences shown for the antibody I.

Wherein, a homologous amino acid sequence includes a sequence having an identity of 85-100% with the amino acid sequence of the antibody.

Preferably, an amino acid sequence of the variable domain of the light chain of the antibody I includes one of amino acid sequences SEQ ID NO. 107 to SEQ ID NO. 114.

Preferably, an amino acid sequence of the variable domain of the heavy chain of the antibody I includes one of amino acid sequences SEQ ID NO. 115 to SEQ ID NO. 122.

Preferably, the amino acid sequences of the CDRs of the light chain and/or the heavy chain of the antibody I include those obtained through substitutions, deletions or additions of one amino acid or a plurality of amino acids and those functionally identical or similar to the amino acid sequences of the CDRs of the light chain and/or the heavy chain shown for the antibody I.

Preferably, the plurality of amino acids are two, three, four, five, six, seven, eight, nine, ten, eleven or twelve amino acids.

Preferably, the CDR II-CDR-L1 of the light chain of the antibody II includes one of amino acid sequences SEQ ID NO. 63, 64, 65, 66, 67, 68.

Preferably, the CDR II-CDR-L1 of the light chain of the antibody II includes one of amino acid sequences SEQ ID NO. 63, 64, 65, 67.

Preferably, the CDR II-CDR-L2 of the light chain of the antibody II includes one of amino acid sequences SEQ ID NO. 69, 70, 71, 72.

Preferably, the CDR II-CDR-L2 of the light chain of the antibody II includes one of amino acid sequences SEQ ID NO. 69, 70, 72.

Preferably, the CDR II-CDR-L3 of the light chain of the antibody II includes one of amino acid sequences SEQ ID NO. 73, 74, 75, 76, 77, 78, 79, 80, 81.

Preferably, the CDR II-CDR-L3 of the light chain of the antibody II includes one of amino acid sequences SEQ ID NO. 76, 77, 78, 79, 80, 81.

Preferably, the CDR II-CDR-H1 of the heavy chain of the antibody II includes one of amino acid sequences SEQ ID NO. 82, 83, 84, 85, 86, 87, 88.

Preferably, the CDR II-CDR-H1 of the heavy chain of the antibody II includes one of amino acid sequences SEQ ID NO. 82, 83, 86, 88.

Preferably, the CDR II-CDR-H2 of the heavy chain of the antibody II includes one of amino acid sequences SEQ ID NO. 89, 90, 91, 92, 93, 94, 95.

Preferably, the CDR II-CDR-H2 of the heavy chain of the antibody II includes one of amino acid sequences SEQ ID NO. 89, 90, 91, 93.

Preferably, the CDR II-CDR-H3 of the heavy chain of the antibody II includes one of amino acid sequences SEQ ID NO. 96, 97, 98, 99, 100, 101, 102, 103, 104.

Preferably, the CDR II-CDR-H3 of the heavy chain of the antibody II includes one of amino acid sequences SEQ ID NO. 96, 98, 99, 102.

Preferably, the CDRs II-CDR-L1, II-CDR-L2 and II-CDR-L3 of the light chain of the antibody II include one of the following combinations of amino acid sequences, respectively:

SEQ ID NO. 63, 69 and 76; SEQ ID NO. 64, 70 and 81; SEQ ID NO. 65, 71 and 77; SEQ ID NO. 68, 70 and 73; SEQ ID NO. 67, 72 and 76; SEQ ID NO. 66, 72 and 80; SEQ ID NO. 64, 72 and 77; SEQ ID NO. 67, 72 and 81; SEQ ID NO. 63, 70 and 79; SEQ ID NO. 63, 70 and 74; SEQ ID NO. 64, 69 and 75; SEQ ID NO. 67, 72 and 78; SEQ ID NO. 63, 70 and 80; SEQ ID NO. 66, 69 and 78; SEQ ID NO. 65, 71 and 79.

Preferably, the CDRs II-CDR-H1, II-CDR-H2 and II-CDR-H3 of the heavy chain of the antibody II include one of the following combinations of amino acid sequences, respectively:

SEQ ID NO. 82, 89 and 96; SEQ ID NO. 83, 90 and 98; SEQ ID NO. 84, 95 and 103; SEQ ID NO. 85, 91 and 97; SEQ ID NO. 88, 92 and 102; SEQ ID NO. 86, 91 and 99; SEQ ID NO. 87, 94 and 100; SEQ ID NO. 88, 93 and 101; SEQ ID NO. 88, 90 and 99; SEQ ID NO. 83, 91 and 99; SEQ ID NO. 82, 93 and 102; SEQ ID NO. 86, 95 and 98; SEQ ID NO. 86, 91 and 104; SEQ ID NO. 82, 89 and 102; SEQ ID NO. 84, 93 and 96.

Preferably, amino acid sequences of the CDRs of the light chain and/or the heavy chain of the antibody II include those having 85%, 88%, 90%, 91%, 92%, 93%, 94%, 95%, 96%, 97%, 98%, 99% or more homology to the amino acid sequences of the CDRs of the light chain and/or the heavy chain of the antibody II and those functionally identical or similar to the amino acid sequences shown for the antibody II.

Wherein, a homologous amino acid sequence includes a sequence having an identity of 85-100% with the amino acid sequence of the antibody.

Preferably, an amino acid sequence of the variable domain of the light chain of the antibody II includes one of SEQ ID NO. 123 to SEQ ID NO. 132.

Preferably, an amino acid sequence of the variable domain of the heavy chain of the antibody II includes one of SEQ ID NO. 133 to SEQ ID NO. 142.

Preferably, the amino acid sequences of the CDRs of the light chain and/or the heavy chain of the antibody II include those obtained through substitutions, deletions or additions of one amino acid or a plurality of amino acids and those functionally identical or similar to the amino acid sequences shown for the antibody II.

Preferably, the plurality of amino acids are two, three, four, five, six, seven, eight, nine, ten, eleven or twelve amino acids.

In the present application, inventors extract structure data of known antibodies from a protein structure database, classify the data by CDRs, construct a structure database after clustering according to characteristics, and acquire an optimal antibody sequence through molecular docking of an antigen with the database and other methods. An antibody sequence is simulated, analyzed and designed through bioinformatics modeling without complicated and cumbersome immune reactions, and the antibody is designed, transferred into a host cell through molecular biology construction, expressed in the host cell, and purified so that the antibody can be obtained. The antibody is an antibody sequence designed based on bioinformatics modeling to simulate the antibody structure targets, and the antibody is expressed through an artificial synthesis.

Preferably, a framework region in the variable domain of the light chain of the antibody I is selected from the following sequences:

```
I-FR-L1: SEQ ID NO. 1:
DIQMTQSPSSLSASVGDRVTITCRAS.

I-FR-L2: SEQ ID NO. 2:
LNWLQQKPGKAIKRLIY.

I-FR-L3: SEQ ID NO. 3:
SLDSGVPKRFSGSRSGSDYSLTISSLQPEDFATYYC.

I-FR-L4: SEQ ID NO. 4:
FGQGTKLEIK.
```

Preferably, a framework region in the variable domain of the heavy chain of the antibody I is selected from the following sequences:

I-FR-H1: SEQ ID NO. 5:
VQLVQSGAEVKKPGASVKVSCKAS.

I-FR-H2: SEQ ID NO. 6:
MHWVRQAPGQGLEWMGA.

I-FR-H3: SEQ ID NO. 7:
SYNQKFKGRVTITAVTSASTAYMELSSLRSEDTAVYYC.

I-FR-H4: SEQ ID NO. 8:
WGQGTLVTVS.

Preferably, a framework region in the variable domain of the light chain of the antibody II is selected from the following sequences:

II-FR-L1: SEQ ID NO. 9:
TQSPSFLSASVGDRVTITCSAS.

II-FR-L2: SEQ ID NO. 10:
MHWFQQKPGKSPKLWIY.

II-FR-L3: SEQ ID NO. 11:
NLASGVPARFSGSGSGTSYSLTISSLQPEDFATYYC.

II-FR-L4: SEQ ID NO. 12:
FGQGTKLEIK.

Preferably, a framework region in the variable domain of the heavy chain of the antibody II is selected from the following sequences:

II-FR-H1: SEQ ID NO. 13:
VQLVQSGAEVKKPGASVKVSCKAS.

II-FR-H2: SEQ ID NO. 14:
MHWVRQAPGQGLEWMGY.

II-FR-H3: SEQ ID NO. 15:
KYNEKFKGRVTITSDKSASTAYMELSSLRSEDTAVYYC.

II-FR-H4: SEQ ID NO. 16:
WGQGTLVTVS.

Preferably, the antibody further includes a human constant region.

Preferably, the human constant region includes any one or a combination of at least two of IgG1, IgG2, IgG3 or IgG4, preferably IgG1 and IgG4.

Preferably, the antibody further includes a murine constant region.

Preferably, the murine constant region includes any one or a combination of at least two of IgG1, IgG2A, IgG2B or IgG3, preferably IgG2A.

Preferably, the antibody is modified by glycosylation.

Preferably, the antibody includes any one or a combination of at least two of a monoclonal antibody, a polyclonal antibody, an antibody fragment, a bispecific antibody, a trispecific antibody, a tetraspecific antibody or an antibody variant.

In a second aspect, the present application provides a nucleic acid for encoding the antibody described in the first aspect.

In a third aspect, the present application provides a vector including the nucleic acid described in the second aspect.

In a fourth aspect, the present application provides a host cell including the nucleic acid described in the second aspect and/or the vector described in the third aspect, where the host cell expresses the antibody described in the first aspect.

Preferably, the host cell is a eukaryotic cell and/or a prokaryotic cell.

Preferably, the eukaryotic cell is a mammalian cell, further preferably any one or a combination of at least two of human embryonic kidney (HEK) 293 cells, simian COS cells, myeloma cells or Chinese hamster ovary cells.

Preferably, the prokaryotic cell includes any one or a combination of at least two of *E. coli, B. subtilis, P. aeruginosa* or *Salmonella typhimurium*.

Specifically, the selection of vectors and host cells may be, for example, prokaryotic vectors and prokaryotic host cells.

The functional components of the prokaryotic vector include, but are not limited to, an origin of replication, a selective marker gene, a promoter, a ribosome binding site (RBS), a signal sequence, a heterologous nucleic acid insert and a transcription termination sequence.

A prokaryotic expression host cell includes Archaebacteria and Eubacteria, such as gram-negative or gram-positive bacteria. Examples of useful bacteria include *Escherichia* (such as *E. coli*), Bacilli (such as *B. subtilis*), Enterobacteria, *Pseudomonas* species (such as *P. aeruginosa*), *Salmonella typhimurium*, *Serratia marcescans*, *Klebsiella*, *Proteus*, *Shigella*, *Rhizobia*, *Vitreoscilla* or *Paracoccus*. In one embodiment, gram-negative cells are used.

In a specific embodiment, *Escherichia coli* cells are used as a host of the present application. When plasmids such as pBR322, pBR325, pACYC177 or pKN410 are used as replicons, *Escherichia coli*, *Serratia*, *Salmonella* and other species may be used as the host cell.

In particular, the prokaryotic host cell should secrete a minimal amount of proteolytic enzymes. Proteolytic enzyme deficient strains may be constructed as host cells. A protease inhibitor may also be added during cell culture to prevent hydrolysis of the expressed antibody.

Specifically, the selection of vectors and host cells may be, for example, eukaryotic vectors and host cells.

A eukaryotic expression vector typically includes any one or a combination of at least two of a signal sequence, an origin of replication, a marker gene, an enhancer element, a promoter and a transcription termination sequence.

Signal sequence component: A vector used in a eukaryotic host may also include an encoding signal sequence at an N-terminus of a mature protein or a polypeptide or have an insertion of another polypeptide with specific cleavage sites, and a preferentially selected heterologous signal sequence is recognized and processed by a host cell (that is, cleaved by a signal peptidase). During an expression in the mammalian cell, a mammalian signal sequence and a viral secretory precursor, such as herpes simplex virus gD signals, may be used for linking DNAs of such precursor regions to a reading frame of DNAs for encoding the antibody of the present application.

Selectable marker gene: Expression and cloning vectors may include selectable marker genes that confer resistance to antibiotics or other toxins, such as ampicillin, neomycin, methotrexate or tetracycline; supplement the corresponding nutritional defects; provide critical nutrients that cannot be obtained from a complex medium, such as genes for encoding D-alanine racemase of Bacilli.

Promoter: Expression and cloning vectors typically include promoters recognized by host organisms and operably linked to nucleic acids for encoding the required antibody sequence. All eukaryotic genes have an AT-rich region located about 25 to 30 bases upstream of a transcription initiation site. Another sequence found 70 to 80 bases upstream of transcription start sites of many genes is a CNCAAT region, wherein N may be any nucleotide. An AATAAA sequence is located at a 3'-terminus of most eukaryotes and may be a signal for adding a polyA tail to the 3'-terminus of an encoding sequence. All these sequences may be inserted into a eukaryotic expression vector.

Other promoters suitable for eukaryotic hosts include a phoA promoter, a lactamase and lactose promoter system, an alkaline phosphatase promoter, a tryptophan (trp) promoter system and a heterozygous promoter such as a tac promoter. However, other known bacterial promoters are also suitable, and a promoter used in a bacterial system will also contain a Shine-Dalgarno (S.D.) sequence operably linked to DNAs for encoding antibody polypeptides.

The transcription of antibody polypeptides by vectors in mammalian host cells is controlled by, for example, promoters obtained from the genome of viruses (polyomavirus, fowlpox virus, adenovirus, bovine papillomavirus, avian sarcoma virus, cytomegalovirus, retrovirus, hepatitis B virus and simian virus 40 (SV40)), promoters from heterologous mammals (such as actin promoters or immunoglobulin promoters) and heat shock promoters, which need to be well compatible with a host cell system.

Enhancer: The insertion of an enhancer sequence into the vector can enhance the transcription of DNAs encoding the antibody in higher eukaryotic cells. Generally, enhancers from eukaryotic viruses are used, such as an enhancer at the late side of the origin of replication of SV40 (bp 100-270), an early promoter enhancer of cytomegalovirus, an enhancer at the late side of the origin of replication of polyomavirus and an adenovirus enhancer.

Terminator: An expression vector used in the eukaryotic host cell (yeast, fungi, insects, plants, animals, humans or nucleated cells from other multicellular organisms) further includes a sequence necessary for terminating transcription and stabilizing mRNAs, where these regions include nucleotide fragments transcribed into polyadenylated fragments in an untranslated region of mRNAs for encoding the antibody.

In a fifth aspect, the present application provides a method for preparing the antibody described in the first aspect, comprising the following steps:
(1) designing a sequence of the antibody described in the first aspect;
(2) selecting a host cell and constructing a vector containing the antibody sequence obtained in step (1);
(3) transforming or transfecting the vector obtained in step (2) into the host cell for expression; and
(4) isolating and purifying an antibody expressed in step (3).

Preferably, a method for designing the antibody sequence in step (1) includes the following steps:
(1') antigen structure modeling: determining a homologous region of a protein sequence through multiple sequence alignment between a target antigen protein chain and a protein chain in a protein data bank;
(2') antibody structure modeling: generating an optimized homologous model of the antibody by a homology modeling method through alignment of a sequence having an unknown structure with the antibody having a known three-dimensional structure, performing loop region modeling and structure-based alignment, and constructing a structural model of the antibody;
(3') antigen and antibody structures optimizing: endowing a simulation system with a force field parameter, checking initial structure and preprocessing, and minimizing initial structural energy; and
(4') antigen and antibody docking: searching for and optimizing conformation in combination with a genetic algorithm, finding a best antibody binding pattern, calculating the binding pattern and affinity, and obtaining a best antibody sequence through a scoring function.

Specifically, the antibody sequence is designed by steps described below.

Through bioinformatics modeling analysis, an antibody structure is designed, and a series of antibody sequences are designed, where a variable region of the antibody is composed of FR1-CDR1-FR2-CDR2-FR3-CDR3-FR4. Two types of antibody are designed: an antibody I and an antibody II. Some amino acid sequences of the antibody I, the antibody II and positive control respectively include sequences in Table 1, Table 2 and Table 3. Amino acid sequences of constant regions of the antibody I, the antibody II and a positive control antibody are selected from Table 4. Sequences of FRs in the variable domains of the antibodies are selected from Table 5. Tables 1 to 5 are provided in examples.

Two types of antibody, the antibody I and the antibody II, are designed by this method. The antibody I has a very strong ability to bind to a human PD-L1 antigen and has the same antigen binding epitope as the positive control antibody. The antibody II has a relatively strong ability to bind to the human PD-L1 antigen and has different antigen binding epitopes from the positive control antibody.

The "positive control" antibody herein refers to an anti-PD-L1 antibody disclosed by F. Hoffmann-La Roche Ltd. A sequence of a variable domain of a light chain and a sequence of a variable domain of a heavy chain of the positive control antibody are respectively as shown in SEQ ID NO. 105 and SEQ ID NO. 106 in Table 3, and sequences of constant regions of the light chain and the heavy chain are respectively as shown in SEQ ID NO. 143 and SEQ ID NO. 144 in Table 4. Specifically, the selection of vectors and host cells may be, for example, prokaryotic vectors and prokaryotic host cells.

The functional components of the prokaryotic vector include, but are not limited to, an origin of replication, a selective marker gene, a promoter, a ribosome binding site (RBS), a signal sequence, a heterologous nucleic acid insert and a transcription termination sequence.

A prokaryotic expression host cell includes Archaebacteria and Eubacteria, such as gram-negative or gram-positive bacteria. Examples of useful bacteria include *Escherichia* (such as *E. coli*), Bacilli (such as *B. subtilis*), Enterobacteria, *Pseudomonas* species (such as *P. aeruginosa*), *Salmonella typhimurium, Serratia marcescans, Klebsiella, Proteus, Shigella, Rhizobia, Vitreoscilla* or *Paracoccus*. In one embodiment, gram-negative cells are used.

In one embodiment, *Escherichia coli* cells are used as a host of the present application. When plasmids such as pBR322, pBR325, pACYC177 or pKN410 are used as replicons, *Escherichia coli, Serratia, Salmonella* and other species may be used as the host cell.

In particular, the prokaryotic host cell should secrete a minimal amount of proteolytic enzymes. Proteolytic enzyme deficient strains may be constructed as host cells. A protease inhibitor may also be added during cell culture to prevent hydrolysis of the expressed antibody.

Specifically, the selection of vectors and host cells may be, for example, eukaryotic vectors and host cells.

A eukaryotic expression vector typically includes any one or a combination of at least two of a signal sequence, an origin of replication, a marker gene, an enhancer element, a promoter and a transcription termination sequence.

Signal sequence component: A vector used in a eukaryotic host may also include an encoding signal sequence at an N-terminus of a mature protein or a polypeptide or have an insertion of another polypeptide with specific cleavage sites, and a preferentially selected heterologous signal sequence is recognized and processed by a host cell (that is, cleaved by a signal peptidase). During expression in the mammalian cell, a mammalian signal sequence and a viral secretory precursor, such as herpes simplex virus gD signals, may be used for linking DNAs of such precursor regions to a reading frame of DNAs for encoding the antibody of the present application.

Selectable marker gene: Expression and cloning vectors may include selectable marker genes that confer resistance to antibiotics or other toxins, such as ampicillin, neomycin, methotrexate or tetracycline; supplement the corresponding nutritional defects; provide critical nutrients that cannot be obtained from a complex medium, such as genes for encoding D-alanine racemase of Bacilli.

Promoter: Expression and cloning vectors typically include promoters recognized by host organisms and operably linked to nucleic acids for encoding the required antibody sequence. All eukaryotic genes have an AT-rich region located about 25 to 30 bases upstream of a transcription initiation site. Another sequence found 70 to 80 bases upstream of transcription start sites of many genes is a CNCAAT region, wherein N may be any nucleotide. An AATAAA sequence is located at a 3'-terminus of most eukaryotes and may be a signal for adding a polyA tail to the 3'-terminus of an encoding sequence. All these sequences may be inserted into a eukaryotic expression vector.

Other promoters suitable for eukaryotic hosts include a phoA promoter, a lactamase and lactose promoter system, an alkaline phosphatase promoter, a tryptophan (trp) promoter system and a heterozygous promoter such as a tac promoter. However, other known bacterial promoters are also suitable, and a promoter used in a bacterial system will also contain a Shine-Dalgarno (S.D.) sequence operably linked to DNAs for encoding antibody polypeptides.

The transcription of antibody polypeptides by vectors in mammalian host cells is controlled by, for example, promoters obtained from the genome of viruses (polyomavirus, fowlpox virus, adenovirus, bovine papillomavirus, avian sarcoma virus, cytomegalovirus, retrovirus, hepatitis B virus and simian virus 40 (SV40)), promoters from heterologous mammals (such as actin promoters or immunoglobulin promoters) and heat shock promoters, which need to be well compatible with a host cell system.

Enhancer: The insertion of an enhancer sequence into the vector can enhance the transcription of DNAs encoding the antibody in higher eukaryotic cells. Generally, enhancers from eukaryotic viruses are used, such as an enhancer at the late side of the origin of replication of SV40 (bp 100-270), an early promoter enhancer of cytomegalovirus, an enhancer at the late side of the origin of replication of polyomavirus and an adenovirus enhancer.

Terminator: An expression vector used in the eukaryotic host cell (yeast, fungi, insects, plants, animals, humans or nucleated cells from other multicellular organisms) further includes a sequence necessary for terminating transcription and stabilizing mRNAs, where these regions include nucleotide fragments transcribed into polyadenylated fragments in an untranslated region of mRNAs for encoding the antibody.

The host cell, especially a vertebrate host cell, is cultured according to a conventional process of culturing higher eukaryotic cell tissues for selection and transformation. For example, examples of mammalian host cell lines include a SV40 transformed monkey kidney CV1 line (COS-7, ATCC CRL 1651), a human embryonic kidney line (293 cells or 293 cells subcloned for suspension culture), young hamster kidney cells (BHK, ATCC CCL 10), Chinese hamster ovary cells/-DHFR, mouse sertoli cells, monkey kidney cells (CV1, ATCC CCL 70), African green monkey kidney cells (VERO-76, ATCC CRL 1587), human cervical cancer cells (HELA, ATCC CCL 2), canine kidney cells (MDCK, ATCC CCL 34), bovine mouse hepatocytes (BRL 3A, ATCC CRL 1442), human lung cells (W138, ATCC CCL 75), human hepatocytes (Hep G2, HB 8065), mouse mammary tumor cells (MMT 060562, ATCC CCL 51), TRI cells, MRC 5 cells, FS4 cells and human hepatocytes.

Specifically, the vector is constructed by steps described below.

A series of amino acid sequences designed for the antibody are transformed into corresponding nucleic acid sequences, a nucleic acid fragment is synthesized by a conventional artificial gene synthesis method, and a DNA fragment obtained through amplification is linked to or transformed into a vector, so as to obtain the vector containing the DNA fragment corresponding to the antibody sequence.

Specifically, the antibody is expressed by steps described below.

(1) Expression of the Antibody in the Prokaryotic Host Cell

A prokaryotic antibody is expressed as follows: a vector containing a target DNA fragment is constructed and transformed (introduced) into the prokaryotic host cell (competent cell) and the transformed host cell is cultured in a culture medium. The competent cell can be prepared as follows: a cell wall of a prokaryotic cell is treated by using calcium chloride, polyethylene glycol/DMSO or an electric shock so that the cell is in a competent state, thus facilitating the introduction of the vector into the host cell. An LB medium may be selected as the medium, or a suitable medium with a selective agent may be selected according to the constructed vector, such as a medium with ampicillin resistance. The prokaryotic host cell is cultured at a proper temperature, for example, *E. coli* is cultured at a temperature of about 20° C. to about 39° C., preferably about 25° C. to about 37° C., and more preferably about 30° C. The pH of the culture medium depends mainly on a host organism and typically ranges from 5 to 9. The pH for *E. coli* cells is 6.5-7.5, preferably 6.9-7.1.

(2) Expression of the Antibody in the Eukaryotic Cell

The constructed vector containing the target DNA fragment is introduced into the eukaryotic host cell, for example, transfected into the eukaryotic cell such as Chinese hamster ovary (CHO) cells, human embryonic kidney (HEK) 293 cells, simian COS cells or myeloma cells, and the antibody expressed in supernate is collected after culture.

(3) Antibody Fragment

The antibody fragment may be obtained by a chemical reagent or a genetic engineering method.

The fragment obtained by the chemical reagent is generated after a disulfide bond in a hinge region is broken or after the antibody is digested with proteases including pepsin and papain. Genetic engineering provides a large number of fragments, each of which can have a specific binding region and functional characteristics.

The antibody fragment may be Fab, Fab', (Fab')$_2$, Fv, ScFv, a bispecific antibody, a trispecific antibody, a tetraspecific antibody, bis-scFv, a mimi antibody, Fab2, Fab3, etc. Since the antibody fragment is smaller than an intact antibody and generally not glycosylated, the antibody fragment can be expressed in a prokaryotic expression system, saving time and money. The bispecific antibody, the trispecific antibody, the tetraspecific antibody have potential application values in radioimmunotherapy and imaging diagnosis in vivo.

Specifically, the antibody is isolated and purified by steps described below.

(1) Isolation of the Expressed Antibody

For antibody proteins expressed in cells, the host cells need to be treated with osmotic shock, ultrasonic waves, lysis and the like and centrifuged or filtered so that the cells are removed and a supernate of the antibody is collected. For antibody proteins secreted outside cells, the supernate of the antibody may be isolated through direct centrifugation or filtration and collected.

(2) Purification of the Antibody

The antibody is purified as follows: the collected supernate of the antibody is purified through fractionation on an immunoaffinity or ion-exchange column, ethanol precipitation, reversed-phase HPLC, Celite or a cation-exchange resin, chromatography, SDS-PAGE, ammonium sulfate precipitation, gel filtration (such as Sephadex G-75) and other methods.

The antibody proteins are purified as follows: Protein A immobilized on a solid phase support may be used for immunoaffinity purification of the full-length antibody or antibody fragment of the present application. Due to high affinity of Protein A to an Fc region of the antibody, the antibody or antibody fragment can be bound to Protein A immobilized on the solid phase support and after subsequent elution, a high-purity monoclonal antibody can be obtained. The column with Protein A may be coated with a reagent such as glycerol to prevent non-specific adhesion of impurities, and the non-specific adhesion of impurities may be removed by flushing the solid phases. Finally, the proteins of the target antibody or antibody fragment may be recovered from the solid phase support through elution.

For the solid phase support with Protein A, Protein A may be immobilized onto a column having a glass or quartz surface, such as a glass column or a silicate column with a controllable pore size; Protein A may also be immobilized onto a magnetic bead. The purified monoclonal antibody is preserved at 4° C. for use.

In a sixth aspect, the present application provides a composition including any one or a combination of at least two of the antibody described in the first aspect, the nucleic acid described in the second aspect, the vector described in the third aspect or the host cell described in the fourth aspect.

Preferably, the composition further includes a pharmaceutically acceptable carrier, buffer, excipient, stabilizer, preservative and other bioactive substances.

Preferably, the other bioactive substances include any one or a combination of at least two of a cytotoxic agent, a chemotherapeutic agent, a growth inhibitor, a radiation therapy agent, an anti-angiogenic agent, an apoptotic agent or an anti-tubulin agent.

When an antibody fragment is used as an active ingredient, a smallest inhibitory fragment that specifically binds to a binding domain of a target protein is preferred. For example, based on a sequence of a variable region of the antibody, such antibody fragments or even peptide molecules may be designed that retain an ability to bind to a sequence of the target protein and can generate the peptides through chemical synthesis and/or DNA recombination.

The buffer includes an organic acid, an inorganic acid, a salt of an organic acid and a salt of an inorganic acid, such as citrate, phosphate, succinate, tartrate, fumarate, gluconate, oxalate, lactate, acetate. In addition, the buffer may be composed of histidine and trimethylamine salts such as Tris. A concentration of the buffer is controlled within a range of 45-235 mM. The pH of a formulation is maintained by the buffer, and an optimal pH is maintained so that the optimal activity or therapeutic effect of the antibody is maintained.

The preservative includes benzyldimethyloctadecylammonium chloride, hexamethonium chloride, benzalkonium halide (such as chloride, bromide, iodide), benzethonium chloride, thimerosal, phenol, butyl/benzyl alcohol; alkyl p-hydroxybenzoic acid such as methyl p-hydroxybenzoic acid or propyl p-hydroxybenzoic acid, catechol, resorcinol, cyclohexanol, 3-pentanol and m-cresol. The addition of the preservative inhibits the growth of microbes.

The stabilizer, also known as a tension agent, includes polyhydroxysugar alcohols, preferably trihydroxysugar alcohol or higher sugar alcohols such as glycerol, erythritol, arabitol, xylitol, sorbitol and mannitol. The stabilizer can interact with a charged group on an amino acid side chain, reduce intra- and inter-molecular interaction, adjust or maintain the liquid tension of the composition, thereby adjusting or maintaining the liquid tension of the composition.

The excipient includes reagents that can act as one or more of the following reagents: fillers, dissolution enhancers, stabilizers and agents that inhibit denaturation or adhesion to a container wall. Such excipients include polyhydroxy sugar alcohols; amino acids such as alanine, glycine, glutamine, asparagine, histidine, arginine, lysine, ornithine, leucine, 2-phenylalanine, glutamate, threonine; organic sugars or sugar alcohols such as sucrose, lactose, lactitol, trehalose, stachyose, mannose, sorbose, xylose, ribose, ribitol, myoinisitose, myoinisitol, galactose, galactitol, glycerol, cyclic polyols (such as cyclohexanol) and polyethylene glycol; sulfur-containing reductants such as urea, glutathione, lipoic acid, sodium mercaptoacetate, thioglycerol, α-monothioglycerol and sodium thiosulfate; low molecular weight proteins such as human serum albumin, bovine serum albumin, gelatin or other immunoglobulins; hydrophilic polymers such as polyvinylpyrrolidone; monosaccharides such as xylose, mannose, fructose and glucose; disaccharides such as lactose, maltose and sucrose; trisaccharides such as raffinose; polysaccharides such as dextrin and dextran.

Non-ionic surfactants include, for example, polysorbate (20, 40, 60, 65, 80), polyoxamers (184, 188), PLURONIC polyol, TRITON, polyoxyethylene sorbitan monoether (TWEEN-20, TWEEN-80), lauromacrogol 400, polyoxyl-40-stearate, polyoxyethylene hydrogenated castor oil (10, 50, 60), glyceryl monostearate, fatty acid sugar esters, methylcellulose and carboxymethylcellulose. The non-ionic surfactants can help dissolve therapeutic agents and protect therapeutic proteins against agitation-induced aggregation and also allows the formulation to undergo shear surface stress without causing denaturation of active therapeutic proteins or the antibody. In addition, it is also possible to use anionic surfactants including sodium dodecyl sulfate, sodium dioctyl sulfosuccinate, sodium dioctyl sulfonate. It is also possible to use cationic surfactants including benzalkonium chloride and benzethonium chloride.

Sterilization of a formulation of the antibody: the formulation may be sterilized through filtration and preserved for use.

The other bioactive substances include, but are not limited to, any one or a combination of at least two of a cytotoxic agent, a chemotherapeutic agent, a growth inhibitor, a radiation therapy agent, an anti-angiogenic agent, an apoptotic agent or an anti-tubulin agent.

The cytotoxic agent refers to a substance that inhibits or prevents functions of cells and/or causes damages to cells, including radioisotopes (such as At211, I131, I125, Y90, Re186, Re188, Sm153, Bi212, P32 and radioisotopes of Lu), chemotherapeutic agents such as methotrexate, adriamicin, vinca alkaloids (vincristine, vinblastine, etoposide), doxorubicin, melphalan, mitomycin C, chlorambucil, daunorubicin or other intercalators, enzymes and fragments thereof such as nucleolytic enzyme, antibiotics and toxins such as small molecular toxins or enzyme-active toxins of bacterial, fungal, plant or animal origin, which include fragments and/or variants thereof. Other cytotoxic agents are described below and in various antineoplastic or anticancer drugs disclosed below.

The chemotherapeutic agent refers to a chemical compound that can be used for treating cancer. Examples of chemotherapeutic agents include alkylatingagents such as thiotepa and cyclophosphamide; alkyl sulfonates such as busulfan, improsulfan and piposulfan; aziridines such as benzodopa, carboquone, meturedopa and uredopa; ethylenimines and methylamelamines including altretamine, triethylenemelamine, triethylenephosphoramide, triethylenethiophosphoramide and trimethylolomelamine; acetogenins (especially bullatacin and bullatacinone); δ-9-tetrahydrocannabinol (dronabinol); β-lapachone; lapachol; colchicines; betulinicacid; camptothecin (including synthesized analogues topotecan, CPT-11 (irinotecan), acyl camptothecin, scopoletin and 9-amino camptothecin); bryostatin; callystatin; CC-1065 (including adozelesin, carzelesin and bizelesin and synthesized analogues thereof); podophyllotoxin; podophyllinic acid; teniposide; cryptophycins (especially cryptophycin 1 and cryptophycin 8); dolastatin; duocarmycin (including synthesized analogues, KW-2189 and CB1-TM1); eleutherobin; pancratistatin; sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide and uracil mustard; nitrosureas such as carmustine, chlorozotocin, fotemustine, lomustine, nimustine and ranimnustine; antibiotics such as enediyne (for example, calicheamicin, especially calicheamicin γ1I and calicheamicin ω1I); dynemicin including dynemicin A; esperamicin; and neocarzinostatin chromophore and related chromoprotein enediyne chromophore, aclacinomysin, actinomycin, authramycin, azaserine, bleomycin, cactinomycin C, carabicin, carminomycin, carzinophilin, chromomycinis, dactinomycin D, daunorubicin, detorubicin, 6-diazo-5-oxo-L-norleucine, doxorubicin, epirubicin, esorubicin, idarubicin, marcellomycin, mitomycins such as mitomycin C, mycophenolic acid, nogalamycin, olivomycin, peplomycin, puromycin, quelamycin, rodorubicin, streptonigrin, streptozocin, tubercidin, ubenimex, zinostatin and zorubicin; antimetabolites such as methotrexate and 5-fluorouracil (5-FU); folic acid analogues, 6-mercaptopurine, thiamiprine, thioguanine; pyrimidine analogues such as ancitabine, azacitidine, 6-azauridine, carmofur, cytarabine, dideoxyuridine, doxifluridine, enocitabine and floxuridine; androgens such as epitiostanol, mepitiostane and testolactone; anti-adrenaline drugs such as aminoglutethimide, mitotane and trilostane; folic acid supplements such as frolinicacid; aceglatone; aldophosphamide glycoside; aminolevulinic acid; eniluracil; amsacrine; bestrabucil; bisantrene; edatraxate; defofamine; demecolcine; diaziquone; elfornithine; elliptiniumacetate; epothilone; etoglucid; gallium nitrate; hydroxyurea; lentinan; lonidainine; maytansinoids such as maytansine and ansamitocin; nitraerine; pentostatin; phenamet; pirarubicin; losoxantrone; 2-ethylhydrazide; procarbazine; polysaccharide complexes (JHS Natural Products, Eugene, OR); razoxane; rhizoxin; sizofiran; spirogermanium; tenuazonicacid; triaziquone; 2,2'2"-trichlorotriethylamine; trichothecenes (especially T-2 toxin, anguidine); urethane; vindesine; dacarbazine; mannomustine; mitobronitol; mitolactol; pipobroman; gacytosine; arabinoside; thiotepa; taxoids such as taxane including paclitaxel (Bristol-Myers Squibb Oncology, Princeton, N.J.), without Cremophor, albumin-modified nanoparticle formulation of paclitaxel (American Pharmaceutical Partners, Schaumberg, Illinois) and docetaxel (-Poulenc Rorer, Antony, France); chloranbucil; gemcitabine; 6-thioguanine; mercaptopurine; platinum analogues such as cisplatin and carboplatin; vinblastine platinum; ifosfamide; mitoxantrone; vincristine; oxaliplatin; leucovovin; vinorelbine; novantrone; edatrexate; aminopterin; ibandronate; topoisomerase inhibitor RFS 2000; difluoromethylornithine (DMFO); retinoids such as retinoic acid; capecitabine; any pharmaceutically acceptable salts, acids or derivatives of the preceding substances; and a combination of two or more of the preceding substances such as CHOP (combination therapy of cyclophosphamide, doxorubicin, vincristine and prednisolone) and FOLFOX (therapy of oxaliplatin (ELOXATIN™) in combination with 5-FU and leucovovin). Other chemotherapeutic agents include cytotoxic agents that can be used as antibody drug conjugates, such as maytansine alkaloids (such as DM1) and auristatin (such as MMAE and MMAF).

"Chemotherapeutic agents" also include "anti-hormone agents" or "endocrine therapeutic agents" that modulate, reduce, block or inhibit hormone effects that promote cancer growth generally in the form of systemic therapy. The chemotherapeutic agents may be hormones themselves. Examples include antiestrogens and selective estrogen receptor modulators (SERMs), which include, for example, tamoxifen, droloxifene, 4-hydroxytamoxifen, trioxifene, keoxifene, LY117018, onapristone and toremifene; antiprogesterone; estrogen receptor downregulators (ERDs); agents that inhibit or turn off functions of ovaries, such as luteinizing hormone releasing hormone (LHRH) agonists such as leuprolide acetate, goserelin acetate, buserelin acetate and tripterelin; other antiandrogens such as flutamide, nilutamide and bicalutamide; and aromatase inhibitors that inhibit aromatase that regulates the generation of estrogen in adrenal glands, such as 4(5)-imidazole, megestrol acetate, exemestane, formestanie, fadrozole, vorozole and letrozole. In addition, this definition of the chemotherapeutic agent includes bisphosphonates such as clodronate, etidronate, NE-58095 or risedronate; and troxacitabine, (1,3-dioxolane nucleoside cytosine analogue); antisense oligonucleotides, especially those that inhibit gene expression in signaling pathways involving abnormal cell proliferation, such as PKC-α, Raf, H-Ras and epidermal growth factor receptor (EGFR); vaccines such as vaccines and gene therapy vaccines; topoisomerase 1 inhibitor; rmRH; lapatinib ditosylate (ErbB-2, EGFR, and a dual small molecular tyrosine kinase inhibitor, also known as GW572016); and any pharmaceutically acceptable salts, acids or derivatives of the preceding substances.

Chemotherapeutic agents also include antibodies such as alemtuzumab (Campath), bevacizumab (Genentech), cetuximab (Imclone), panitumumab (Amgen), rituximab (Genentech/Biogen Idec), pertuzumab (2C4, Genentech), trastuzumab (Genentech), tositumomab (Bexxar, Corixia) and antibody drug conjugates such as gemtuzumabozogamicin (Wyeth); other humanized monoclonal antibodies having the therapeutic potential as agents in combination with the compounds of the present application, which include apolizumab, aselizumab, bapineuzumab, bivatuzumab mertansine, cantuzumab mertansine, cedelizumab, certolizumabpegol, eculizumab, efalizumab, epratuzumab, erlizumab, felvizumab, fontolizumab, gemtuzumab ozogamicin, inotuzumab ozogamicin, ipilimumab, labetuzumab, lintuzumab, matuzumab, mepolizumab, motavizumab, motovizumab, natalizumab, nimotuzumab, nolovizumab, numavizumab, ocrelizumab, omalizumab, palivizumab, pascolizumab, pecfusituzumab, pectuzumab, pexelizumab, ralivizumab, ranibizumab, reslivizumab, reslizumab, resyvizumab, rovelizumab, ruplizumab, sibrotuzumab, siplizumab, sontuzumab, tacatuzumab tetraxetan, tadocizumab, talizumab, tefibazumab, tocilizumab, toralizumab, tucotuzumab (celmoleukin), tucusituzumab, umavizumab, urtoxazumab, ustekinumab, visilizumab and anti-interleukin-12 (ABT-874/J695, Wyeth Research and Abbott Laboratories) which is a recombinant, proprietary human sequence full-length IgG1λ antibody genetically modified to recognize interleukin-12p40 proteins.

Chemotherapeutic agents also include "EGFR inhibitors" which refer to compounds that bind to the EGFR or otherwise interact directly with the EGFR and prevent or reduce the signaling activity of the EGFR. "EGFR inhibitors" are also referred to as "EGFR antagonists". Examples of such reagents include antibodies and small molecules that bind to the EGFR. Examples of the antibodies that bind to the EGFR include MAb 579 (ATCC CRL HB8506), MAb 455 (ATCC CRL HB8507), MAb 225 (ATCC CRL 8508), MAb 528 (ATCC CRL 8509) and variants thereof such as chimeric 225 (C225 or cetuximab) and reconstructed human 225 (H225); IMC-11F8, a complete human EGFR targeting antibody (Imclone); an antibody binding to a type II EGFR mutant; a humanized chimeric antibody binding to the EGFR; a human antibody binding to the EGFR, such as ABX-EGF or Panitumumab (Abgenix/Amgen); EMD55900; EMD7200 (matuzumab), a humanized EGFR antibody (EMD/Merck) that targets the EGFR and competes with EGF and TGF-α to bind to the EGFR; a human EGFR antibody, HuMax-EGFR (GenMab); complete human antibodies called E1.1, E2.4, E2.5, E6.2, E6.4, E2.11, E6.3 and E7.6.3 and described in U.S. Pat. No. 6,235,883; MDX-447 (Medarex Inc); and mAb 806 or humanized mAb 806. An anti-EGFR antibody can be conjugated with cytotoxic agents to produce immunoconjugates. EGFR antagonists include small molecules. Specific small molecular EGFR antagonists include OSI-774 (CP-358774, erlotinib, Genentech/OSI Pharmaceuticals), PD 183805 (CI 1033, 2-acrylamide, N-[4-[(3-chloro-4-fluorophenyl)-amino]-7-[3-(4-morpholinyl) propoxy]-6-quinazolinyl]-, dihydrochloride, Pfizer Inc.); ZD1839, gefitinib, 4-(3'-chloro-4'-fluoroanilino)-7-methoxy-6-(3-morpholinopropoxy) quinazoline, AstraZeneca); ZM 105180 ((6-amino-4-(3-methylphenyl-amino)-quinazoline, Zeneca); BIBX-1382 (N8-(3-chloro-4-fluoro-phenyl)-N2-(1-methyl-piperidine-4-yl)-pyrimido[5,4-d]pyrimidine-2,8-diamine, Boehringer Ingelheim); PKI-166 ((R)-4-[4-[(1-phenylethyl)amino]-1H-pyrrolo[2,3-d]pyrimidin-6-yl]-phenol); (R)-6-(4-hydroxyphenyl)-4-[(1-phenylethyl)amino]-7H-pyrrolo[2,3-d]pyrimidine); CL-387785 (N-[4-[(3-bromophenyl)amino]-6-quinazolinyl]-2-butynamide); EKB-569 (N-[4-[(3-chloro-4-fluorophenyl)amino]-3-cyano-7-ethoxy-6-quinolinyl]-4-(dimethylamino)-2-b utenamide) (Wyeth); AG1478 (Pfizer); AG1571 (SU 5271; Pfizer); a dual EGFR/HER2 tyrosine kinase inhibitor such as lapatinib (GSK572016 or N-[3-chloro4-[(3fluorophenyl)methoxy]phenyl]-6 [5 [[[2 (methylsulfonyl)ethyl]amino]methyl]-2-furyl]-4-quinazoline amine).

Chemotherapeutic agents also include "tyrosine kinase inhibitors" including EGFR targeting drugs mentioned in the previous paragraph. Small molecular HER2 tyrosine kinase inhibitors include, for example, TAK165 available from Takeda; CP-724,714, an oral selective ErbB2 receptor tyrosine kinase inhibitor (Pfizer and OSI); a dual HER inhibitor that preferentially binds to the EGFR but inhibits overexpression of the HER2 and EGFR in cells, such as EKB-569 (available from Wyeth); lapatinib (GSK572016, available from Glaxo-SmithKline), an oral HER2 and EGFR tyrosine kinase inhibitor; PKI-166 (available from Novartis); a pan-HER inhibitor, such as canertinib (CI-1033, Pharmacia); an Raf-1 inhibitor available from, for example, ISIS Pharmaceuticals, an antisense agent ISIS-5132 that inhibits Raf-1 signaling; a TK inhibitor not targeting HERs, such as imatinib mesylate (available from Glaxo SmithKline); a multi-targeted tyrosine kinase inhibitor, such as sunitinib (available from Pfizer); a vascular endothelial growth factor (VEGF) receptor tyrosine kinase inhibitor, such as vatalanib; an MAPK extracellular regulated kinase I inhibitor CI-1040 (available from Pharmacia); quinazolines, such as PD 153035, 4-(3-chloroanilino) quinazoline; pyridopyrimidines; pyrimidopyrimidines; pyrrolopyrimidines, such as CGP 59326, CGP 60261 and CGP 62706; pyrazolopyrimidines, 4-(phenylamino)-7H-pyrrolo[2,3-d]pyrimidines; curcumin (diferuloyl methane, 4,5-bis(4-fluoroanilino) phthalimide); tyrphostines containing nitrothiophene moieties; PD-0183805 (Warner-Lamber); antisense molecules (for example, those that bind to HER-encoding nucleic acids); quinoxalines (U.S. Pat. No. 5,804,396); tyrphostins ZD6474 (Astra Zeneca); PTK-787 (Novartis/Schering AG); pan-HER inhibitors such as CI-1033 (Pfizer); Affinitac (ISIS 3521, Isis/Lilly); imatinib mesylate PKI166 (Novartis); GW2016 (Glaxo SmithKline); CI-1033 (Pfizer); EKB-569 (Wyeth); Semaxinib (Pfizer); ZD6474 (AstraZeneca); PTK-787 (Novartis/Schering AG); INC-1C11 (Imclone), rapamycin.

Chemotherapeutic agents also include dexamethasone, interferon, colchicine, allopurinol, amifostine, arsenic trioxide, asparaginase, live BCG, bevacuzimab, bexarotene, cladribine, clofarabine, darbepoetin alfa, denileukin, dexrazoxane, epoetin alfa, elotinib, filgrastim, histrelin acetate, ibritumomab, interferon α-2a, interferon α-2b, lenalidomide, levamisole, mesna, methoxsalen, oprelvekin, palifermin, pamidronate, pegademase, pegaspargase, pegfilgrastim, pemetrexed disodium, plicamycin, porfimer sodium, quinacrine, rasburicase, sargramostim, temozolomide, VM-26, 6-TG, toremifene, tretinoin, ATRA, valrubicin, zoledronate, zoledronic acid and pharmaceutically acceptable salts thereof.

Chemotherapeutic agents also include hydrocortisone, hydrocortisoneacetate, cortisone acetate, tixocortol pivalate, triamcinolone acetonide, triamcinolone alcohol, mometasone, amcinonide, budesonide, desonide, fluocinonide, fluocinolone acetonide, betamethasone, betamethasone sodium phosphate, dexamethasone, dexamethasone sodium phosphate, fluocortolone, hydrocortisone-17-butyrate, hydrocortisone-17-valerate, aclometasone dipropionate, betamethasone valerate, betamethasone dipropionate, prednicarbate, clobetasone-17-butyrate, clobetasol-17-propionate, fluocortolone caproate, fluocortolone pivalate and fluprednidene acetate; immune-selective anti-inflammatory derivatives (ImSAID) such as phenylalanine-glutamine-glycine (FEG) and D-isomer thereof (feG) (IMULAN BioTherapeutics, LLC); antirheumatic drugs such as azathioprine, ciclosporin (cyclosporine A), D-penicillamine, gold salts, hydroxychloroquine, a tumor necrosis factor α (TNF-α) blocker such as infliximab and adalimumab, certolizumab pegol and golimumab, an interleukin-1 (IL-1) blocker such as anakinra, a T cell costimulatory blocker such as abatacept, an interleukin-6 (IL-6) blocker such as tocilizumab, an interleukin-13 (IL-13) blocker such as lebrikizumab; an interferon α (IFN) blocker such as rontalizumab; a B7-integrin blocker such as rhuMAb Beta7; an IgE pathway blocker such as anti-M1 prime; secreted homotrimeric LTa3 and membrane-bound heterotrimeric LTa1/β2 blockers such as anti-lymphotoxin α (LTa); mixed investigative agents such as thioplatin, PS-341, phenyl butyrate, ET-18-OCH3 or farnesyl transferase inhibitors (L-739749, L-744832); polyphenols such as quercetin, resveratrol, piceatannol, epigallocatechine gallate, theaflavin, flavanol, procyanidins, betulinic acid and derivatives thereof; an autophagy inhibitor such as chloroquine; δ-9-tetrahydrocannabinol; dronabinol; β-lapachone; lapachol; colchicines; betulinicacid; acetyl camptothecin; bisphosphonates such as clodronate or etidronate, NE-58095, zoledronic acid/zoledronate, alendronate, pamidronate, tiludronate, risedronate and EGF-R; perifosine, COX-2 inhibitors (such as celecoxib or etoricoxib), proteosome inhibitors (such as PS341); CCI-779; tipifarnib (R11577); orafenib, ABT510; Bcl-2 inhibitors such as oblimersen sodiumpixantrone; Farnesyl transferase inhibitors such as lonafarnib (SCH 6636, SARASAR™); and any pharmaceutically acceptable salts, acids or derivatives of the preceding substances; and a combination of two or more of the preceding substances.

The growth inhibitor refers to a compound or composition that inhibits the growth and/or proliferation of cells in vitro or in vivo, such as cells whose growth depends on PD-L1 expression. Thus, the growth inhibitor may be agents that significantly reduce the percentage of cells in an S phase. Examples of growth inhibitors include agents that block cell cycle progression beyond the S phase, such as those that induce G1 arrest and M phase arrest. Classic M phase blockers include vincas (vincristine and vinblastine), taxanes and topoisomerase II inhibitors such as anthracycline antibiotics, doxorubicin, (8S-cis)-10-[(3-amino-2,3,6-trideoxy-α-L-lyxo-hexapyranosyl)oxy]-7,8,9,10-tetrahydro-6,8,11-trihydroxy-8-(hydroxyacetyl)-1-methoxy-5,12-naphthacenedione, epirubicin, daunorubicin, etoposide and bleomycin. Agents for G1 arrest also overflow into S phase arrest, such as DNA alkylating agents such as tamoxifen, prednisone, dacarbazine, mechlorethamine, cisplatin, methotrexate, 5-fluorouracil and ara-C; taxanes (paclitaxel and docetaxel) that are anticancer drugs derived from Taxus. Docetaxel derived from European yew is a semi-synthetic analogue of paclitaxel (Bristol-Myers Squibb). Paclitaxel and docetaxel promote the assembly of tubulin dimers into microtubules and stabilize the microtubules by preventing depolymerization, thereby inhibiting mitosis in cells.

A PD-L1 antibody formulation may also include more than one active ingredients and cytotoxic agents, cytokines or growth inhibitors of the active ingredients, where the activity between the active ingredients should not be negatively affected.

The PD-L1 antibody formulation may also embed the active ingredients in a colloidal drug delivery system such as liposomes, albumin microspheres, microemulsions, nanoparticles and nanocapsules or microcapsules in large emulsions.

The instability of the PD-L1 antibody formulation may be enhanced by non-toxic water-soluble polyvalent metal salts, such as polyvalent cations such as $Ca^{2+}$, $Mg^{2+}$, $Zn^{2+}$, $Fe^{2+}$, $Fe^{3+}$, $Cu^{2+}$, $Sn^{2+}$, $Sn^{4+}$, $Al^{2+}$ and $Al^{3+}$; or anions in water-soluble salts formed by these cations, such as anions formed with inorganic acids and/or organic acids. Water-soluble polyvalent metal salts generally selected include halogen metal salts of inorganic acids (such as zinc chloride, calcium chloride), sulfate, nitrate, phosphate and thiocyanate; aliphatic carboxylic acid metal salts such as calcium acetate, zinc acetate, calcium propionate, zinc glycolate, calcium lactate, zinc lactate, and zinc tartrate; and aromatic carboxylic acid metal salts, benzoic acid salts (such as zinc benzoate) and salicylates. Antibody variants are, for example, glycosylated variants, Fc region variants, cysteine engineered antibody variants and immune conjugates. The glycosylated variants change the antibody to increase or reduce the degree of glycosylation of the antibody. Amino acid sequences may be changed so that one or more glycosylation sites are created or eliminated and it is convenient to add or delete glycosylation sites of the antibody.

The present application provides a method for preparing the PD-L1 antibody formulation, and the specific steps are as follows.

The active ingredients of the antibody with a certain purity are mixed with any pharmaceutically acceptable carrier, buffer, stabilizer, preservative, excipient and other bioactive substances at a certain ration and preserved for use. The dosage and concentrations of the carrier, buffer, stabilizer, preservative, excipient and other bioactive substances are harmless to patients or recipients, which include buffers; antioxidants such as ascorbic acid, methionine, vitamin E and sodium metabisulfite; preservatives; isotonic agents; stabilizers; metal complexes such as Zn-protein complexes; and chelating agents such as EDTA and/or nonionic surfactants.

In a seventh aspect, the present application provides a use of the composition described in the sixth aspect for preparing a drug and/or a kit for targeted treatment, preferably for preparing a drug and/or a kit for improving a condition of T cell dysfunction by antagonizing PD-L1 signaling.

Preferably, the condition of T cell dysfunction includes cancer and a benign tumor.

Preferably, the cancer includes any one or a combination of at least two of non-small cell lung cancer, small cell lung cancer, renal cell cancer, ovarian cancer, breast cancer, pancreatic cancer, gastric cancer, bladder cancer, esophageal cancer, mesothelioma, melanoma, head and neck cancer, thyroid cancer, sarcoma, prostate cancer, glioblastoma, cervical cancer, thymic cancer, leukemia, lymphoma, myeloma, mycosis fungoides, Merkel cell cancer, liver cancer, renal cancer, salivary cancer, lung cancer, pancreatic cancer, colon cancer, ovarian cancer, bladder cancer, glioma, epithelioma or brain cancer.

Compared with the existing art, the present application has beneficial effects described below.

(1) The present application provides a novel anti-PD-L1 antibody, a method for preparing the same and a use thereof. The anti-PD-L1 antibody or the antibody fragment has a novel amino acid sequence. The anti-PD-L1 antibody or antibody fragment can be designed through computer-aided design, using bioinformatics modeling to simulate analysis and design the antibody sequence without complicated and cumbersome immune reactions. After the antibody is designed, the anti-PD-L1 antibody or the antibody fragment can be transferred into a host cell through molecular biology construction, expressed in the host cell and purified so that the target PD-L1 antibody with PD-L1 antigen binding activity can be obtained.

(2) The antibody provided by the present application is designed and discovered through a simple and efficient process which is short in time, low in cost, easy to operate and convenient to popularize and apply.

BRIEF DESCRIPTION OF DRAWINGS

FIG. 2 shows kinetic curves based on Protein A, wherein

FIG. 3 shows kinetic curves based on anti-human Fc fragments, wherein

FIG. 4 shows competition binding curves of an antibody I, an antibody II and a positive control to antigen epitopes, wherein FIG. 5 shows kinetic curves of a human PD-L1 antigen binding to biosensors, wherein

DETAILED DESCRIPTION

Figure 1:
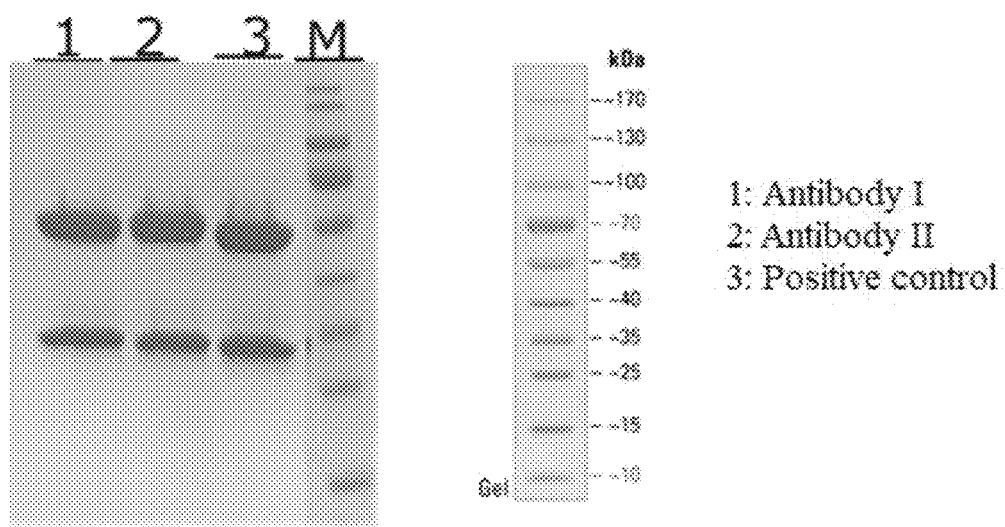
FIG. 1 is a diagram illustrating SDS-PAGE results of some antibodies expressed in the present application.

To further elaborate on the technical means adopted and the effects achieved in the present application, solutions of the present application are further described below through specific examples in conjunction with drawings, but the present application is not limited to the scope of the examples.

Example 1 Antibody Design

An antibody was analyzed and designed through bioinformatics with steps described below.
1. Antigen Structure Construction:

Multiple sequence alignment was performed between a target antigen protein chain and a protein chain in a protein data bank (PDB): data and index files for the multiple sequence alignment were generated and a sequence alignment program was called so that the multiple sequence alignment was performed on the amino acid sequence of a target protein chain with protein chains in the data bank and a homologous region of a protein sequence was determined.
2. Antibody Structure Construction:

An initial model of the antibody was constructed using MODELLER software by a homology modeling method through alignment of a sequence having an unknown structure with the antibody having a known three-dimensional structure to generate an optimized homologous model of the antibody; the model was optimized using ROSETTA software for loop region modeling and structure-based alignment, and a structural model of the antibody was constructed. To verify a model result, a Z-score distribution map and a Ramachandran plot were calculated to ensure that most amino acids of a protein fall into an allowable region of the Ramachandran plot.
3. Optimization of Antigen and Antibody Structures
    (1) Endowment of a simulation system with a force field parameter;
    (2) Initial structure inspection and pretreatment; and
    (3) Initial structure energy minimization.

Through gromacs4.5.7 software, the simulation system was endowed with the force field parameter, and the initial structure inspection and pretreatment and the initial structure energy minimization were performed. A specific method was that a protonation state of the protein close to a physiological environment (pH=7.4) was set through a PROPKA program, and DPPC, a TIP3P water model, neutralized ions and KCl of 0.15 mol/L were added for energy minimization so that the antibody structure optimized for an aqueous phase was obtained. Further, the rationality of the antibody structure may be determined through Rama plot evaluation and the like by the method in step 2.
4. Antigen and Antibody Docking Conformation was searched for and optimized in combination with a genetic algorithm. An antigen epitope was determined firstly and the antibody and an antigen were docked so that a best antigen-antibody binding pattern was found. The binding pattern and affinity were calculated according to a principle of distance matching between the antigen epitope and antibody molecules, and calculation results were scored to evaluate the degree of binding of the antibody to the antigen so that a best target antibody sequence was obtained.

Rigid molecules were docked using zdock software, the affinity of the antigen to the antibody was evaluated using a scoring function consisting of ACE statistical potential energy, structure complementarity and static electricity, and the best antibody sequence was obtained in combination with information about the antigen epitope.

A series of antibody sequences were designed. The variable region (Fv) of the antibody consists of FR1-CDR1-FR2-CDR2-FR3-CDR3-FR4. Two types of antibody, an antibody I and an antibody II, were finally designed, as shown in Table 1 and Table 2.

Through a computer-aided design and bioinformatics modeling, an antibody structure was designed, and a series of antibody sequences were designed. The variable region of the antibody is composed of FR1-CDR1-FR2-CDR2-FR3-CDR3-FR4. Two types of antibody were designed: the antibody I and the antibody II. Some amino acid sequences of the antibody I, the antibody II and positive control respectively include amino acid sequences in Table 1, Table 2 and Table 3. Amino acid sequences of constant regions of the antibody I, the antibody II and a positive control antibody are shown in Table 4. Sequences of FRs of the antibody I and the antibody II are shown in Table 5.

TABLE 1

|  | Sequence No. | Amino Acid Sequence |
|---|---|---|
| Light chain of the antibody I | | |
| I-CDR-L1 | SEQ ID NO. 17 | QDLGNT |
| I-CDR-L1 | SEQ ID NO. 18 | QNIGQT |
| I-CDR-L1 | SEQ ID NO. 19 | QNIANT |

TABLE 1-continued

|  | Sequence No. | Amino Acid Sequence |
|---|---|---|
| I-CDR-L1 | SEQ ID NO. 20 | QDVGQT |
| I-CDR-L1 | SEQ ID NO. 21 | QEIGQT |
| I-CDR-L1 | SEQ ID NO. 22 | QNGINT |
| I-CDR-L1 | SEQ ID NO. 23 | QDIGNT |
| I-CDR-L1 | SEQ ID NO. 24 | QEIGQT |
| I-CDR-L2 | SEQ ID NO. 25 | ATS |
| I-CDR-L2 | SEQ ID NO. 26 | ASS |
| I-CDR-L2 | SEQ ID NO. 27 | GTS |
| I-CDR-L2 | SEQ ID NO. 28 | STS |
| I-CDR-L2 | SEQ ID NO. 29 | VSS |
| I-CDR-L2 | SEQ ID NO. 30 | VTS |
| I-CDR-L3 | SEQ ID NO. 31 | LQYASYPFT |
| I-CDR-L3 | SEQ ID NO. 32 | LYFASSPFT |
| I-CDR-L3 | SEQ ID NO. 33 | LQYASSPFT |
| I-CDR-L3 | SEQ ID NO. 34 | LYYASYFFT |
| I-CDR-L3 | SEQ ID NO. 35 | LQYASSFFT |
| I-CDR-L3 | SEQ ID NO. 36 | LNYISSPFT |
| I-CDR-L3 | SEQ ID NO. 37 | LQYASTFFT |
| I-CDR-L3 | SEQ ID NO. 38 | LYYASTPFT |
| Heavy chain of the antibody I | | |
| I-CDR-H1 | SEQ ID NO. 39 | GYTFTSYW |
| I-CDR-H1 | SEQ ID NO. 40 | GYSYYFYW |
| I-CDR-H1 | SEQ ID NO. 41 | GYSFSSYW |
| I-CDR-H1 | SEQ ID NO. 42 | GYTYYFYW |
| I-CDR-H1 | SEQ ID NO. 43 | GYSFTTYW |
| I-CDR-H1 | SEQ ID NO. 44 | GYSFTSYW |
| I-CDR-H1 | SEQ ID NO. 45 | GYTYNFYW |
| I-CDR-H2 | SEQ ID NO. 46 | IYPGNSDT |
| I-CDR-H2 | SEQ ID NO. 47 | IYHGNSET |
| I-CDR-H2 | SEQ ID NO. 48 | IYPVHSET |
| I-CDR-H2 | SEQ ID NO. 49 | IYHVQSDT |
| I-CDR-H2 | SEQ ID NO. 50 | IYPGQSET |
| I-CDR-H2 | SEQ ID NO. 51 | IYWAHSET |
| I-CDR-H2 | SEQ ID NO. 52 | IYHINSDT |
| I-CDR-H3 | SEQ ID NO. 53 | TRWGEGYYHAMNH |
| I-CDR-H3 | SEQ ID NO. 54 | THWADAYFHGMNH |
| I-CDR-H3 | SEQ ID NO. 55 | THWLEVYFHGMDH |
| I-CDR-H3 | SEQ ID NO. 56 | TRWAELFFHAMDH |

TABLE 1-continued

| | Sequence No. | Amino Acid Sequence |
|---|---|---|
| I-CDR-H3 | SEQ ID NO. 57 | TRWGDGYYHAMDH |
| I-CDR-H3 | SEQ ID NO. 58 | TRWLDAFYHVMDH |
| I-CDR-H3 | SEQ ID NO. 59 | THWVEVFYHAMEH |
| I-CDR-H3 | SEQ ID NO. 60 | THWIDGYFHVMDH |
| I-CDR-H3 | SEQ ID NO. 61 | THWAEGYYHAMEH |
| I-CDR-H3 | SEQ ID NO. 62 | THWIEAFFHLMQH |
| Variable domain of the light chain of the antibody I | SEQ ID NO. 107 | DIQMTQSPSSLSASVGDRVTITCRASQDLGNTLNWL QQKPGKAIKRLIYASSSLDSGVPKRFSGSRSGSDYS LTISSLQPEDFATYYCLYYASTPFTFGQGTKLEIK |
| Variable domain of the light chain of the antibody I | SEQ ID NO. 108 | DIQMTQSPSSLSASVGDRVTITCRASQDIGNTLNWL QQKPGKAIKRLIYATSSLDSGVPKRFSGSRSGSDYS LTISSLQPEDFATYYCLQYASSPFTFGQGTKLEIK |
| Variable domain of the light chain of the antibody I | SEQ ID NO. 109 | DIQMTQSPSSLSASVGDRVTITCRASQNIANTLNWL QQKPGKAIKRLIYVSSSLDSGVPKRFSGSRSGSDYS LTISSLQPEDFATYYCLYYASYFFTFGQGTKLEIK |
| Variable domain of the light chain of the antibody I | SEQ ID NO. 110 | DIQMTQSPSSLSASVGDRVTITCRASQEIGQTLNWL QQKPGKAIKRLIYVTSSLDSGVPKRFSGSRSGSDYS LTISSLQPEDFATYYCLYFASSPFTFGQGTKLEIK |
| Variable domain of the light chain of the antibody I | SEQ ID NO. I11 | DIQMTQSPSSLSASVGDRVTITCRASQNGINTLNWL QQKPGKAIKRLIYVTSSLDSGVPKRFSGSRSGSDYS LTISSLQPEDFATYYCLYYASYFFTFGQGTKLEIK |
| Variable domain of the light chain of the antibody I | SEQ ID NO. 112 | DIQMTQSPSSLSASVGDRVTITCRASQEIGQTLNWL QQKPGKAIKRLIYGTSSLDSGVPKRFSGSRSGSDYS LTISSLQPEDFATYYCLNYISSPFTFGQGTKLEIK |
| Variable domain of the light chain of the antibody I | SEQ ID NO. 113 | DIQMTQSPSSLSASVGDRVTITCRASQEIGQTLNWL QQKPGKAIKRLIYATSSLDSGVPKRFSGSRSGSDYS LTISSLQPEDFATYYCLYYASTPFTFGQGTKLEIK |
| Variable domain of the light chain of the antibody I | SEQ ID NO. 114 | DIQMTQSPSSLSASVGDRVTITCRASQNIGQTLNWL QQKPGKAIKRLIYSTSSLDSGVPKRFSGSRSGSDYS LTISSLQPEDFATYYCLQYASSPFTFGQGTKLEIK |
| Variable domain of the heavy chain of the antibody I | SEQ ID NO. 115 | VQLVQSGAEVKKPGASVKVSCKASGYSYYFYWMHWV RQAPGQGLEWMGAIYHINSDTSYNQKFKGRVTITAV TSASTAYMELSSLRSEDTAVYYCTRWGEGYYHAMNH WGQGTLVTVS |
| Variable domain of the heavy chain of the antibody I | SEQ ID NO. 116 | VQLVQSGAEVKKPGASVKVSCKASGYSFTSYWMHWV RQAPGQGLEWMGAIYPGNSDTSYNQKFKGRVTITAV TSASTAYMELSSLRSEDTAVYYCTRWGDGYYHAMDH WGQGTLVTVS |
| Variable domain of the heavy chain of the antibody I | SEQ ID NO. 117 | VQLVQSGAEVKKPGASVKVSCKASGYTYYFYWMHWV RQAPGQGLEWMGAIYHGNSETSYNQKFKGRVTITAV TSASTAYMELSSLRSEDTAVYYCTHWADAYFHGMNH WGQGTLVTVS |

TABLE 1-continued

|  | Sequence No. | Amino Acid Sequence |
|---|---|---|
| Variable domain of the heavy chain of the antibody I | SEQ ID NO. 118 | VQLVQSGAEVKKPGASVKVSCKASGYTYNFYWMHWV RQAPGQGLEWMGAIYHVQSDTSYNQKFKGRVTITAV TSASTAYMELSSLRSEDTAVYYCTHWLEVYFHGMDH WGQGTLVTVS |
| Variable domain of the heavy chain of the antibody I | SEQ ID NO. 119 | VQLVQSGAEVKKPGASVKVSCKASGYTFTSYWMHWV RQAPGQGLEWMGAIYWAHSETSYNQKFKGRVTITAV TSASTAYMELSSLRSEDTAVYYCTHWLEVYFHGMDH WGQGTLVTVS |
| Variable domain of the heavy chain of the antibody I | SEQ ID NO. 120 | VQLVQSGAEVKKPGASVKVSCKASGYSFSSYWMHWV RQAPGQGLEWMGAIYPGQSETSYNQKFKGRVTITAV TSASTAYMELSSLRSEDTAVYYCTHWIDGYFHVMDH WGQGTLVTVS |
| Variable domain of the heavy chain of the antibody I | SEQ ID NO. 121 | VQLVQSGAEVKKPGASVKVSCKASGYSFTTYWMHWV RQAPGQGLEWMGAIYWAHSETSYNQKFKGRVTITAV TSASTAYMELSSLRSEDTAVYYCTRWGDGYYHAMDH WGQGTLVTVS |
| Variable domain of the heavy chain of the antibody I | SEQ ID NO. 122 | VQLVQSGAEVKKPGASVKVSCKASGYSFTTYWMHWV RQAPGQGLEWMGAIYPVHSETSYNQKFKGRVTITAV TSASTAYMELSSLRSEDTAVYYCTHWIEAFFHLMQH WGQGTLVTVS |

TABLE 2

|  | Sequence No. | Amino Acid Sequence |
|---|---|---|
| Light chain of the antibody II |  |  |
| II-CDR-L1 | SEQ ID NO. 63 | SSVSY |
| II-CDR-L1 | SEQ ID NO. 64 | STVYY |
| II-CDR-L1 | SEQ ID NO. 65 | SSGYY |
| II-CDR-L1 | SEQ ID NO. 66 | SSASY |
| II-CDR-L1 | SEQ ID NO. 67 | STITY |
| II-CDR-L1 | SEQ ID NO. 68 | SSISY |
| II-CDR-L2 | SEQ ID NO. 69 | SYS |
| II-CDR-L2 | SEQ ID NO. 70 | STS |
| II-CDR-L2 | SEQ ID NO. 71 | TTS |
| II-CDR-L2 | SEQ ID NO. 72 | YTS |
| II-CDR-L3 | SEQ ID NO. 73 | QQRSSFPYT |
| II-CDR-L3 | SEQ ID NO. 74 | QNRYSYPYT |
| II-CDR-L3 | SEQ ID NO. 75 | QQRSSYHYT |
| II-CDR-L3 | SEQ ID NO. 76 | QNRTSFHYT |
| II-CDR-L3 | SEQ ID NO. 77 | QYRFSYWYT |
| II-CDR-L3 | SEQ ID NO. 78 | QYRTSYPYT |

TABLE 2-continued

| | Sequence No. | Amino Acid Sequence |
|---|---|---|
| II-CDR-L3 | SEQ ID NO. 79 | QQRSSYPYT |
| II-CDR-L3 | SEQ ID NO. 80 | QQRFSFHYT |
| II-CDR-L3 | SEQ ID NO. 81 | QYRSSYWYT |
| Heavy chain of the antibody II | | |
| II-CDR-H1 | SEQ ID NO. 82 | GYSTSSFV |
| II-CDR-H1 | SEQ ID NO. 83 | GYYTSSPV |
| II-CDR-H1 | SEQ ID NO. 84 | GYYTTSYV |
| II-CDR-H1 | SEQ ID NO. 85 | GYSFTSYV |
| II-CDR-H1 | SEQ ID NO. 86 | GYTFTSYV |
| II-CDR-H1 | SEQ ID NO. 87 | GYFYTSYV |
| II-CDR-H1 | SEQ ID NO. 88 | GYFFSSFV |
| II-CDR-H2 | SEQ ID NO. 89 | INYYNDAT |
| II-CDR-H2 | SEQ ID NO. 90 | INYFYDGT |
| II-CDR-H2 | SEQ ID NO. 91 | INPYNDGT |
| II-CDR-H2 | SEQ ID NO. 92 | INYYNDAT |
| II-CDR-H2 | SEQ ID NO. 93 | INHFQDAT |
| II-CDR-H2 | SEQ ID NO. 94 | INPFQDIT |
| II-CDR-H2 | SEQ ID NO. 95 | INPYYDGT |
| II-CDR-H3 | SEQ ID NO. 96 | AWSGAIFEY |
| II-CDR-H3 | SEQ ID NO. 97 | ARSIGITDY |
| II-CDR-H3 | SEQ ID NO. 98 | AKSAIAFEY |
| II-CDR-H3 | SEQ ID NO. 99 | AKSGGISDY |
| II-CDR-H3 | SEQ ID NO. 100 | AWSAALSEY |
| II-CDR-H3 | SEQ ID NO. 101 | ARSVGITDY |
| II-CDR-H3 | SEQ ID NO. 102 | ARSAALSEY |
| II-CDR-H3 | SEQ ID NO. 103 | ARSGGIFDY |
| II-CDR-H3 | SEQ ID NO. 104 | AKSLVGSEY |
| Variable domain of the light chain of the antibody II | SEQ ID NO. 123 | TQSPSFLSASVGDRVTITCSASSSVSYMHWFQQKPG KSPKLWIYSYSNLASGVPARFSGSGSGTSYSLTISS LQPEDFATYYCQNRTSFHYTFGQGTKLEIK |
| Variable domain of the light chain of the antibody II | SEQ ID NO. 124 | TQSPSFLSASVGDRVTITCSASSTVYYMHWFQQKPG KSPKLWIYSTSNLASGVPARFSGSGSGTSYSLTISS LQPEDFATYYCQYRSSYWYTFGQGTKLEIK |
| Variable domain of the light chain of the antibody II | SEQ ID NO. 125 | TQSPSFLSASVGDRVTITCSASSSGYYMHWFQQKPG KSPKLWIYTTSNLASGVPARFSGSGSGTSYSLTISS LQPEDFATYYCQYRFSYWYTFGQGTKLEIK |

TABLE 2-continued

| | Sequence No. | Amino Acid Sequence |
|---|---|---|
| Variable domain of the light chain of the antibody II | SEQ ID NO. 126 | TQSPSFLSASVGDRVTITCSASSSISYMHWFQQKPG KSPKLWIYSTSNLASGVPARFSGSGSGTSYSLTISS LQPEDFATYYCQQRSSFPYTFGQGTKLEIK |
| Variable domain of the light chain of the antibody II | SEQ ID NO. 127 | TQSPSFLSASVGDRVTITCSASSTITYMHWFQQKPG KSPKLWIYYTSNLASGVPARFSGSGSGTSYSLTISS LQPEDFATYYCQNRTSFHYTFGQGTKLEIK |
| Variable domain of the light chain of the antibody II | SEQ ID NO. 128 | TQSPSFLSASVGDRVTITCSASSSVSYMHWFQQKPG KSPKLWIYSTSNLASGVPARFSGSGSGTSYSLTISS LQPEDFATYYCQQRSSYPYTFGQGTKLEIK |
| Variable domain of the light chain of the antibody II | SEQ ID NO. 129 | TQSPSFLSASVGDRVTITCSASSSVSYMHWFQQKPG KSPKLWIYSTSNLASGVPARFSGSGSGTSYSLTISS LQPEDFATYYCQNRYSYPYTFGQGTKLEIK |
| Variable domain of the light chain of the antibody II | SEQ ID NO. 130 | TQSPSFLSASVGDRVTITCSASSTVYYMHWFQQKPG KSPKLWIYSYSNLASGVPARFSGSGSGTSYSLTISS LQPEDFATYYCQQRSSYHYTFGQGTKLEIK |
| Variable domain of the light chain of the antibody II | SEQ ID NO. 131 | TQSPSFLSASVGDRVTITCSASSSASYMHWFQQKPG KSPKLWIYSYSNLASGVPARFSGSGSGTSYSLTISS LQPEDFATYYCQYRTSYPYTFGQGTKLEIK |
| Variable domain of the light chain of the antibody II | SEQ ID NO. 132 | TQSPSFLSASVGDRVTITCSASSSGYYMHWFQQKPG KSPKLWIYTTSNLASGVPARFSGSGSGTSYSLTISS LQPEDFATYYCQQRSSYPYTFGQGTKLEIK |
| Variable domain of the heavy chain of the antibody II | SEQ ID NO. 133 | VQLVQSGAEVKKPGASVKVSCKASGYSTSSFVMHWV RQAPGQGLEWMGYINYYNDATKYNEKFKGRVTITSD KSASTAYMELSSLRSEDTAVYYCAWSGAIFEYWGQG TLVTVS |
| Variable domain of the heavy chain of the antibody II | SEQ ID NO. 134 | VQLVQSGAEVKKPGASVKVSCKASGYYTSSPVMHWV RQAPGQGLEWMGYINYFYDGTKYNEKFKGRVTITSD KSASTAYMELSSLRSEDTAVYYCAKSAIAFEYWGQG TLVTVS |
| Variable domain of the heavy chain of the antibody II | SEQ ID NO. 135 | VQLVQSGAEVKKPGASVKVSCKASGYYTTSYVMHWV RQAPGQGLEWMGYINPYYDGTKYNEKFKGRVTITSD KSASTAYMELSSLRSEDTAVYYCARSGGIFDYWGQG TLVTVS |
| Variable domain of the heavy chain of the antibody II | SEQ ID NO. 136 | VQLVQSGAEVKKPGASVKVSCKASGYSFTSYVMHWV RQAPGQGLEWMGYINPYNDGTKYNEKFKGRVTITSD KSASTAYMELSSLRSEDTAVYYCARSIGITDYWGQG TLVTVS |
| Variable domain of the heavy chain of the antibody II | SEQ ID NO. 137 | VQLVQSGAEVKKPGASVKVSCKASGYFFSSFVMHWV RQAPGQGLEWMGYINYYNDATKYNEKFKGRVTITSD KSASTAYMELSSLRSEDTAVYYCARSAALSEYWGQG TLVTVS |
| Variable domain of the heavy chain of the antibody II | SEQ ID NO. 138 | VQLVQSGAEVKKPGASVKVSCKASGYTFTSYVMHWV RQAPGQGLEWMGYINPYNDGTKYNEKFKGRVTITSD KSASTAYMELSSLRSEDTAVYYCAWSGAIFEYWGQG TLVTVS |

TABLE 2-continued

| | Sequence No. | Amino Acid Sequence |
|---|---|---|
| Variable domain of the heavy chain of the antibody II | SEQ ID NO. 139 | VQLVQSGAEVKKPGASVKVSCKASGYFYTSYVMHWV RQAPGQGLEWMGYINPFQDITKYNEKFKGRVTITSD KSASTAYMELSSLRSEDTAVYYCAWSAALSEYWGQG TLVTVS |
| Variable domain of the heavy chain of the antibody II | SEQ ID NO. 140 | VQLVQSGAEVKKPGASVKVSCKASGYFFSSFVMHWV RQAPGQGLEWMGYINHFQDATKYNEKFKGRVTITSD KSASTAYMELSSLRSEDTAVYYCARSVGITDYWGQG TLVTVS |
| Variable domain of the heavy chain of the antibody II | SEQ ID NO. 141 | VQLVQSGAEVKKPGASVKVSCKASGYYTSSPVMHWV RQAPGQGLEWMGYINPYNDGTKYNEKFKGRVTITSD KSASTAYMELSSLRSEDTAVYYCAKSGGISDYWGQG TLVTVS |
| Variable domain of the heavy chain of the antibody II | SEQ ID NO. 142 | VQLVQSGAEVKKPGASVKVSCKASGYYTTSYVMHWV RQAPGQGLEWMGYINHFQDATKYNEKFKGRVTITSD KSASTAYMELSSLRSEDTAVYYCAWSGAIFEYWGQG TLVTVS |

TABLE 3

| Positive Control | Sequence No. | Amino Acid Sequence |
|---|---|---|
| Variable domain of a light chain | SEQ ID NO. 105 | DIQMTQSPSSLSASVGDRVTITCRASQDVSTAVAWYQQKPGK APKLLIYSASFLYSGVPSRFSGSGSGTDFTLTISSLQPEDFA TYYCQQYLYHPATFGQGTKVEIK |
| Variable domain of a heavy chain | SEQ ID NO. 106 | EVQLVESGGGLVQPGGSLRLSCAASGFTFSDSWIHWVRQAPG KGLEWVAWISPYGGSTYYADSVKGRFTISADTSKNTAYLQMN SLRAEDTAVYYCARRHWPGGFDYWGQGTLVTVSS |

TABLE 4

| Constant Region | Sequence No. | Amino Acid Sequence |
|---|---|---|
| Constant region of a light chain | SEQ ID NO. 143 | RTVAAPSVFIFPPSDEQLKSGTASVVCLLNNFYPREAKVQWK VDNALQSGNSQESVTEQDSKDSTYSLSSTLTLSKADYEKHKV YACEVTHQGLSSPVTKSFNRGEC |
| Constant region of a heavy chain | SEQ ID NO. 144 | SASTKGPSVFPLAPCSRSTSESTAALGCLVKDYFPEPVTVSW NSGALTSGVHTFPAVLQSSGLYSLSSVVTVPSSSLGTKTYTC NVDHKPSNTKVDKRVESKYGPPCPPCPAPEFLGGPSVFLFPP KPKDTLMISRTPEVTCVVVDVSQEDPEVQFNWYVDGVEVHNA KTKPREEQFNSTYRVVSVLTVLHQDWLNGKEYKCKVSNKGLP SSIEKTISKAKGQPREPQVYTLPPSQEEMTKNQVSLTCLVKG FYPSDIAVEWESNGQPENNYKTTPPVLDSDGSFFLYSRLTVD KSRWQEGNVFSCSVMHEALHNHYTQKSLSLSLGK |

TABLE 5

| FR | Sequence No. | Amino Acid Sequence |
|---|---|---|
| FR I-FR-L1 in the variable domain of the light chain of the antibody I | SEQ ID NO. 1 | DIQMTQSPSSLSASVGDRV TITCRAS |
| FR I-FR-L2 in the variable domain of the light chain of the antibody I | SEQ ID NO. 2 | LNWLQQKPGKAIKRLIY |

TABLE 5-continued

| FR | Sequence No. | Amino Acid Sequence |
| --- | --- | --- |
| FR I-FR-L3 in the variable domain of the light chain of the antibody I | SEQ ID NO. 3 | SLDSGVPKRFSGSRSGSDY SLTISSLQPEDFATYYC |
| FR I-FR-L4 in the variable domain of the light chain of the antibody I | SEQ ID NO. 4 | FGQGTKLEIK |
| FR I-FR-H1 in the variable domain of the heavy chain of the antibody I | SEQ ID NO. 5 | VQLVQSGAEVKKPGASVKV SCKAS |
| FR I-FR-H2 in the variable domain of the heavy chain of the antibody I | SEQ ID NO. 6 | MHWVRQAPGQGLEWMGA |
| FR I-FR-H3 in the variable domain of the heavy chain of the antibody I | SEQ ID NO. 7 | SYNQKFKGRVTITAVTSAS TAYMELSSLRSEDTAVYYC |
| FR I-FR-H4 in the variable domain of the heavy chain of the antibody I | SEQ ID NO. 8 | WGQGTLVTVS |
| FR II-FR-L1 in the variable domain of the light chain of the antibody II | SEQ ID NO. 9 | TQSPSFLSASVGDRVTITC SAS |
| FR II-FR-L2 in the variable domain of the light chain of the antibody II | SEQ ID NO. 10 | MHWFQQKPGKSPKLWIY |
| FR II-FR-L3 in the variable domain of the light chain of the antibody II | SEQ ID NO. 11 | NLASGVPARFSGSGSGTSY SLTISSLQPEDFATYYC |
| FR II-FR-L4 in the variable domain of the light chain of the antibody II | SEQ ID NO. 12 | FGQGTKLEIK |
| FR II-FR-H1 in the variable domain of the heavy chain of the antibody II | SEQ ID NO. 13 | VQLVQSGAEVKKPGASVKV SCKAS |
| FR II-FR-H2 in the variable domain of the heavy chain of the antibody II | SEQ ID NO. 14 | MHWVRQAPGQGLEWMGY |
| FR II-FR-H3 in the variable domain of the heavy chain of the antibody II | SEQ ID NO. 15 | KYNEKFKGRVTITSDKSAS TAYMELSSLRSEDTAVYYC |
| FR II-FR-H4 in the variable domain of the heavy chain of the antibody II | SEQ ID NO. 16 | WGQGTLVTVS |

Two types of antibody, the antibody I and the antibody II, were designed by this method.

The "positive control" antibody herein refers to an anti-PD-L1 antibody disclosed by F. Hoffmann-La Roche Ltd. A sequence of a variable domain of a light chain and a sequence of a variable domain of a heavy chain of the positive control antibody are respectively as shown in SEQ ID NO. 105 and SEQ ID NO. 106 in Table 3, and sequences of constant regions of the light chain and the heavy chain are respectively as shown in SEQ ID NO. 143 and SEQ ID NO. 144 in Table 4.

Example 2 Expression of Candidate Antibodies in Mammals

DNAs corresponding to amino acid sequences of a series of designed antibodies (an antibody I and an antibody II) and a positive control antibody were synthesized by conventional artificial DNA synthesis methods. With HEK 293 (or CHO cell) as a host cell and an ampicillin-resistant pTT5 plasmid as a vector, the DNAs of a series of designed antibodies (the antibody I and the antibody II) were inserted into vectors, and DNAs corresponding to the positive control antibody were inserted into a vector so that expression vectors were constructed. The constructed vectors were subjected to gene sequencing to determine correctly constructed vectors. The correctly constructed vectors (including positive control) were transiently or stably transfected into HEK 293 cells (or CHO cells), separately and incubated for 7 days. Candidate antibodies expressed in supernatants were preliminarily isolated, collected and filtered. A series of designed antibodies (the antibody I and the antibody II) were expressed so that a series of candidate antibodies (the antibody I and the antibody II) and the positive control antibody were obtained. Processes and steps used for the expression of the candidate antibodies were conventional methods and processes for the expression of antibodies in mammalian cells.

Example 3 Isolation and Purification of Candidate Antibodies

Candidate antibodies (an antibody I and an antibody II) and positive control were expressed in host cells and antibodies expressed in supernatants were preliminarily isolated and collected. The collected supernatants were isolated and purified by Protein A magnetic beads and then detected through SDS-PAGE. After each candidate antibody was isolated through SDS-PAGE, two clear electrophoretic bands were obtained at about 70 kDa and 30 kDa, respectively, and the expression of a heavy chain and a light chain of the antibody can be preliminarily determined. The SDS-PAGE electrophoresis diagrams of some antibodies (the antibody I and the antibody II) and a positive control antibody are shown in FIG. 1. From left to right, the first lane is the antibody I, the second lane is the antibody II, and the third lane is the positive control. A sample of the antibody I is antibody I-HX-2, and a sample of the antibody II is antibody II-HX-15. Finally, the antibody I and the antibody II with purity greater than 95.0% were obtained. Processes and steps used for the purification of the candidate antibodies were conventional methods and processes.

Example 4 Determination of Affinity of Candidate Antibodies

To determine the binding affinity of a candidate antibody to an antigen, Bio-layer Interferometry (ForteBIO Octet system) was used for determining the affinity of the antibody to the antigen. The association constant, dissociation constant and affinity constant of the antibody with the antigen were determined through qualitative analyses. A positive control antibody was the positive control antibody in Example 1. The antigen was a human PD-L1 antigen (purchased from Beijing Sino Biological Inc, Catalog No. #10084-H08H-100). The isolated and purified antibody I and antibody II samples were taken to test the affinity of the antibody I, the antibody II and positive control to human PD-L1.

(1) Test of Binding Kinetics Based on Protein A

Figure 2A:
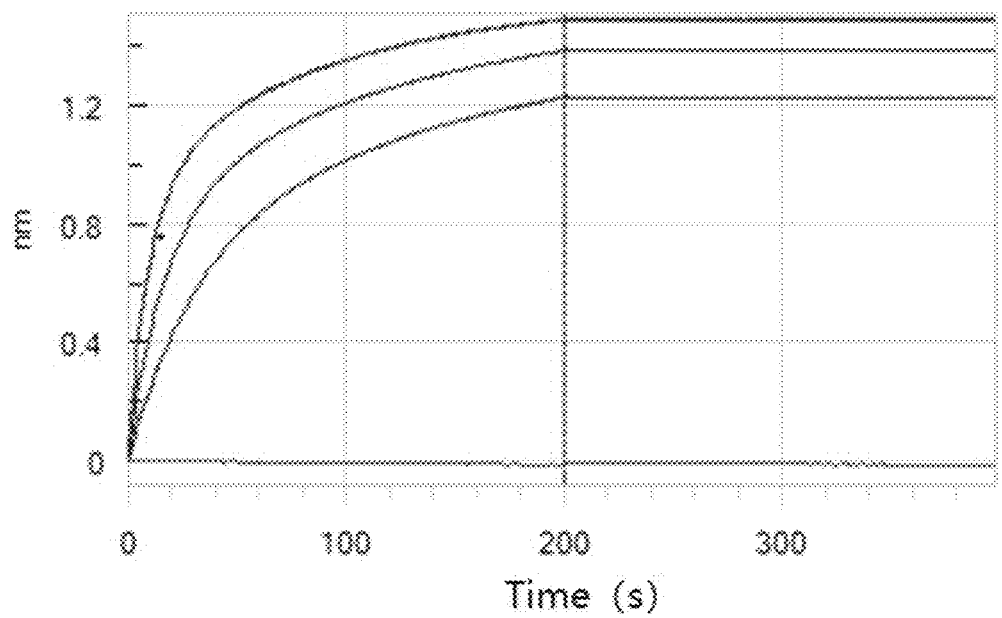
FIGS. 2A to 2C show an antibody I, an antibody II and a positive control antibody, respectively.
Figure 2B:
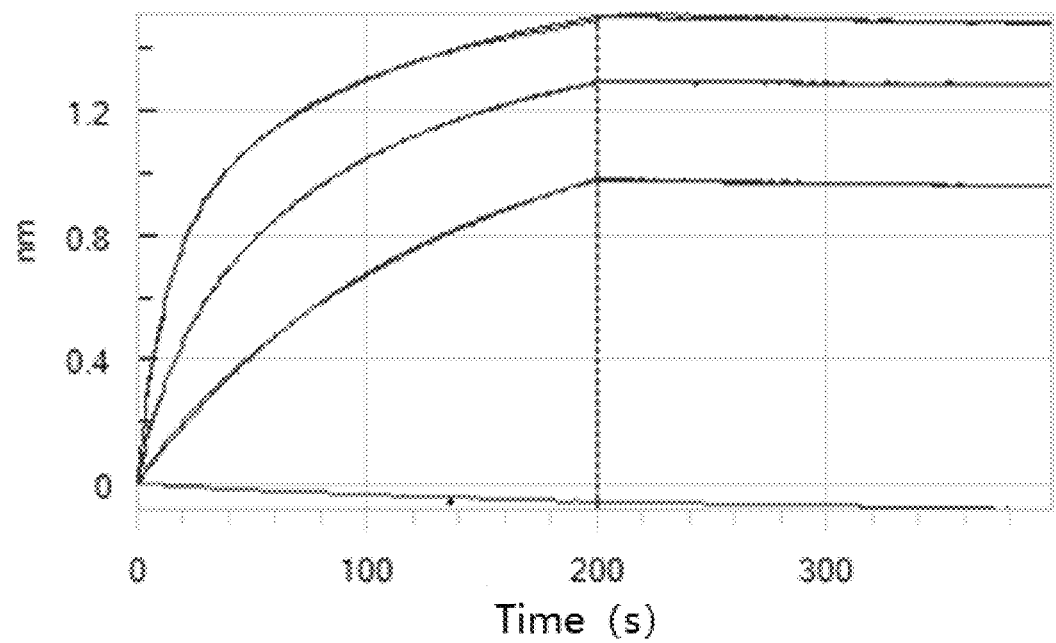
Figure 2C:
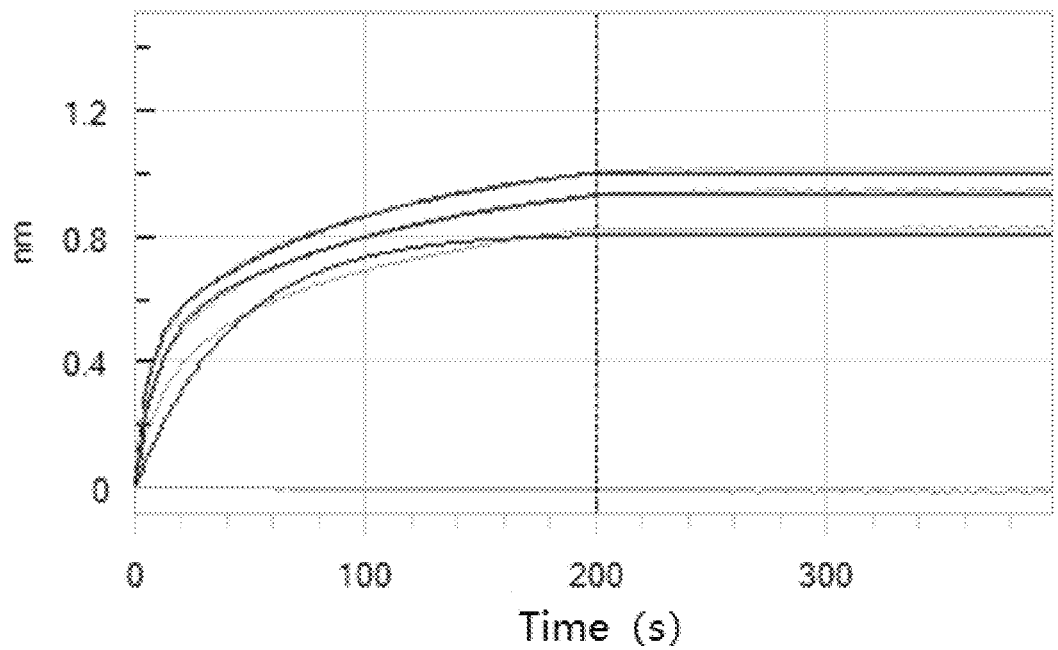

Protein A was used to bind to a candidate antibody I sample, a candidate antibody II sample and the positive control antibody to form Protein A-candidate antibody I sample, Protein A-candidate antibody II sample and Protein A-positive control antibody complexes. The human PD-L1 antigen was added, and binding kinetic curves were determined by a ForteBIO Octet platform. As can be known from test results, with continuous binding of Protein A-candidate antibodies to the antigen, an interference spectrum curve moves toward the direction of wavelength increase and finally tends to be stable. The candidate antibody I sample and the candidate antibody II sample both have strong binding activity to the human PD-L1 antigen. The test results of the candidate antibody I sample are shown in FIG. 2A, the test results of the candidate antibody II sample are shown in FIG. 2B, and the test results of the positive control antibody are shown in FIG. 2C. In FIG. 2, three curves in each graph represent three different concentrations, where antibody I-HX-2 is selected as the antibody I sample, and antibody II-HX-15 is selected as the antibody II sample.

(2) Test of Binding Kinetics Based on Anti-Human Fc

Figure 3A:
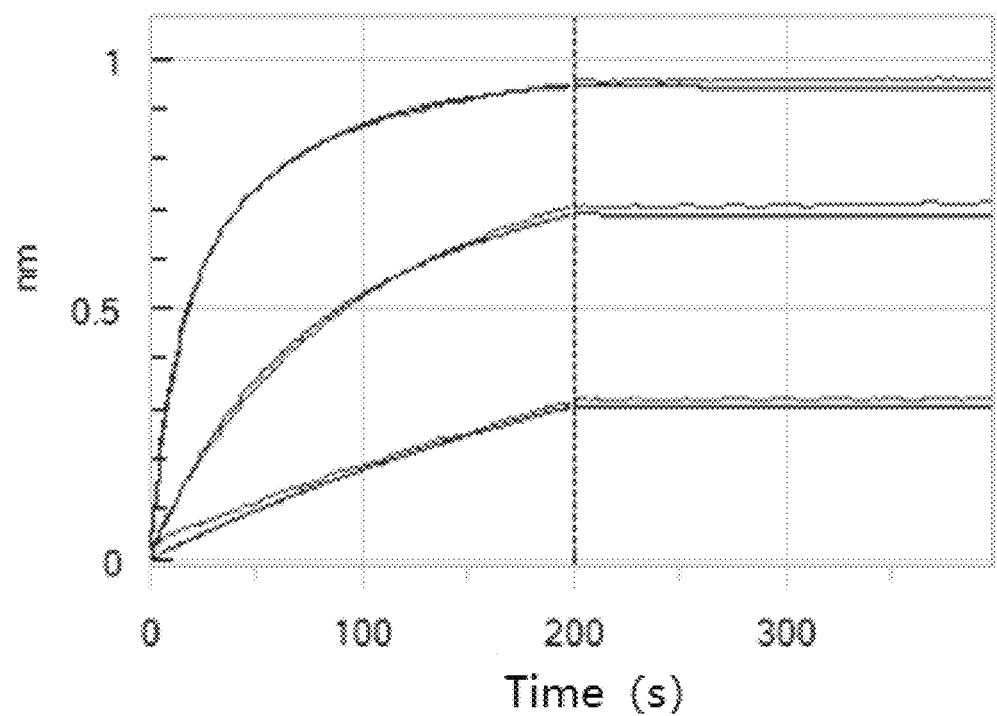
FIGS. 3A to 3C show an antibody I, an antibody II and a positive control antibody, respectively.
Figure 3B:
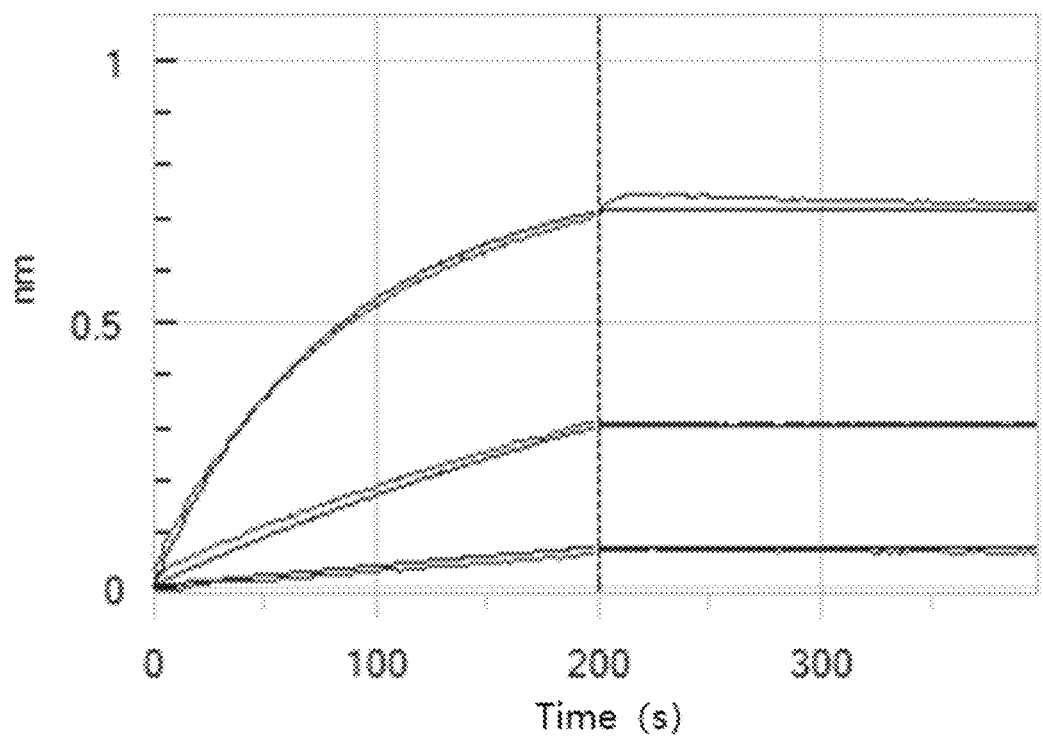
Figure 3C:
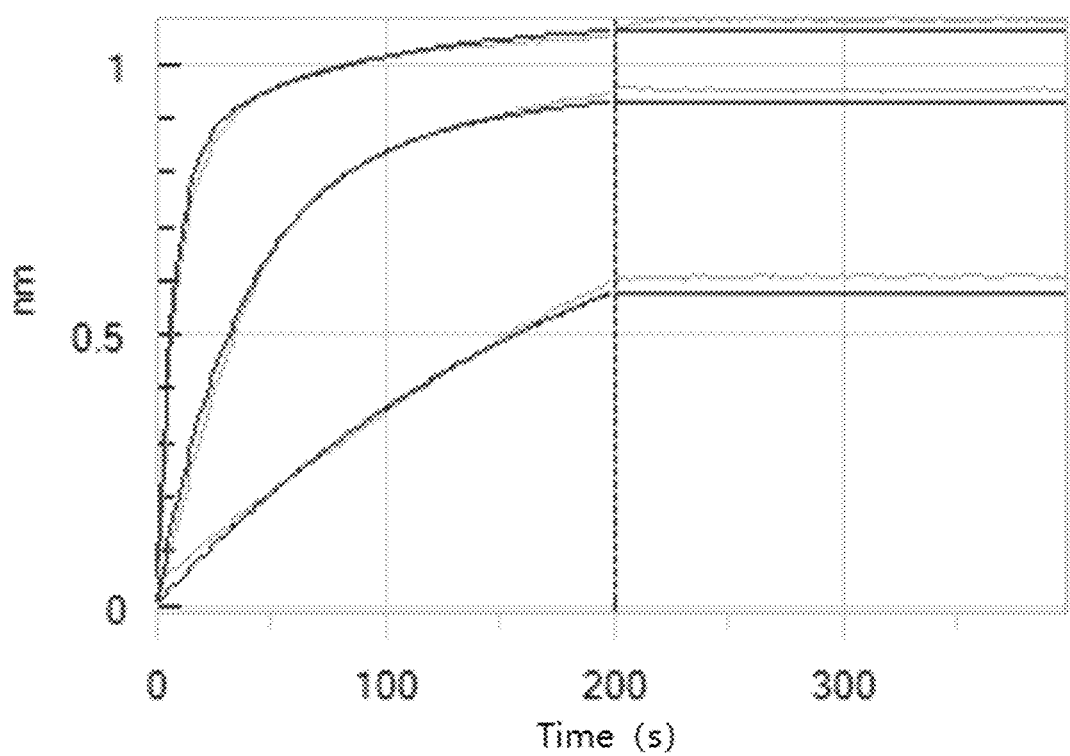

Anti-human Fc fragments were used to bind to the candidate antibody I sample, the candidate antibody II sample and the positive control antibody to form anti-human Fc fragment-candidate antibody I sample, anti-human Fc fragment-candidate antibody II sample and anti-human Fc fragment-positive control antibody complexes. The human PD-L1 antigen was added, and binding kinetic curves were determined by the ForteBIO Octet platform. As can be known from test results, with continuous binding of anti-human Fc fragment-candidate antibody I sample, anti-human Fc fragment-candidate antibody II sample and anti-human Fc fragment-positive control antibody to the human PD-L1 antigen, the detected interference spectrum curve moves toward the direction of wavelength increase. The test results of the candidate antibody I sample, the candidate antibody II sample and the positive control antibody are shown in FIG. 3A, FIG. 3B and FIG. 3C, respectively. Antibody I-HX-2 is selected as the antibody I sample, and antibody II-HX-15 is selected as the antibody II sample.

Kinetic constants were obtained from the preceding determined kinetic curves. The kinetic constants of the antibody I binding to the human PD-L1 antigen are shown in Table 6 and the kinetic constants of the antibody II binding to the human PD-L1 antigen are shown in Table 7.

TABLE 6

| Detection Sample of Antibody I | Association Rate Constant kon (1/Ms) | Disassociation Rate Constant kdis (1/s) | Equilibrium Disassociation Constant KD (M) | Full R^2 |
|---|---|---|---|---|
| Antibody I-HX-1 | 8.92E+03 | 4.10E−07 | 4.60E−11 | 0.995131 |
| Antibody I-HX-2 | 9.28E+03 | 2.70E−07 | 2.91E−11 | 0.992429 |
| Antibody I-HX-3 | 7.08E+03 | 1.92E−06 | 2.71E−10 | 0.994982 |
| Antibody I-HX-4 | 8.10E+03 | 8.95E−07 | 1.10E−10 | 0.991726 |
| Antibody I-HX-5 | 7.12E+03 | 3.27E−06 | 4.59E−10 | 0.992477 |
| Antibody I-HX-6 | 8.93E+03 | 4.29E−07 | 4.81E−11 | 0.993229 |
| Antibody I-HX-7 | 9.09E+03 | 4.27E−07 | 4.70E−11 | 0.996294 |
| Antibody I-HX-8 | 6.99E+03 | 1.81E−06 | 2.59E−10 | 0.996221 |
| Positive control antibody | 7.29E+04 | 8.90E−07 | 1.22E−11 | 0.996965 |

As can be seen from Table 6, the KD of the antibody I obtained through affinity tests is between $2.91 \times 10^{-11}$ to $4.59 \times 10^{-10}$, which indicates that the antibody I has strong affinity to the human PD-L1 antigen. The antibody I-HX-2 has the strongest affinity to the human PD-L1 antigen and its equilibrium dissociation constant is $2.91 \times 10^{-11}$, which is very close to that of the positive control.

TABLE 7

| Detection Sample of Antibody II | Association Rate Constant kon (1/Ms) | Disassociation Rate Constant kdis (1/s) | Equilibrium Disassociation Constant KD (M) | Full R^2 |
| --- | --- | --- | --- | --- |
| Antibody II-HX-10 | 2.51E+03 | 9.20E−06 | 3.67E−09 | 0.996271 |
| Antibody II-HX-11 | 2.75E+03 | 7.71E−06 | 2.80E−09 | 0.995129 |
| Antibody II-HX-12 | 3.47E+03 | 7.93E−07 | 2.28E−10 | 0.996629 |
| Antibody II-HX-13 | 3.01E+03 | 2.13E−06 | 7.07E−10 | 0.994516 |
| Antibody II-HX-14 | 2.99E+03 | 9.55E−06 | 3.19E−09 | 0.993947 |
| Antibody II-HX-15 | 3.76E+03 | 5.60E−07 | 1.49E−10 | 0.995068 |
| Antibody II-HX-16 | 2.50E+03 | 9.19E−06 | 3.71E−09 | 0.995161 |
| Antibody II-HX-17 | 2.71E+03 | 4.92E−06 | 1.82E−09 | 0.993928 |
| Antibody II-HX-18 | 3.08E+03 | 1.92E−06 | 6.24E−10 | 0.994701 |
| Antibody II-HX-19 | 3.04E+03 | 3.75E−06 | 1.23E−09 | 0.996247 |
| Positive control antibody | 7.29E+04 | 8.90E−07 | 1.22E−11 | 0.996965 |

As can be seen from Table 7, the equilibrium dissociation constant of the antibody II obtained through affinity tests is between $1.49 \times 10^{-10}$ to $3.71 \times 10^{-9}$, which indicates that the antibody II sample has relatively strong affinity to the human PD-L1 antigen. The antibody II-HX-15 has an equilibrium dissociation constant of $1.49 \times 10^{-10}$ and has relatively strong affinity to human PD-L1 among test samples.

Amino acid sequences corresponding to test samples of the antibody I and the antibody II in Table 6 and Table 7 are shown in Table 8 and Table 9, respectively.

TABLE 8

| Antibody I | Light Chain Variable Region | Heavy Chain Variable Region | Light Chain Constant Region | Heavy Chain Constant Region |
| --- | --- | --- | --- | --- |
| Antibody I-HX-1 | SEQ ID NO. 107 | SEQ ID NO. 115 | SEQ ID NO. 143 | SEQ ID NO. 144 |
| Antibody I-HX-2 | SEQ ID NO. 108 | SEQ ID NO. 116 | SEQ ID NO. 143 | SEQ ID NO. 144 |
| Antibody I-HX-3 | SEQ ID NO. 109 | SEQ ID NO. 117 | SEQ ID NO. 143 | SEQ ID NO. 144 |
| Antibody I-HX-4 | SEQ ID NO. 110 | SEQ ID NO. 118 | SEQ ID NO. 143 | SEQ ID NO. 144 |
| Antibody I-HX-5 | SEQ ID NO. 111 | SEQ ID NO. 119 | SEQ ID NO. 143 | SEQ ID NO. 144 |
| Antibody I-HX-6 | SEQ ID NO. 112 | SEQ ID NO. 120 | SEQ ID NO. 143 | SEQ ID NO. 144 |
| Antibody I-HX-7 | SEQ ID NO. 113 | SEQ ID NO. 121 | SEQ ID NO. 143 | SEQ ID NO. 144 |
| Antibody I-HX-8 | SEQ ID NO. 114 | SEQ ID NO. 122 | SEQ ID NO. 143 | SEQ ID NO. 144 |
| Positive Control Antibody | SEQ ID NO. 105 | SEQ ID NO. 106 | SEQ ID NO. 143 | SEQ ID NO. 144 |

TABLE 9

| Antibody II | Light Chain Variable Region | Heavy Chain Variable Region | Light Chain Constant Region | Heavy Chain Constant Region |
|---|---|---|---|---|
| Antibody II-HX-10 | SEQ ID NO 123 | SEQ ID NO 133 | SEQ ID NO. 143 | SEQ ID NO. 144 |
| Antibody II-HX-11 | SEQ ID NO 124 | SEQ ID NO 134 | SEQ ID NO. 143 | SEQ ID NO. 144 |
| Antibody II-HX-12 | SEQ ID NO 125 | SEQ ID NO 135 | SEQ ID NO. 143 | SEQ ID NO. 144 |
| Antibody II-HX-13 | SEQ ID NO 126 | SEQ ID NO 136 | SEQ ID NO. 143 | SEQ ID NO. 144 |
| Antibody II-HX-14 | SEQ ID NO 127 | SEQ ID NO 137 | SEQ ID NO. 143 | SEQ ID NO. 144 |
| Antibody II-HX-15 | SEQ ID NO 128 | SEQ ID NO 138 | SEQ ID NO. 143 | SEQ ID NO. 144 |
| Antibody II-HX-16 | SEQ ID NO 129 | SEQ ID NO 139 | SEQ ID NO. 143 | SEQ ID NO. 144 |
| Antibody II-HX-17 | SEQ ID NO 130 | SEQ ID NO 140 | SEQ ID NO. 143 | SEQ ID NO. 144 |
| Antibody II-HX-18 | SEQ ID NO 131 | SEQ ID NO 141 | SEQ ID NO. 143 | SEQ ID NO. 144 |
| Antibody II-HX-19 | SEQ ID NO 132 | SEQ ID NO 142 | SEQ ID NO. 143 | SEQ ID NO. 144 |
| Positive Control Antibody | SEQ ID NO. 105 | SEQ ID NO. 106 | SEQ ID NO. 143 | SEQ ID NO. 144 |

Example 5 PD-L1 Antigen Epitope Binding Competition Experiment

To analyze and determine the binding epitopes of an antibody I and an antibody II to an antigen, Bio-layer Interferometry (ForteBIO Octet system) was used for antigen epitope analysis experiments. Amino acid sequences of a positive control antibody are the sequences of the positive control antibody in Table 7 or Table 8. The antigen is a human PD-L1 antigen (purchased from Beijing Sino Biological Inc, catalog No. #10084-H08H-100). Antibody I-HX-2 is selected as an antibody I sample, and antibody II-HX-15 is selected as an antibody II sample.

Figure 4A:
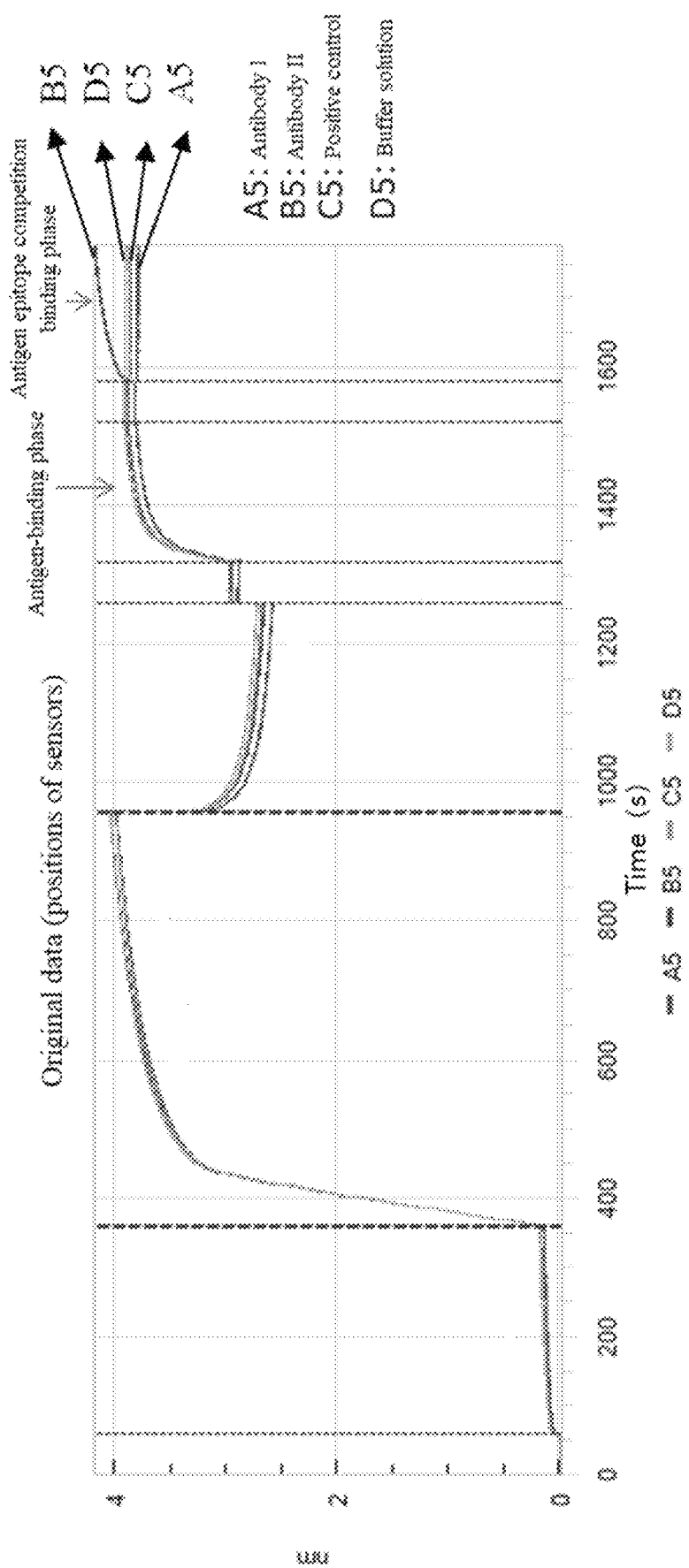
FIG. 4A shows the competition binding curves.
Figure 4B:
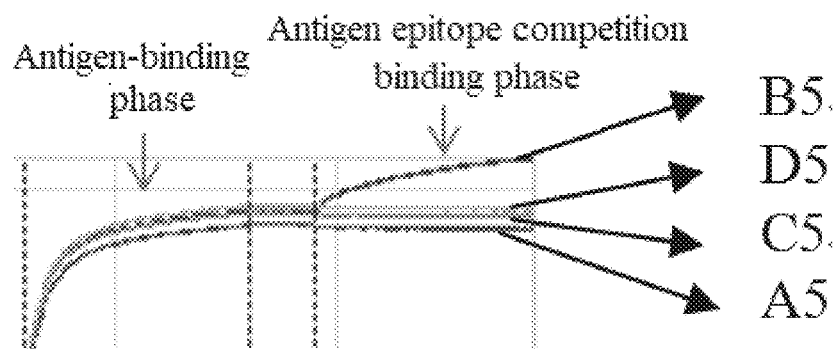
FIG. 4B is a partially enlarged view of FIG. 4A.

The Bio-layer Interferometry (ForteBIO Octet system) was used for antigen epitope binding competition experiments of a candidate antibody I, a candidate antibody II and the positive control antibody. The test results are shown in FIG. 4A and FIG. 4B, where FIG. 4B is a partially enlarged view of FIG. 4A. An analysis is performed from test results as follows: as shown in FIG. 4A, in the phase of 0-360 s which is an activation phase, a buffer solution is added and a baseline is formed; in the phase of 360-960 s which is an antibody loading phase, the antibody I, the antibody II and the positive control antibody are added, and with more and more antibody molecules binding to the biolayer of the biosensor, the thickness of biolayer increases and an interference spectrum curve moves toward the direction of wavelength increase; in the phase of 960-1260 s which is an antibody dissociation phase, the buffer solution is added, some antibodies binding to the biolayer of the biosensor are taken away by the buffer solution due to a weak binding ability, and the interference spectrum curve moves toward the direction of wavelength decrease, where the antibodies not taken away by the buffer solution have a strong ability to bind to the biosensor; in the phase of 1260-1320 s, the binding of the antibody to the biolayer is stable and a stable binding curve is formed; in the phase of 1320-1580 s which is the binding phase of the antibody to the antigen, the human PD-L1 antigen is added, more and more antigens bind to the antibody I, the antibody II and the positive control antibody with time passing by since the antibody I, the antibody II and the positive control antibody have strong binding affinity to the human PD-L1 antigen, and the interference spectrum curve moves towards the direction of wavelength increase and finally tends to be stable; in the phase of 1580s and later which is an antigen epitope binding competition phase, the positive control antibody is added to each system, the interference spectrum curves of the antibody I (see line A5 in FIG. 4) and the positive control antibody (see line C5 in FIG. 4) are unchanged in wavelength, which indicates that the antibody I does not compete with the positive control antibody to bind to antigen epitopes, that is, the added positive control antibody and the antibody I have the same antigen-binding epitopes; after the positive control antibody is added, the interference spectrum curve of the antibody II moves towards the direction of wavelength increase as the positive control antibody is added (see line B5 in FIG. 4), which indicates that the newly added positive control antibody binds to the antigen on the candidate antibody II, that is, the positive control antibody can bind to other antigen epitopes on the antibody II-antigen so that the interference spectrum curve increases in wavelength, further indicating that the antibody II and the positive control antibody have different antigen-binding epitopes.

An ability of the human PD-L1 antigen to bind to the Anti-HIS and NTA biosensor of the ForteBIO Octet platform was determined to exclude the interference of the binding of the biolayer to the antigen. The results are shown in FIG. 5A and FIG. 5B.

Figure 5A:
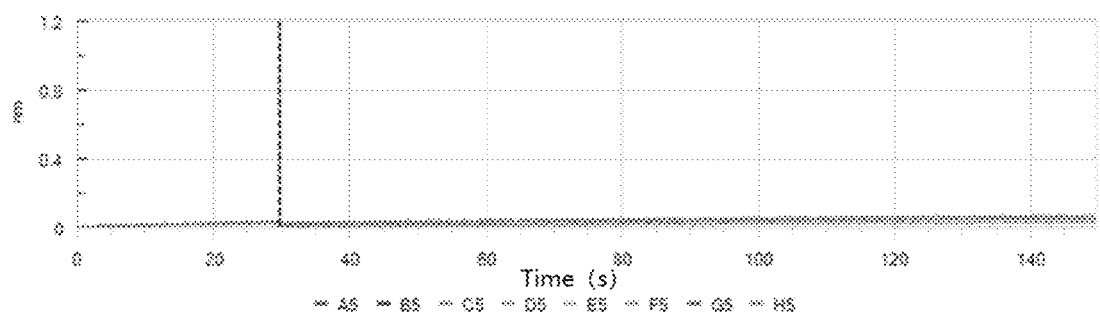
FIG. 5A shows a kinetic curve of the antigen binding to an NTA sensor.
Figure 5B:
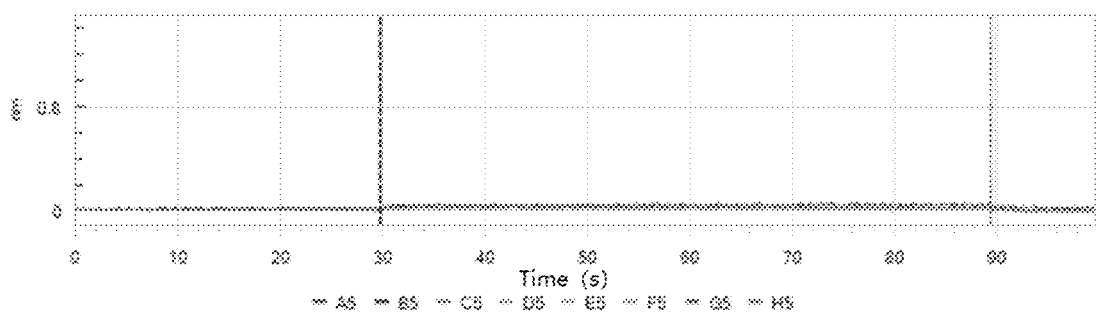
FIG. 5B shows a kinetic curve of the antigen binding to an HIS sensor.

As can be seen from FIG. 5A and FIG. 5B, the antigen has no ability to bind to the HIS and NTA biosensors so that the interference of the binding of the biosensors to the antigen with experimental results is excluded.

To conclude, the present application provides the anti-PD-L1 antibody, the method for preparing the same and the use thereof. An antibody sequence is simulated, analyzed and designed through bioinformatics modeling without complicated and cumbersome immune reactions, and the antibody is designed, transferred into a host cell through molecular biology construction, expressed in the host cell, and purified so that the antibody I and the antibody II can be obtained. The method is efficient and convenient. The antibody II has different binding epitopes from the positive control antibody and the antibody I and the antibody II have great market value and application prospect.

The applicant has stated that although the detailed method of the present application is described through the examples described above, the present application is not limited to the detailed method described above, which means that implementation of the present application does not necessarily depend on the detailed method described above. It should be apparent to those skilled in the art that any improvements made to the present application, equivalent replacements of raw materials of the product of the present application, additions of adjuvant ingredients to the product of the present application, and selections of specific manners, etc., all fall within the protection scope and the disclosed scope of the present application.

What is claimed is:

1. An anti-PD-L1 antibody, comprising an antibody I or an antibody II; wherein the antibody I comprises a light chain and a heavy chain, and a variable domain of the light chain of the antibody I comprises complementarity determining regions (CDRs) I-CDR-L1, I-CDR-L2 and I-CDR-L3 which are selected from the following amino acid sequences, respectively:

I-CDR-L1: QX2X3X4X5T (SEQ ID NO. 145);
I-CDR-L2: X7X8S;
I-CDR-L3: LX12X13X14SX16X17FT (SEQ ID NO. 146);

wherein X2=D, E, N, Q, X3=G, A, V, I, L, X4=G, A, V, I, L, X5=Q, N;
X7=G, A, V, I, L, X8=S, T;
X12=Q, Y, N, X13=Y, F, X14=G, A, V, I, L, X16=S, T, Y, X17=F, P; and a variable domain of the heavy chain of the antibody I comprises CDRs I-CDR-H1, I-CDR-H2 and I-CDR-H3 which are selected from the following amino acid sequences, respectively:

I-CDR-H1: GYX22X23X24X25YW (SEQ ID NO. 147);
I-CDR-H2: IYX30X31X32SX34T (SEQ ID NO. 148);
I-CDR-H3: TX37WX39X40X41X42X43HX45MX47H (SEQ ID NO. 149);

wherein X22=S, T, X23=F, Y, X24=N, S, T, Y, Q, X25=S, T, F;
X30=P, H, W, X31=G, A, V, I, L, X32=N, Q, H, X34=D, E;
X37=R, H, X39=G, A, V, I, L, X40=D, E, X41=G, A, V, I, L, X42=Y, F, X43=Y, F, X45=G, A, V, I, L, X47=Q, N, D, E;

wherein the antibody II comprises a light chain and a heavy chain, and a variable domain of the light chain of the antibody II comprises CDRs II-CDR-L1, II-CDR-L2 and II-CDR-L3 which are selected from the following amino acid sequences, respectively:

II-CDR-L1: SX52X53X54Y (SEQ ID NO. 150);
II-CDR-L2: X56X57S;
II-CDR-L3: QX60RX62SX64X65YT (SEQ ID NO. 151);

wherein X52=S, T, X53=G, A, V, I, L, X54=Y, T, S;
X56=Y, T, S, X57=Y, T, S;
X60=N, Q, Y, X62=F, T, S, X64=Y, F, X65=P, H, W; and a variable domain of the heavy chain of the antibody II comprises CDRs II-CDR-H1, II-CDR-H2 and II-CDR-H3 which are selected from the following amino acid sequences, respectively:

II-CDR-H1: GYX70X71X72SX74V (SEQ ID NO. 152);
II-CDR-H2: INX77X78X79DX81T (SEQ ID NO. 153);
II-CDR-H3: AX84SX86X87X88X89X90Y (SEQ ID NO. 154);

wherein X70=S, T, Y, F, X71=T, Y, F, X72=T, S, X74=Y, F, P;
X77=Y, H, P, X78=Y, F, X79=Q, N, Y, X81=G, A, V, I, L;
X84=W, R, K, X86=G, A, V, I, L, X87=G, A, V, I, L, X88=G, A, V, I, L, X89=S, T, F, X90=D, E.

2. The antibody according to claim 1, wherein the CDR I-CDR-L1 in the variable domain of the light chain of the antibody I comprises one of the amino acid sequences SEQ ID NO. 17, 18, 19, 20, 21, 22, 23, and 24;

or, the CDR I-CDR-L1 in the variable domain of the light chain of the antibody I comprises one of the amino acid sequences SEQ ID NO. 18, 19, 21, and 23;

or, the CDR I-CDR-L2 in the variable domain of the light chain of the antibody I comprises one of the amino acid sequences SEQ ID NO. 25, 26, 27, 28, 29, and 30;

or, the CDR I-CDR-L2 in the variable domain of the light chain of the antibody I comprises one of the amino acid sequences SEQ ID NO. 25, 26, 29, and 30;

or, the CDR I-CDR-L3 in the variable domain of the light chain of the antibody I comprises one of the amino acid sequences SEQ ID NO. 31, 32, 33, 34, 35, 36, 37, and 38;

or, the CDR I-CDR-L3 in the variable domain of the light chain of the antibody I comprises one of the amino acid sequences SEQ ID NO. 33, 34, 36, and 38;

or, the CDR I-CDR-H1 in the variable domain of the heavy chain of the antibody I comprises one of the amino acid sequences SEQ ID NO. 39, 40, 41, 42, 43, 44, and 45;

or, the CDR I-CDR-H1 in the variable domain of the heavy chain of the antibody I comprises one of the amino acid sequences SEQ ID NO. 40, 42, 43, 44, and 45;

or, the CDR I-CDR-H1 in the variable domain of the heavy chain of the antibody I comprises one of the amino acid sequences SEQ ID NO. 40, 42, 44, and 45;

or, the CDR I-CDR-H2 in the variable domain of the heavy chain of the antibody I comprises one of the amino acid sequences SEQ ID NO. 46, 47, 48, 49, 50, 51, and 52;

or, the CDR I-CDR-H2 in the variable domain of the heavy chain of the antibody I comprises one of the amino acid sequences SEQ ID NO. 46, 48, 49, and 51;

or, the CDR I-CDR-H3 in the variable domain of the heavy chain of the antibody I comprises one of the amino acid sequences SEQ ID NO. 53, 54, 55, 56, 57, 58, 59, 60, 61, and 62;

or, the CDR I-CDR-H3 in the variable domain of the heavy chain of the antibody I comprises one of the amino acid sequences SEQ ID NO. 53, 54, 57, 59, and 62;

or, the CDR I-CDR-H3 in the variable domain of the heavy chain of the antibody I comprises one of the amino acid sequences SEQ ID NO. 54, 57, 59, and 62.

3. The antibody according to claim 2, wherein the CDRs I-CDR-L1, I-CDR-L2 and I-CDR-L3 in the variable domain of the light chain of the antibody I comprise one of the following combinations of amino acid sequences, respectively:

SEQ ID NO. 17, 26 and 38; SEQ ID NO. 17, 24 and 35; SEQ ID NO. 19, 26 and 31; SEQ ID NO. 19, 29 and 34; SEQ ID NO. 20, 30 and 32; SEQ ID NO. 21, 30 and 32; SEQ ID NO. 23, 25 and 33; SEQ ID NO. 22, 29 and 38; SEQ ID NO. 22, 30 and 34; SEQ ID NO. 21, 28 and 33; SEQ ID NO. 24, 27 and 36; SEQ ID NO. 18, 29 and 37; SEQ ID NO. 21, 25 and 38; SEQ ID NO. 18, 25 and 34; SEQ ID NO. 18, 28 and 33; SEQ ID NO. 23, 30 and 35; and SEQ ID NO. 23, 29 and 38; and the CDRs I-CDR-H1, I-CDR-H2 and I-CDR-H3 in the variable domain of the heavy chain of the antibody I comprise one of the following combinations of amino acid sequences, respectively:

SEQ ID NO. 40, 52 and 53; SEQ ID NO. 42, 47 and 54; SEQ ID NO. 45, 49 and 55; SEQ ID NO. 45, 48 and 59; SEQ ID NO. 39, 51 and 55; SEQ ID NO. 43, 47 and 58; SEQ ID NO. 42, 49 and 56; SEQ ID NO. 41, 50 and 60; SEQ ID NO. 44, 48 and 62; SEQ ID NO. 40, 52 and 61; SEQ ID NO. 43, 51 and 57; SEQ ID NO. 45, 52 and 56; SEQ ID NO. 44, 46 and 57; SEQ ID NO. 42, 46 and 57; SEQ ID NO. 43, 48 and 62; SEQ ID NO. 42, 50 and 54; and SEQ ID NO. 45, 46 and 61.

4. The antibody according to claim 2, wherein the amino acid sequence of the variable domain of the light chain of the antibody I comprises one of SEQ ID NO. 107 to SEQ ID NO. 114; and the amino acid sequence of the variable domain of the heavy chain of the antibody I comprises one of SEQ ID NO. 115 to SEQ ID NO. 122.

5. The antibody according to claim 1, wherein the CDR II-CDR-L1 of the light chain of the antibody II comprises one of the amino acid sequences SEQ ID NO. 63, 64, 65, 66, 67, and 68;

or, the CDR II-CDR-L1 of the light chain of the antibody II comprises one of the amino acid sequences SEQ ID NO. 63, 64, 65, and 67;

or, the CDR II-CDR-L2 of the light chain of the antibody II comprises one of the amino acid sequences SEQ ID NO. 69, 70, 71, and 72;

or, the CDR II-CDR-L2 of the light chain of the antibody II comprises one of the amino acid sequences SEQ ID NO. 69, 70, and 72;

or, the CDR II-CDR-L3 of the light chain of the antibody II comprises one of the amino acid sequences SEQ ID NO. 73, 74, 75, 76, 77, 78, 79, 80, and 81;

or, the CDR II-CDR-L3 of the light chain of the antibody II comprises one of the amino acid sequences SEQ ID NO. 76, 77, 78, 79, 80, and 81;

or, the CDR II-CDR-H1 of the heavy chain of the antibody II comprises one of the amino acid sequences SEQ ID NO. 82, 83, 84, 85, 86, 87, and 88;

or, the CDR II-CDR-H1 of the heavy chain of the antibody II comprises one of the amino acid sequences SEQ ID NO. 82, 83, 86, and 88;

or, the CDR II-CDR-H2 of the heavy chain of the antibody II comprises one of the amino acid sequences SEQ ID NO. 89, 90, 91, 92, 93, 94, and 95;

or, the CDR II-CDR-H2 of the heavy chain of the antibody II comprises one of the amino acid sequences SEQ ID NO. 89, 90, 91, and 93;

or, the CDR II-CDR-H3 of the heavy chain of the antibody II comprises one of the amino acid sequences SEQ ID NO. 96, 97, 98, 99, 100, 101, 102, 103, and 104;

or, the CDR II-CDR-H3 of the heavy chain of the antibody II comprises one of the amino acid sequences SEQ ID NO. 96, 98, 99, and 102.

6. The antibody according to claim 5, wherein the CDRs II-CDR-L1, II-CDR-L2 and II-CDR-L3 of the light chain of the antibody II comprise one of the following combinations of amino acid sequences, respectively:

SEQ ID NO. 63, 69 and 76; SEQ ID NO. 64, 70 and 81; SEQ ID NO. 65, 71 and 77; SEQ ID NO. 68, 70 and 73; SEQ ID NO. 67, 72 and 76; SEQ ID NO. 66, 72 and 80; SEQ ID NO. 64, 72 and 77; SEQ ID NO. 67, 72 and 81; SEQ ID NO. 63, 70 and 79; SEQ ID NO. 63, 70 and 74; SEQ ID NO. 64, 69 and 75; SEQ ID NO. 67, 72 and 78; SEQ ID NO. 63, 70 and 80; SEQ ID NO. 66, 69 and 78; and SEQ ID NO. 65, 71 and 79; and the CDRs II-CDR-H1, II-CDR-H2 and II-CDR-H3 of the heavy chain of the antibody II comprise one of the following combinations of amino acid sequences, respectively:

SEQ ID NO. 82, 89 and 96; SEQ ID NO. 83, 90 and 98; SEQ ID NO. 84, 95 and 103; SEQ ID NO. 85, 91 and 97; SEQ ID NO. 88, 92 and 102; SEQ ID NO. 86, 91 and 99; SEQ ID NO. 87, 94 and 100; SEQ ID NO. 88, 93 and 101; SEQ ID NO. 88, 90 and 99; SEQ ID NO. 83, 91 and 99; SEQ ID NO. 82, 93 and 102; SEQ ID NO. 86, 95 and 98; SEQ ID NO. 86, 91 and 104; SEQ ID NO. 82, 89 and 102; and SEQ ID NO. 84, 93 and 96.

7. The antibody according to claim 5, wherein the amino acid sequence of the variable domain of the light chain of the antibody II comprises one of SEQ ID NO. 123 to SEQ ID NO. 132; and the amino acid sequence of the variable domain of the heavy chain of the antibody II comprises one of SEQ ID NO. 133 to SEQ ID NO. 142.

8. The antibody according to claim 1, wherein a framework region (FR) in the variable domain of the light chain of the antibody I is selected from the following sequences:

```
I-FR-L1: SEQ ID NO. 1:
DIQMTQSPSSLSASVGDRVTITCRAS;

I-FR-L2: SEQ ID NO. 2:
LNWLQQKPGKAIKRLIY;

I-FR-L3: SEQ ID NO. 3:
SLDSGVPKRFSGSRSGSDYSLTISSLQPEDFATYYC;
and

I-FR-L4: SEQ ID NO. 4:
FGQGTKLEIK and;
``` a framework region in the variable domain of the heavy chain of the antibody I is selected from the following sequences:

```
I-FR-H1: SEQ ID NO. 5:
VQLVQSGAEVKKPGASVKVSCKAS;

I-FR-H2: SEQ ID NO. 6:
MHWVRQAPGQGLEWMGA;
```

```
I-FR-H3: SEQ ID NO. 7:
SYNQKFKGRVTITAVTSASTAYMELSSLRSEDTAVYYC;
and

I-FR-H4: SEQ ID NO. 8:
WGQGTLVTVS or;
``` a framework region in the variable domain of the light chain of the antibody II is selected from the following sequences:

```
II-FR-L1: SEQ ID NO. 9:
TQSPSFLSASVGDRVTITCSAS;

II-FR-L2: SEQ ID NO. 10:
MHWFQQKPGKSPKLWIY;

II-FR-L3: SEQ ID NO. 11:
NLASGVPARFSGSGSGTSYSLTISSLQPEDFATYYC;
and

II-FR-L4: SEQ ID NO. 12:
FGQGTKLEIK;
``` and
a framework region in the variable domain of the heavy chain of the antibody II is selected from the following sequences:

```
II-FR-H1: SEQ ID NO. 13:
VQLVQSGAEVKKPGASVKVSCKAS;

II-FR-H2: SEQ ID NO. 14:
MHWVRQAPGQGLEWMGY;

II-FR-H3: SEQ ID NO. 15:
KYNEKFKGRVTITSDKSASTAYMELSSLRSEDTAVYYC;
and

II-FR-H4: SEQ ID NO. 16:
WGQGTLVTVS.
```

9. The antibody according to claim 1, wherein the antibody further comprises a human constant region;
the human constant region comprises any one or a combination of at least two of IgG1, IgG2, IgG3 or IgG4;
or, the antibody further comprises a murine constant region;
the murine constant region comprises any one or a combination of at least two of IgG1, IgG2A, IgG2B or IgG3, or IgG2A.

10. The antibody according to claim 1, wherein the antibody is modified by glycosylation.

11. The antibody according to claim 1, wherein the antibody is a monoclonal antibody, an antibody fragment, a bispecific antibody, a trispecific antibody, or a tetraspecific antibody.

12. A nucleic acid for encoding the antibody according to claim 1.

13. A vector, comprising the nucleic acid according to claim 12.

14. A host cell, expressing the antibody according to claim 1;
wherein the host cell is a eukaryotic cell or a prokaryotic cell.

15. The host cell according to claim 14, wherein the eukaryotic cell is a mammalian cell.

16. The host cell according to claim 14, wherein the eukaryotic cell is a HEK 293 cell, a Simian COS cell, a myeloma cell or a Chinese hamster ovary cell.

17. The host cell according to claim 14, wherein the prokaryotic cell is *E. coli, B. subtilis, P. aeruginosa* or *Salmonella typhimurium*.

18. A method for preparing the antibody according to claim 1, comprising the following steps:
(1) constructing a vector encoding the sequence of the antibody of claim 1;
(2) transforming or transfecting the vector obtained in step (1) into a host cell for expression;
(3) culturing the host cell under conditions suitable for the expression of the antibody; and
(4) isolating and purifying the antibody expressed in step (3).

19. A composition, comprising the antibody according to claim 1,
the composition further comprises a pharmaceutically acceptable carrier, buffer, excipient, stabilizer, preservative or other bioactive substances;
the other bioactive substances comprise any one or a combination of at least two of a cytotoxic agent, a chemotherapeutic agent, a growth inhibitor, a radiation therapy agent, an anti-angiogenic agent, an apoptotic agent or an anti-tubulin agent.

20. A targeted treatment method, for improving a condition of T cell dysfunction by antagonizing PD-L1 signaling, comprising administering the composition of claim 19 to a subject in need thereof.

* * * * *